(12) United States Patent
Ghosh et al.

(10) Patent No.: US 11,984,034 B2
(45) Date of Patent: May 14, 2024

(54) UNMANNED VEHICLE POSITIONING, POSITIONING-BASED METHODS AND DEVICES THEREFOR

(71) Applicant: Intel Corporation, Santa Clara, CA (US)

(72) Inventors: Dibyendu Ghosh, Bangalore (IN); Vinayak Honkote, Bangalore (IN); Kerstin Johnsson, Palo Alto, CA (US); Venkatesan Nallampatti Ekambaram, Hillsboro, OR (US); Ganeshram Nandakumar, Bangalore (IN); Vasuki Narasimha Swamy, Santa Clara, CA (US); Karthik Narayanan, Bangalore (IN); Alexander Pyattaev, Tampere (FI); Feng Xue, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 16/584,978

(22) Filed: Sep. 27, 2019

(65) Prior Publication Data
US 2020/0043348 A1    Feb. 6, 2020

(51) Int. Cl.
*G05D 1/10*    (2006.01)
*B64C 39/02*    (2023.01)
(Continued)

(52) U.S. Cl.
CPC ......... *G08G 5/0008* (2013.01); *B64C 39/024* (2013.01); *B64D 47/08* (2013.01);
(Continued)

(58) Field of Classification Search
CPC ....... G08G 5/0008; G08G 5/025; H04W 4/42; B64C 39/024; B64D 47/08; G05D 1/101; H04J 3/14
See application file for complete search history.

(56) References Cited

U.S. PATENT DOCUMENTS 9,725,171 B1 *  8/2017  Carmack ............... G05D 1/102
10,107,891 B1 * 10/2018  Ngo ......................... G01S 5/06
(Continued)

OTHER PUBLICATIONS

Ekambaran, V. et al; "Semi-Definite Programming Relaxation for Non-Line-of-Sight Localization"; 9 pages; Aug. 18, 2012; retrieved from https://www2.eecs.berkeley.edu/Pubs/TechRpts/2012/EECS-2012-189.html, Technical Report No. UCB/EECS-2012-189.

(Continued)

*Primary Examiner* — Peter D Nolan
*Assistant Examiner* — Roy Rhee
(74) *Attorney, Agent, or Firm* — Viering, Jentschura & Partner mbB; Benjamin L. von Rueden

(57) ABSTRACT

Various methods and devices for positioning autonomous agents including verifying a reported agent location using physical attributes of the received signal; improving agent formation for iterative localization; selecting agents for distributed task sharing; intelligent beacon-placement for group localization; relative heading and orientation determination utilizing time of flight; and secure Instrument Landing System (ILS) implementation for unmanned agents.

9 Claims, 34 Drawing Sheets

(51) Int. Cl.
    *B64D 47/08*     (2006.01)
    *G05D 1/00*     (2006.01)
    *G08G 5/00*     (2006.01)
    *G08G 5/02*     (2006.01)
    *H04J 3/14*     (2006.01)
    *H04W 4/42*     (2018.01)
    *B64U 10/13*     (2023.01)
    *B64U 101/20*     (2023.01)
    *B64U 101/30*     (2023.01)
    *B64U 101/60*     (2023.01)
    *H04W 84/00*     (2009.01)

(52) U.S. Cl.
    CPC ............ *G05D 1/101* (2013.01); *G08G 5/025* (2013.01); *H04J 3/14* (2013.01); *H04W 4/42* (2018.02); *B64U 10/13* (2023.01); *B64U 2101/20* (2023.01); *B64U 2101/30* (2023.01); *B64U 2101/60* (2023.01); *B64U 2201/102* (2023.01); *B64U 2201/104* (2023.01); *B64U 2201/20* (2023.01); *H04W 84/005* (2013.01)

(56) References Cited

U.S. PATENT DOCUMENTS

| | | | | |
|---|---|---|---|---|
| 2014/0056172 | A1* | 2/2014 | Lee | H04M 1/737 370/254 |
| 2016/0127317 | A1* | 5/2016 | Ardeli | H04L 67/14 726/14 |
| 2020/0329378 | A1* | 10/2020 | Di Pietro | H04W 4/024 |
| 2020/0379080 | A1* | 12/2020 | Sakai | G01S 5/0269 |

OTHER PUBLICATIONS

Wikipedia; "Instrument landing system"; 10 pages, Sep. 22, 2019 (last update); retrieved from https://en.wikipedia.org/wiki/Instrument_landing_system.

\* cited by examiner

600

(a) Contractible network (b) Non-contractible network

| Agent ID | Idle Time (s) |
|---|---|
| A2 | IT2 |
| A4 | IT4 |
| A5 | IT5 |
| A7 | IT7 |

2202  2204

2500

3204

3202

UNMANNED VEHICLE POSITIONING, POSITIONING-BASED METHODS AND DEVICES THEREFOR

TECHNICAL FIELD

Various aspects relate generally to positioning methods for unmanned aerial vehicles (UAVs) and/or other unmanned agents, methods drawing from positioning of unmanned vehicles and/or unmanned aerial vehicles, and devices therefor.

BACKGROUND

According to a first aspect of the disclosure, secure UAV operations may require the ability to verify that a UAV is operating in a correct location. Such efforts may be undermined by various attacks, such as rogue drones intentionally faking their position reports, and/or GPS signals being spoofed by an adversary to sabotage UAV operation. Position information is routinely exchanged between a UAV and one or more other UAVs and/or one or more base stations. This exchange of position information must be verifiable.

According to a second aspect of the disclosure, UAV position estimates may be limited by positioning sensor information received by the UAVs. For example, many UAVs may rely on Global Positioning System (GPS) data to determine a UAV position. Such positions derived from GPS information may have an error tolerance that is unacceptably high for various implementations. Various physical arrangements of the UAVs may limit or preclude the ability to refine the detected positions of the UAVs using additional measurements and/or mathematical calculations.

According to a third aspect of the disclosure, a swarm system may include multiple UAVs and/or autonomous agents working collaboratively and autonomously to solve problems that are beyond the scope of single UAV and/or autonomous agent. In a swarm system, collective decision-making may be utilized. As such, the agents may need to carry out individual tasks to carry out a collective mission. In certain implementations, it may be desirable for swarm agents to be equipped with simple and/or inexpensive memory and/or processing components. As such, the computing and/or memory resources on each agent may be limited. Expanding the computing and/or memory resources may come at the expense of physical size, battery requirements, reduced battery runtime, and/or cost, which may be undesirable. Thus, if an agent encounters (or is required to carry out) a heavy computational task, it may either need to process the task with the resources it has onboard or send the task to a base station with more capable processing resources. Each of these options reduces the real-time functionality of the system and results in decreased speed.

According to a fourth aspect of the disclosure, in a multiple autonomous agent setup with heterogeneous agents, localization may be of prime importance. Localization can be categorized as primary-layer (relative) or secondary-layer (absolute). Primary layer localization does not depend on other agents or surroundings, as measurements are relative to the robot itself. Rather, one has to integrate (dead recon) the measurements over time to obtain measurements with respect to a reference (robot starting point). This can be seen in, e.g., internal measurement unit calculation, wheel encoders, and/or basic visual odometry. Secondary layer localization depends on other robots and/or the surroundings for which the measurements are absolute. When such measurements are available, it is an opportunity for the robot to minimize the errors it has accumulated in the primary layer. If the available techniques for an agent to localize are insufficient, the localization fails (e.g., errors accumulate beyond defined limits), and the robot is lost and it is considered "kidnapped".

According to a fifth aspect of the disclosure, aside from positioning or localization in the sense of obtaining a position of an object relative to a reference point, it may be desired to determine object orientation (e.g., heading, whether two-dimensionally or three-dimensionally). Such object-orientation information may be critically important, e.g., in applications related to automated docking, landing, aerial refueling, or otherwise.

According to a sixth aspect of the disclosure, aerial vehicles may use an Instrument Landing System (ILS) to assist in landing, such as in the automated landing of fixed-wing aircraft. In ILS, wireless signals may be transmitted in overlapping lobes or transmission regions, and a quality of the signals (i.e., the relative signal strength of the overlapping signals) may be used to guide an aircraft into a desired landing position. Such signals, however, are unsecure and may require a substantial buffer area without interference.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
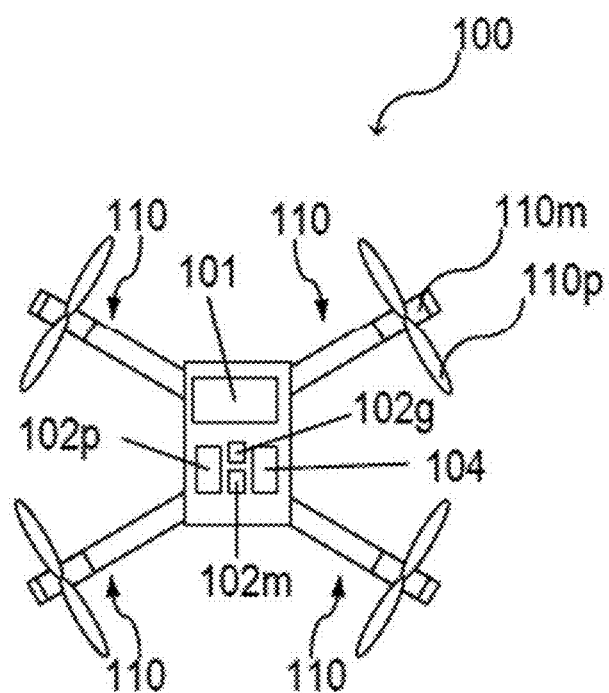
FIG. 1 illustrates an unmanned aerial vehicle in a schematic view, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and in the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via a one or more processors in a suitable way, e.g. as data.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like. The term "flight path" used with regard to a "predefined flight path", a "traveled flight path", a "remaining flight path", and the like, may be understood as a trajectory in a two- or three-dimensional space. The flight path may include a series (e.g., a time-resolved series) of positions along which the unmanned aerial vehicle has traveled, a respective current position, and/or at least one target position towards which the unmanned aerial vehicle is traveling. The series of positions along which the unmanned aerial vehicle has traveled may define a traveled flight path. The current position and the at least one target position may define a remaining flight path.

The term "map" used with regard to a two- or three-dimensional map may include any suitable way of describing positions of objects in the two- or three-dimensional space.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as an unstaffed, uninhabited or unpiloted aerial vehicle, aircraft or aircraft system or UAV.

The unmanned aerial vehicle, according to various aspects, may include a support frame that serves as a basis for mounting components of the unmanned aerial vehicle, such as, for example, motors, sensors, mechanic, transmitter, receiver, and any type of control to control the functions of the unmanned aerial vehicle as desired. One or more of the components mounted to the support frame may be at least partially surrounded by a shell (also referred to as body, hull, outer skin, etc.). As an example, the shell may mechanically protect the one or more components. Further, the shell may be configured to protect the one or more components from moisture, dust, radiation (e.g. heat radiation), etc.

The unmanned aerial vehicle, according to various aspects, may include a camera gimbal having an independent two- or three-axis degree of freedom to properly track a target, e.g., a person or point of interest, with a tracking camera independently of an actual flight direction or actual attitude of the unmanned aerial vehicle. In some aspects, a depth camera may be used for tracking, monitoring the vicinity, providing images to a user of the unmanned aerial vehicle, etc. A depth camera may allow the association of depth information with an image, e.g., to provide a depth image. This allows, for example, the ability to provide an image of the vicinity of the unmanned aerial vehicle including depth information about one or more objects depicted in the image.

The unmanned aerial vehicle (UAV) described herein can be in the shape of an airplane (e.g., a fixed wing airplane) or a copter (e.g., a multi-rotor copter), i.e., a rotorcraft unmanned aerial vehicle, e.g., a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propellers has one or more propeller blades. In some aspects, the propellers may be fixed pitch propellers. The propellers may be characterized by a pressure side and a suction side, wherein the pressure side is the bottom side of the propeller and the suction side is the top side of the propeller. Propellers may have a variety of dimensions, which will be discussed throughout this disclosure. The term "height" is used herein to describe a perpendicular distance from the cord. The term "thickness" is used to describe the measurement along an axis connecting, and perpendicular to, the leading edge and the trailing edge.

The unmanned aerial vehicle may be configured to operate with various degrees of autonomy: under remote control by a human operator, or fully or intermittently autonomously, by onboard computers. The unmanned aerial vehicle may be configured to lift-off (also referred to as take-off) and land autonomously in a lift-off and/or a landing operation mode. Alternatively, the unmanned aerial vehicle may be controlled manually by a radio control (RC) at lift-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or safe distance. The unmanned aerial vehicle may have one or more fail-safe operation modes, e.g., returning to the starting point, landing immediately, etc. In some aspects, the unmanned aerial vehicle may be controlled manually, e.g., by a remote control during flight, e.g. temporarily.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110*m* and at least one propeller 110*p* coupled to the at least one drive motor 110*m*. According to various aspects, the one or more drive motors 110*m* of the unmanned aerial vehicle 100 may be electric drive motors. Therefore, each of the vehicle drive arrangements 110 may be also referred to as an electric drive or an electric vehicle drive arrangement.

Further, the unmanned aerial vehicle 100 may include one or more processors 102*p* configured to control flight or any other operation of the unmanned aerial vehicle 100. The one or more processors 102*p* may be part of a flight controller or may implement a flight controller. The one or more processors 102*p* may be configured, for example, to provide a flight path based at least on a current position of the unmanned aerial vehicle 100 and a target position for the unmanned aerial vehicle 100. In some aspects, the one or more processors 102*p* may control the unmanned aerial vehicle 100 based on a map, as described in more detail below. In some aspects, the one or more processors 102*p* may directly control the drive motors 110*m* of the unmanned aerial vehicle 100, so that in this case no additional motor controller may be used. Alternatively, the one or more processors 102*p* may control the drive motors 110*m* of the unmanned aerial vehicle 100 via one or more additional motor controllers. The motor controllers may control a drive power that may be supplied to the respective motor. The one or more processors 102p may include or may implement any type of controller suitable for controlling the desired functions of the unmanned aerial vehicle 100. The one or more processors 102p may be implemented by any kind of one or more logic circuits.

According to various aspects, the unmanned aerial vehicle 100 may include one or more memories 102m. The one or more memories 102m may be implemented by any kind of one or more electronic storing entities, e.g., one or more volatile memories and/or one or more non-volatile memories. The one or more memories 102m may be used, e.g., in interaction with the one or more processors 102p, to build and/or store the map, according to various aspects.

Further, the unmanned aerial vehicle 100 may include one or more power supplies 104. The one or more power supplies 104 may include any suitable type of power supply, e.g., a direct current (DC) power supply. A DC power supply may include one or more batteries (e.g., one or more rechargeable batteries), etc.

According to various aspects, the unmanned aerial vehicle 100 may include one or more sensors 101. The one or more sensors 101 may be configured to monitor the vicinity of the unmanned aerial vehicle 100. The one or more sensors 101 may be configured to detect obstacles in the vicinity of the unmanned aerial vehicle 100. According to various aspects, the one or more processors 102p may be further configured to modify a predefined flight path of the unmanned aerial vehicle 100 based on detected obstacles to generate a collision free flight path to the target position avoiding obstacles in the vicinity of the unmanned aerial vehicle. According to various aspects, the one or more processors 102p may be further configured to reduce the altitude of the unmanned aerial vehicle 100 to avoid a collision during flight, e.g., to prevent a collision with a flying object that is approaching unmanned aerial vehicle 100 on a collision course. As an example, if the unmanned aerial vehicle 100 and the obstacle approach each other and the relative bearing remains the same over time, there may be a likelihood of a collision.

The one or more sensors 101 may include, for example, one or more cameras (e.g., a depth camera, a stereo camera, etc.), one or more ultrasonic sensors, one or more radar (radio detection and ranging) sensors, one or more lidar (light detection and ranging) sensors, etc. The one or more sensors 101 may include, for example, any other suitable sensor that allows a detection of an object and the corresponding position of the object. The unmanned aerial vehicle 100 may further include a position detection system 102g. The position detection system 102g may be based, for example, on global positioning system (GPS) or any other available positioning system. Therefore, the one or more processors 102p may be further configured to modify a predefined flight path of the unmanned aerial vehicle 100 based on data obtained from the position detection system 102g. The position detection system 102g may be used, for example, to provide position and/or movement data of the unmanned aerial vehicle 100 itself (including a position, e.g., a direction, a speed, an acceleration, etc., of the unmanned aerial vehicle 100). However, other sensors (e.g., image sensors, a magnetic sensor, etc.) may be used to provide position and/or movement data of the unmanned aerial vehicle 100. The position and/or movement data of both the unmanned aerial vehicle 100 and of the one or more obstacles may be used to predict a collision (e.g., to predict an impact of one or more obstacles with the unmanned aerial vehicle).

According to various aspects, the one or more processors 102p may include (or may be communicatively coupled with) at least one transceiver configured to provide an uplink transmission and/or downlink reception of radio signals including data, e.g., video or image data and/or commands. The at least one transceiver may include a radio frequency (RF) transmitter and/or a radio frequency (RF) receiver.

The one or more processors 102p may further include (or may be communicatively coupled with) an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g., from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight mode. However, any other suitable function for navigation of the unmanned aerial vehicle 100, e.g., for determining a position, a velocity (also referred to as flight velocity), a direction (also referred to as flight direction), etc., may be implemented in the one or more processors 102p and/or in additional components coupled to the one or more processors 102p. To receive, for example, position information and/or movement data about one or more obstacles, the input of a depth image camera and image processing may be used. Further, to store the respective information in the (e.g., internal) map of the unmanned aerial vehicle 100, as described herein, at least one computing resource may be used.

The unmanned aerial vehicle 100 may be referred to herein as UAV. However, a UAV may include other unmanned vehicles, e.g. unmanned ground vehicles, water vehicles, etc. In a similar way, the UAV may be any vehicle having one or more autonomous functions that are associated with a control of a movement of the vehicle.

However, various autonomous operation modes of a UAV may require a knowledge of the position of the UAV. Usually, the position of the UAV is determined based on GPS (Global Positioning System) information, e.g., Real Time Kinematic (RTK) GPS information. However, there may be many areas where an autonomous operation of a UAV may be desired (for inspections, rescue operations, etc.) but where the GPS information is either not available or faulty. As an example, various structures (e.g., a bridge, a building, etc.) may shield the GPS signals, so that it may not be possible for a UAV to determine its location. As another example, reflections from a water surface may disturb the GPS signals and make a GPS system of a UAV at least temporarily useless. Therefore, it may be difficult to inspect an oil platform on the ocean with an autonomously operating UAV. As another example, in other locations such indoors, in tunnels, in a cave, below earth, etc., there may be no GPS signals available which usually excludes many inspection cases with obstacle avoidance from effective use by customers.

UAVs may be configured as multirotor helicopters, such as, for example, quadcopters and octocopters. The specific number of propellers used for the UAV is largely immaterial to the embodiments disclosed herein, which can be implemented in a quadcopters UAV, an octocopter UAV, or otherwise, without limitation. These multirotor-helicopter-type UAVs typically utilize multiple pairs of identical, fixed-pitched propellers, which may be configured to rotate in opposite directions. Such UAVs are able to independently control the rotational velocity of each propeller to control movement of the UAV. By changing the velocity of one or more of the various propellers, it is possible to generate a desired total thrust; to locate for the center of thrust both laterally and longitudinally; and to create a desired total torque or turning force. By increasing the thrust of its rotors operating in a first direction compared to those operating in an opposite direction, the UAV is able to create a yaw movement. A UAV may increase its thrust in one or more rotors and concurrently decrease its thrust in a diametrically opposite rotor to adjust its pitch or roll. In addition to controlling their vertical and horizontal movement, such UAVs are also capable of generally maintaining a given position in the air, with little or no horizontal or vertical change, i.e., hovering.

Throughout the disclosure, one or more agents or autonomous agents may be referred to. Autonomous agents may refer to UAVs, unmanned land-based vehicle, unmanned water-based vehicles, robots, or otherwise. These terms may be used, for example, in circumstances in which it is expressly contemplated that the described positioning and/or positioning-based procedures may be performed by one or more land and/or water-based vehicles, and thus in these circumstances, the term agent or autonomous agent has generally be used instead of UAV. This distinction notwithstanding, the methods, procedures, and devices disclosed herein, even when specifically discussed in terms of one or more UAVs, may generally be performed in other implementations, such as with one or more land-based vehicles and/or with one or more water-based vehicles and generally with any kind of autonomous agent. As such, although the term UAV is used herein for convenience, the principles and methods described herein with respect to UAVs are not intended to be limited expressly to aerial vehicles.

According to a first aspect of the disclosure, secure UAV operations may require the ability to verify that a UAV is operating in a correct location. Such efforts may be undermined by various attacks, such as Rogue drones intentionally faking their position reports, and/or GPS signals being spoofed by an adversary to sabotage UAV operation. Position information is routinely exchanged between a UAV and one or more other UAVs and/or one or more base stations. This exchange of position information must be verifiable.

According to a first aspect of the disclosure, various procedures may be implemented to verify a reported position of a UAV.

Observed physical layer signals may provide valuable information regarding a location of a UAV. Utilizing such observation of physical layer signals may provide an added security measure against a malicious entity, since the received signal may only depend on the physical channel environment and the receiver, which may be less subject to manipulation in an attack. In a swarm environment, an abundance of these received signals may be effectively used to verify the location of a UAV within an error margin, independently of what it reports. Further, this can also be used to identify UAVs or other entities that provide false information (i.e., "spoofers") and potentially even locate them. Given that a location may be independently verified, it can be employed as one-step in a two-step verification procedure, or be used as a method of security authentication such as a physical layer or cryptographic code that encodes the location.

UAV location may be an inherent physical feature that can be used to verify a UAV's authenticity. Rogue UAVs may spoof their location to potentially hijack a swarm; de-stabilize a UAV system; and/or other malicious purposes. For example, a UAV may travel in certain sensitive areas in which it is not permitted, while a rogue UAV reports an incorrect position to mask the unauthorized activity. A rogue UAV may fake its ID in order to get access to other UAV's private information. In a different kind of attack, a malicious agent may spoof GPS signals to de-stabilize a UAV formation or a trajectory. It is desirable to identify such "spoofers" and discard signals from such sources.

According to one aspect of the disclosure, this may be achieved by verifying UAV position independently of a UAV report.

UAVs may routinely report their position. In some circumstances, it is desirable to independently verify the reported position data from the UAV to exclude false information from a rogue UAV. For many applications, it may only be necessary to verify a UAV's position within a tolerable error range (e.g., 10 m to 100 m), depending on the application. Although the accuracy requirement for certain applications might be higher, at least for security purposes, the accuracy requirement might be much more relaxed. Accordingly, the following techniques may be independently used to verify a UAV position.

As a general principle, whenever the UAV sends out a communication signal, the properties of the received signal (which are not under the control of the UAV, and therefore cannot be influenced by the UAV) can be used to estimate the position of the UAV.

For example, UAV position may be estimated or verified based on blind signal processing relying on signal quality, such as angle of arrival. A plurality of base stations, each having multiple antennas, may be available to receive or transmit signals from one or more UAVs. Similarly, a plurality of UAVs may be available to receive signals of one or more other UAVs. When there are multiple antennas at the different base stations (or at the UAVs), these multiple antennas can be used to estimate the angle of arrival of the received signal from the UAV, which is closely related to the angular elevation of the UAV from each of these base stations. These values can then be used to estimate the position using conventional localization techniques that can estimate position from angles of arrival.

Figure 2:
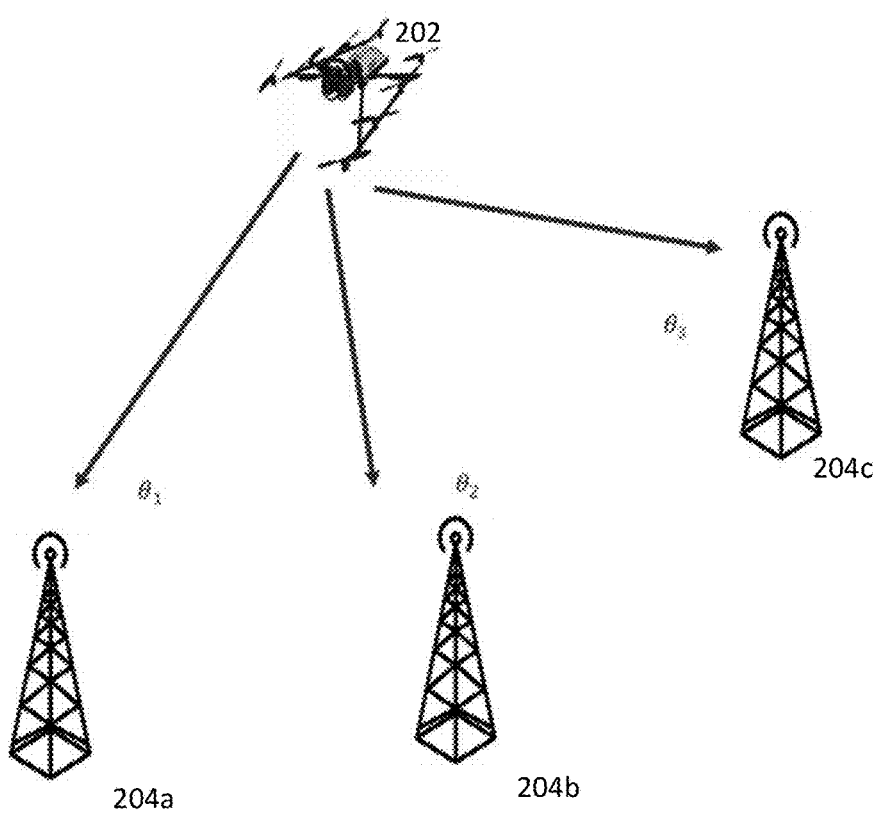
FIG. 2 shows the detection of UAV position based on angle of arrival of a received signal.

FIG. 2 shows the detection of UAV position based on an angle of arrival of a received signal. In this figure, UAV 202 transmits a wireless signal from a first position. The wireless signal is received by a plurality of base stations. In this example, three base stations receive the wireless signal of the UAV 202, the three base stations being labeled as base stations 204a, 204b, and 204c. Each base station may be configured with a plurality of antennas, which may be used to determine an angle of arrival of the signal from the UAV. The principles of determining an angle of arrival using a plurality of antennas will be understood by the person skilled in the art, and therefore they will not be described in detail herein. Any method of determining angle of arrival of a received signal may be utilized.

Each base station may have a known position. Given the known positions of at least three base stations, and the angles of arrival of the UAV's signal at each of the three base stations, a general location of the UAV may be triangulated. The approximate position of the UAV 202 may correspond to an overlapping region corresponding to an assumed path of travel from each of the three base stations along a path corresponding to the detected angles of arrival.

The accuracy of this method may depend on how close the angle of arrival is to the line of sight angle, which is affected by the reflections. From that perspective, the accuracy of the detected UAV position using angle of arrival may be improved if the angle of arrival is reported by the nearby UAVs that overhear the candidate UAV 202.

Figure 3:
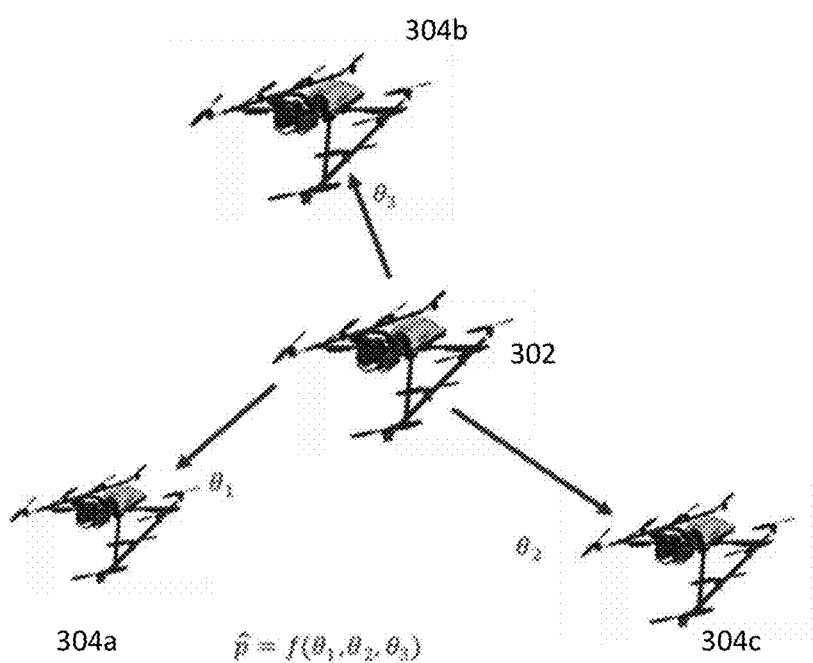
FIG. 3 shows the detection of UAV position based on angle of arrival of a signal transmitted by UAV and received by a plurality of other UAVs.

FIG. 3 shows the detection of UAV position based on angle of arrival of a signal transmitted by UAV and received by a plurality of other UAVs. In this case, UAV 302 transmits a wireless signal, which is then received by a plurality of other UAVs. In this case, the plurality of other UAVs is represented by three UAVs seen as UAVs 304*a*, 304*b*, and 304*c*. Each of the three UAVs 304*a*, 304*b*, and 304*c* detects an angle of arrival of its received signal. Each of the three other UAVs 304*a*, 304*b*, and 304*c* is able to utilize its plurality of antennas to detect an approximate angle of arrival of the received signal from the UAV 302. Because each of the three other UAVs is also equipped with its own means to detect its position, the detected position of each of the three other UAVs 304*a*, 304*b*, and 304*c* along with the detected angle of arrival, may be utilized to triangulate a position of the first UAV 302. To complete this calculation, it may be necessary for the three other UAVs 304*a*, 304*b*, and 304*c* to share information, either with one another or with an outside source. The outside source may be, for example, a base station or any other source capable of receiving information corresponding to the position of the each of the UAVs 304*a*, 304*b*, and 304*c* and the detected angle of arrival of the signal from the first UAV 302. With this information, the position of UAV 302 may be detected.

Having detected in approximate position of the UAV (202 or 302), the detected position of the UAV (202 or 302) may be compared with the reported position from the UAV (202 or 302). If the detected position and the reported position correspond within an acceptable tolerance, a level of verification of the reported UAV is established. If the detected position and the reported position do not correspond within an acceptable level of tolerance, the reported UAV position may be inaccurate. In this situation, further procedures may be instituted, as desired for the implementation, to address the unverified or disputed reported UAV position. Under such circumstances, further information from the UAV (202 or 302) may be disregarded; the UAV (202 or 302) may be identified as an attacker or spoofer, and/or the UAV (202 or 303) may be disabled. In one method, the UAVs may need to report the angle of arrival of the signals they hear from all neighboring UAVs to the base station. In another method, the UAVs may cooperate locally to exchange their position and angle information and locally estimate the position of the target UAV. This might be of interest in swarm applications, in which it is desired to verify the identities of the UAVs in a swarm.

In these procedures depicted in FIG. 2 and FIG. 3, three base stations and/or three UAVs are utilized. Although three is a conventional number used for triangulation, it is expressly noted that the methods and procedures described herein may be utilized to some benefit with fewer or more reference points, such as fewer or more base stations or UAVs. For example, even a single base station or a single UAV receiving a signal from a reporting UAV may determine an angle of arrival of the received signal. That angle of arrival, even of a single base station or single root UAV, may be compared with the reported position, and at least some amount of verification of the UAV's reported position may still be possible. Thus, even performing the methods and procedures described herein with a single receiving UAV or base station may provide additional security. Increased numbers of receiving UAVs and/or receiving base stations may, however, be associated with increased levels of triangulation accuracy in determining the position of the reporting UAV.

The estimation the angle of arrival in a blind manner can be carried out using any technique suitable for detection of angle of arrival. Some such techniques, without limitation, include, but are not limited to, MUltiple Signal Classification (MUSIC), Signal Parameters via Rotational Invariance Technique (ESPRIT), or any other known technique.

According to another aspect of the disclosure, reported positions may be verified by collecting signal values at a UAV and/or at base stations. Every location in the space has unique signal characteristics, in that a specific constellation of signals may be unique to a particular location. For example, the Reference Signal Received Power (RSRP) from different base stations, the set of cell IDs observed, the Positioning Reference Signal (PRS) correlation values etc.: each of these may be unique to particular location. Based on these unique signal "fingerprints" of a particular location, a network can map the entire sky into different grids with the expected values and the variance(s) in the values that are expected to be seen. For example, one or more mapping missions may be undertaken in which trusted UAVs fly around the environment collecting data, such as a signal fingerprint as it corresponds to a given location. By way of analogy, this may be performed much like the mapping efforts by various commercial mapping providers, in which vehicles travel across networks of roads and obtain image data along the roads, the various image data being mapped or linked to a corresponding position. As an extension of this idea, airspace may be travelled, during which the received signals (and depending on the implementation, any aspects of said signals, e.g., signal strength, transmitter identifier, signal frequency, radio access technology type, etc.) may be recorded and linked to the position from which the signal information was obtained. In this manner, a "map" of the signal information in airspace may be gathered. As an alternative to the mapping mission described herein, this information may be obtained through crowdsourcing or through any other desired technique.

Figure 4:
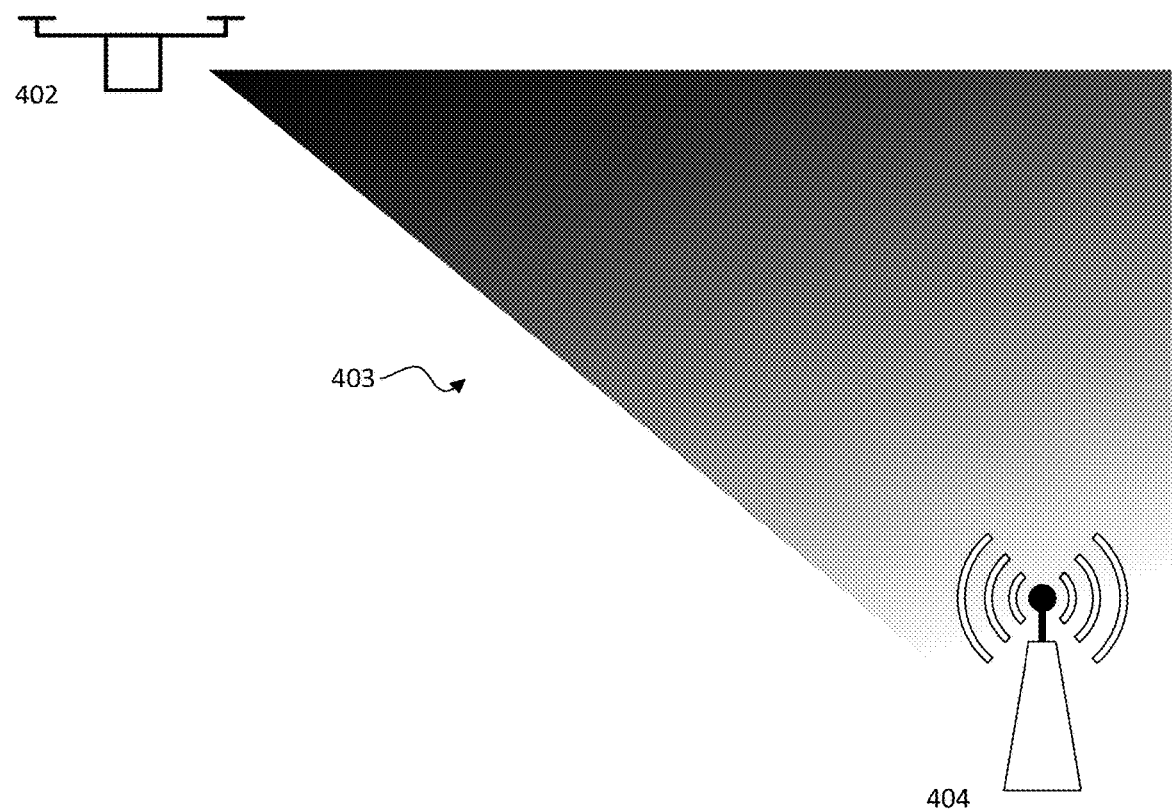
FIG. 4 shows signal strength or path loss as a factor in detecting or verifying a UAV position.

FIG. 4 shows signal strength or path loss as a factor in detecting or verifying a UAV position. In this figure, UAV 402 transmits a signal 403 to base station 404. As is depicted by the graduated shading of the signal 403, signal strength loss or path loss are expected to occur during the transmission from the UAV 402 to the base station 404. Generally speaking, an increase in distance between the UAV 402 and the base station 404 is expected to result in a decrease of signal strength or an increase in path loss. Expected signal strength or path loss values may be determined based on a candidate distance between the transmitting UAV 402 and the receiving base station 404. In this manner, a reported position of the UAV 402 and a known position of the base station 404 may be assessed for distance. The distance may be determined, for example by:

$$d(P1,P2) = \sqrt{(x2-x1)^2 + (y2-y1)^2 + (z2-z1)^2} \tag{1}$$

wherein P1 is the reported position of the UAV and P2 is the known position of a base station. Based on the distance, and assuming that a frequency is known, and expected path loss may be determined based at least on the following formula:

$$L = 20 \log_{10} \frac{4\pi d}{\lambda} \tag{2}$$

wherein L is the path loss in dB, $\lambda$ is the wavelength, and d is the transmitter-receiver distance in the same units as the wavelength.

Figure 5:
FIG. 5 shows UAV position detection and/or verification based on ToF.

FIG. 5 shows UAV position detection and/or verification based on ToF. In this figure, a ToF operation is performed between the UAV 502 and the base station 504. An expected ToF may be determined based on the calculated distance between the reported position of the UAV 502 and the known position of the base station at 504 using a distance derived by equation (1) and the speed of light, such as 299,792,458 m/s. Using a ToF transmission, a measured ToF between the UAV 502 and the base station 504 may be determined. The expected ToF and measured ToF may be compared. If the expected ToF and measured ToF are within a reasonable tolerance, the reported position or determine position of the UAV may be verified.

Using the detected signal fingerprints relative to the locations of detection, a position verification system may be employed using any of a variety of techniques.

According to a first technique, a network may determine a UAV position from a UAV's transmission of detected signal information and the corresponding information within a database of detected signal fingerprints. In this manner, the network may request a UAV to report its observation on the measured characteristics of the signal fingerprint (e.g., any of cell IDs, each cell's RSRP, PRS correlation values, etc.). The network may then compare this received information to information in its database to determine the UAV's location (a.k.a fingerprinting). That is, the network may seek observed signal information in its signal fingerprint-mapping database, which corresponds within an acceptable threshold to the reported signal information from the UAV. Assuming a satisfactory match, the stored position in the fingerprint map that corresponds with the reported observed signals from the UAV may be assumed, within a threshold of accuracy, to be the UAV's position.

According to a second technique, a reported position of the UAV may be verified using a transmission of observed signal information. In this manner, the UAV may be asked to transmit its position and observe signal characteristics (e.g., any of cell IDs, each cell's RSRP, PRS correlation values, etc.) corresponding to the position. Upon receiving the reported signal in the reported signal characteristics, the network may determine the recorded signal characteristics from the fingerprint map corresponding to the reported position. Unless the UAV has a priori knowledge of the detected signal fingerprint map, it may be difficult or impossible for a device to provide a transmission of an observed signal fingerprint for a location in which the device is not present. In this manner, the observed signals as reported by the UAV may be compared to the signal fingerprint or map, and assuming that these two signal constellations (those reported by the UAV and previously observed in the mapping mission) are within an acceptable tolerance, it may be assumed that the UAV's reported position is correct or that the UAV has a priori knowledge of the signal constellations/fingerprint corresponding to the reported location. Because a priori knowledge of the signal constellations is difficult to obtain without a substantial mapping mission and investment therein, an agreement within a reasonable tolerance between the reported observed signals and the previously mapped signals may be considered evidence that the UAV's reported position is accurate. Accordingly, the reported position of the UAV, as transmitted by the UAV, may be verified. These procedures described herein may require one or more additional message schemes that utilize all or a subset of the fields required by the UAVs to periodically report to the network.

According to a third technique, UAV position may be verified based on a network measurement of a UAV's signal. In this technique, the UAV may be asked by the network to send a known signal on one or more known frequencies and/or one or more known time resources. Based on this, one or more neighboring base stations can determine one or more signal characteristics from the received signal. For example, the one or more neighboring base stations can determine received signal power, path-loss, ToF, or otherwise, of the receive signal. Based on a reported position of the UAV any known position of the one or more base stations, and expected signal power, path loss, and/or ToF can be calculated. These expected values may be compared to measured values of the receive signal from the UAV. Assuming that these comparisons are within a reasonable tolerance, these comparisons may be used to verify the reported location of the UAV. If the comparison between the expected values and measured values differs beyond a reasonable tolerance, this may be evidence that the reported position of the UAV is not accurate.

Figure 6:
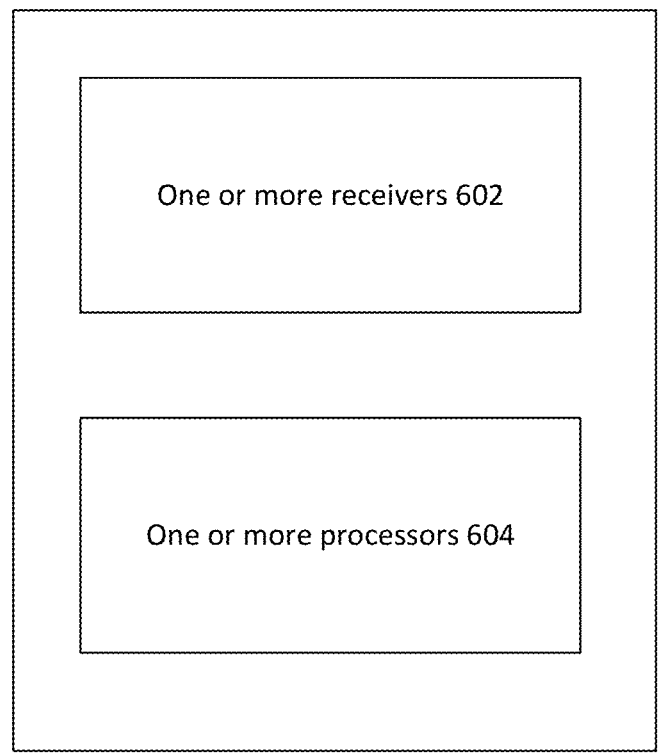
FIG. 6 depicts a location verification device according to the first aspect of the disclosure.
Figure 6:
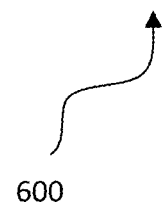

FIG. 6 depicts a location verification device according to the first aspect of the disclosure. The procedures and techniques described herein according to the first aspect of the disclosure may be performed, for example, by a location verification device 600, comprising one or more receivers 602, configured to receive a wireless signal representing a position; and one or more processors 604, configured to determine from the signal the position and a signal characteristic of the signal; predict a signal characteristic of a wireless signal based on the position and a position of the one or more receivers; compare the determined signal characteristic to the predicted signal characteristic; and verify the position based on the comparison.

Figure 7:
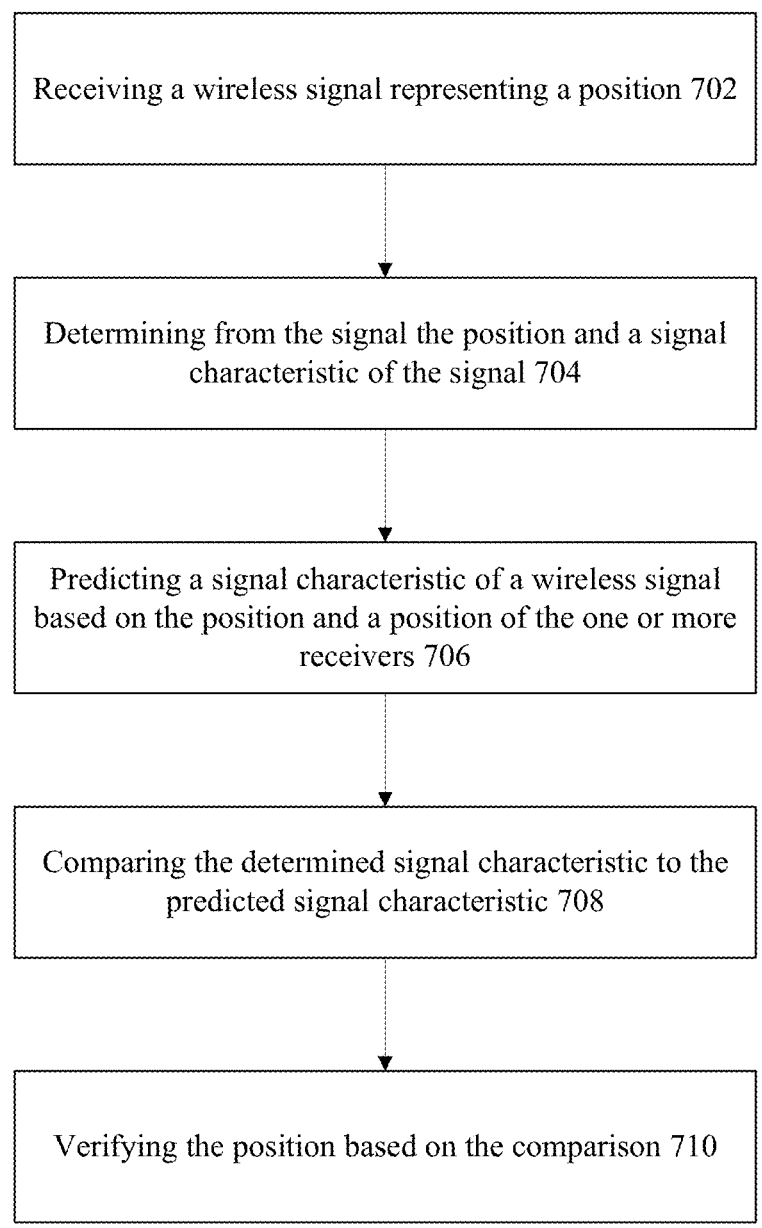
FIG. 7 depicts a method of location verification.

FIG. 7 depicts a method of location verification, comprising receiving a wireless signal representing a position 702; determining from the signal the position and a signal characteristic of the signal 704; predicting a signal characteristic of a wireless signal based on the position and a position of the one or more receivers 706; comparing the determined signal characteristic to the predicted signal characteristic 708; and verifying the position based on the comparison 710.

According to a fourth technique, position may be verified based on encoding and decoding from location-specific channel properties.

The location-based verification can also be used to encode the data being transmitted to and received by the UAVs. For example, it is desired to encrypt data that is to be decoded only by UAVs in a specific area, then it may be possible to design a cryptographic code or a physical layer code that depends on signal characteristics observed in that location. For example, the cryptographic code may be made a function of the cell IDs, RSRP and/or other signal characteristics referenced herein and therefore only decodable by a UAV that is located in that geo-location and thereby can observe these values. As such, these location-based values act as a key to decrypt the information that is transmitted, wherein the key is only provided when the UAV is in the relevant location.

In this manner, it may be desired to transmit information that can only be decoded to a UAV in a particular location. Using a signal characteristic fingerprint map, as described herein, one or more signal characteristics corresponding to the desired location may be selected. These selected characteristics may be used to create a key for encoding. In this manner, the data to be transmitted may be encoded using one or more aspects of the signal characteristics corresponding to the desired location. The encrypted data according to the key may then be sent. A UAV receiving the encrypted data may attempt to decrypt the data using one or more observed signal characteristics corresponding to its location. Because the signal characteristics are generally unique to particular locations, generally only a UAV in the desired location will observe the necessary signal characteristics (and therefore the key) to decode the encrypted information. Observed signal characteristics from locations other than the desired location may result in decryption failure.

Figure 8:
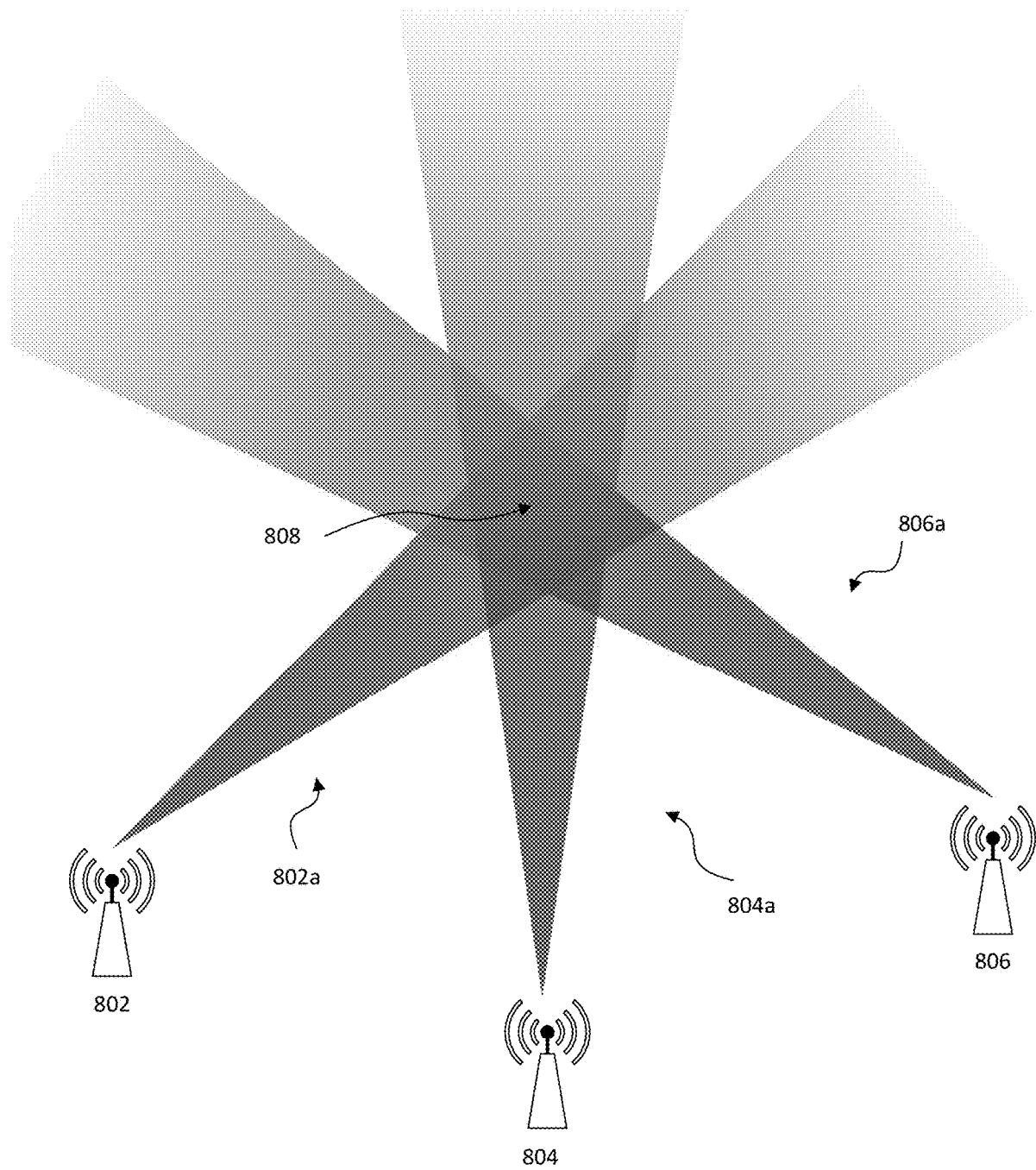
FIG. 8 depicts decoding of a transmission according to one or more signal characteristics.

FIG. 8 depicts decoding of a transmission according to one or more signal characteristics, as described herein. In this figure, three base stations 802, 804, and 806 represent transmission sources for a given position 808. That is, a UAV at position 808 would be able to detect signal characteristics from each of signal 802a as transmitted by base station 802, signal 804a as transmitted by base station 804, and signal 806a as transmitted by base station 806. One or more signal characteristics detectable in position 808 may then be used as a key to decoder received transmission from any of the named base stations or any other source.

Figure 9:
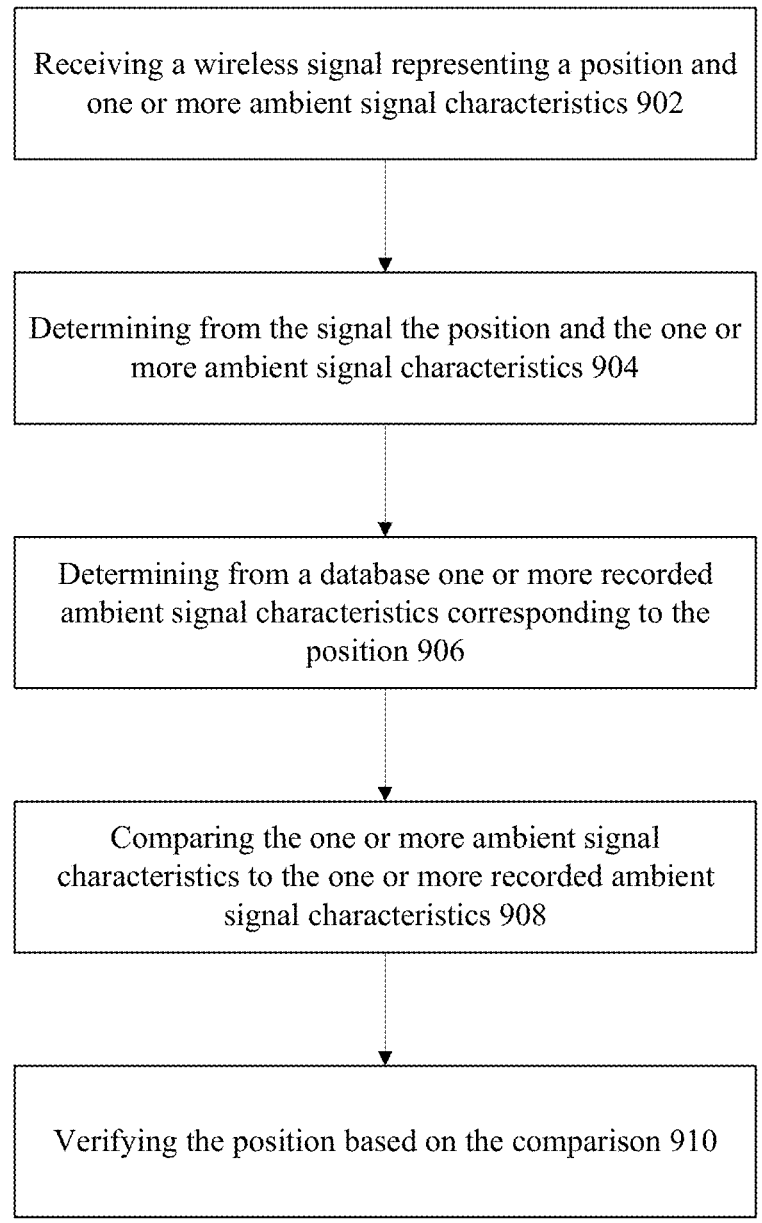
FIG. 9 depicts a method of location verification.

FIG. 9 depicts a method of location verification, comprising receiving a wireless signal representing a position and one or more ambient signal characteristics 902; determining from the signal the position and the one or more ambient signal characteristics 904; determining from a database one or more recorded ambient signal characteristics corresponding to the position 906; comparing the one or more ambient signal characteristics to the one or more recorded ambient signal characteristics 908; and verifying the position based on the comparison 910.

According to a fifth technique, location-correlated wireless properties may be used for two-step multimodal authentication.

In many UAV operations such as in future Unmanned Aircraft System Traffic Management (UTM), the scheduler (or public safety monitoring service etc.) may need to continuously monitor and verify a UAV's location. In this section, a technique for multimodal position verification is described using the methods previously described herein according to the first aspect of the disclosure.

In a first step, the UAV may repeatedly or continuously report its position (such as GPS position information) to an Operating Center according to a schedule, such as based on certain time or distance intervals. In a next step, the wireless network may utilize wireless channel properties for further verification of the UAV's GPS report. Here there are several options.

This further verification may be performed, for example, wherein the UAV reports its observed signal characteristics (Cell-ID, RSRP, etc.) to the network, or the network asks the UAV to transmit agreed signals, and then the network or Operating Center measures the received signal's properties (e.g. received signal strength, Pathloss etc.). Based on this information, the network or the Operating Center compares the responses with a known database and checks whether the position report based on GPS agrees with the position determined based on collected physical signal properties.

This further verification may alternatively be performed based on the UAV's GPS report. In this manner, the network may construct location-specific signal coding (e.g. based on the neighboring cell's expected strengths at the reported GPS location) and send a verification code to the UAV. The UAV may then decode and report back to the Operating Center for verification.

According to a sixth technique, the measured signal characteristics may be utilized to detect GPS spoofing.

In certain scenarios, GPS signals can be spoofed (i.e., mimicked) by a fake signal, often with the goal controlling or exploiting a UAV or UAV swarm. The blind angle detection methods described herein can also be used to verify the GPS signals that are transmitted by a spoofer. The physical nature of the GPS satellites results in signals that are received by the entity wishing to position itself having a 3D angle that can only be in a certain range (given that the signals are from the sky). If a spoofer is mimicking the GPS signals from the ground, the spoofer may be able to send an appropriate signal sequence; however, it may be difficult or impossible to spoof the received angles, which are only a function of the physical environment. In this manner, the UAVs may exchange the observed angle of the arrival information for multiple GPS signals and easily discard the ones they know do not belong in the valid range. This may require a plurality of the UAVs to exchange with one another the angle of arrival information along with the GPS satellite ID to form a consensus and discard bad signals. This may be effective technique particularly in the aerial scenario, since the signal is largely line of sight and ground spoofers will have a very different angle than the GPS satellite.

Figure 10:
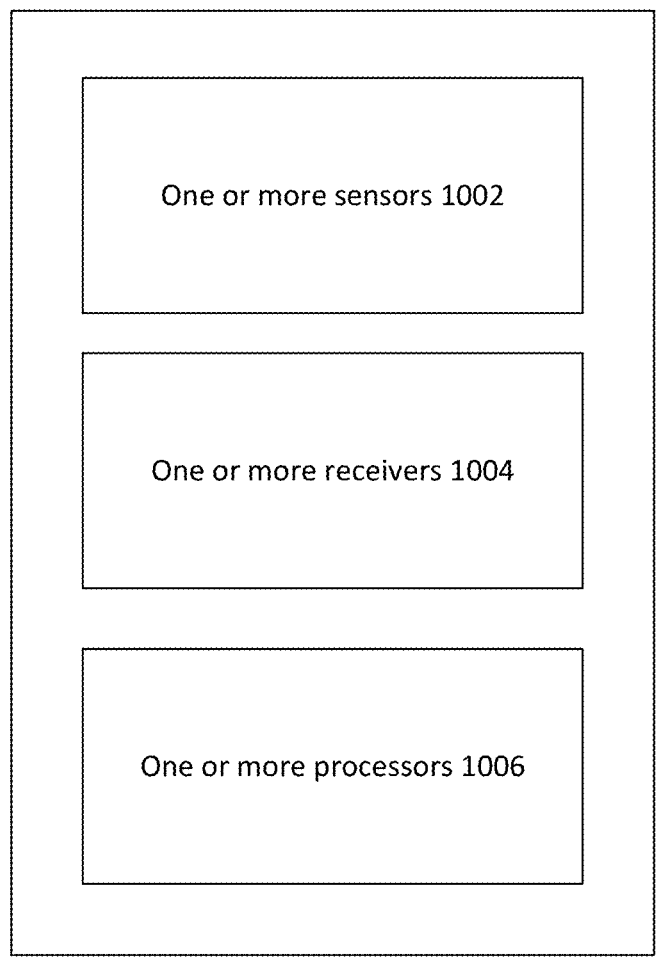
FIG. 10 shows an unmanned aerial vehicle.

FIG. 10 shows an unmanned aerial vehicle, comprising one or more sensors 1002, configured to detect one or more characteristics associated with a position of the unmanned aerial vehicle; one or more receivers 1004, configured to receive a wireless signal representing encrypted data; and one or more processors 1006, configured to select one or more of the one or more of the detected characteristics as a decryption key; and decrypt the encrypted data according to the selected decryption key.

According to one aspect, the signal characteristic may include an angle of arrival of the wireless signal. In this manner, predicting the signal characteristic may include determining a predicted angle of arrival based on the reported position and a position of one or more receivers. Using this information, a predicted angle of arrival may be calculated at least through geometric or trigonometric calculations.

The signal characteristic may include received power of the wireless signal. The received power may be measured using any known method of received signal power measurement. The receive signal power may be measured in decibels or in any other unit. The signal characteristic may include predicted received signal power based on a reported position in a position of the one or more receivers. In this manner, the signal characteristic of received power may be predicted based on a reported position and a position of the one or more receivers.

According to another aspect, the signal characteristic may include path loss of the wireless signal. In this case, the path loss may be predicted based at least on a reported position and a position of the one or more receivers. According to another aspect, the signal characteristic may include ToF. The ToF may be predicted based at least on the reported position and a position of the one or more receivers.

The location verification device may be configured as one or more unmanned aerial vehicles, as one or more autonomous agents, and/or one or more base stations.

The determined position may be accepted or rejected. According to one aspect, the one or more processors may be configured to reject the position if a difference between the determined signal characteristic and the predicted signal characteristic is outside a predetermined range. Conversely, the one or more processors may be configured to accept the position if a difference between the determined signal characteristic and the predicted signal characteristic is inside a predetermined range. In the event that the signal is rejected, one or more additional security actions may be taken. For example, the one or more processors may be configured to disregard future wireless signals received from a source of the wireless signal and/or to control a transmitter to send a wireless signal representing a non-authorization of the signal source if a difference between the determined signal characteristic and the predicted signal characteristic is outside a predetermined range. If the signal is accepted, the one or more processors may be configured to control a transmitter to send a wireless signal representing an authorization of the signal source if a difference between the determined signal characteristic and the predicted signal characteristic is within a predetermined range.

According to a second aspect of the disclosure, UAV position estimates may be limited by positioning sensor information received by the UAVs. For example, many UAVs may rely on Global Positioning System (GPS) data to determine a UAV position. Such positions derived from GPS information may have an error tolerance that is unacceptably high for various implementations. Various physical arrangements of the UAVs may limit or preclude the ability to refine the detected positions of the UAVs using additional measurements and/or mathematical calculations.

According to a second aspect of the disclosure, one or more strategies may be used to improve the accuracy of reported positions of a plurality of UAVs. It is often necessary to determine position information of UAVs while in flight. Many methods are known for using sensor data to determine UAV positions, such as by detecting a position according to the Global Positioning System or other positioning system, signal triangulation, detecting position from Radio Access Technology signals, or otherwise. The resulting, detected positions may have an error tolerance that is beyond an acceptable threshold for a given use or implementation. It may thus be desired to utilize one or more strategies to obtain more-accurate positions of the UAVs.

Figure 11A:
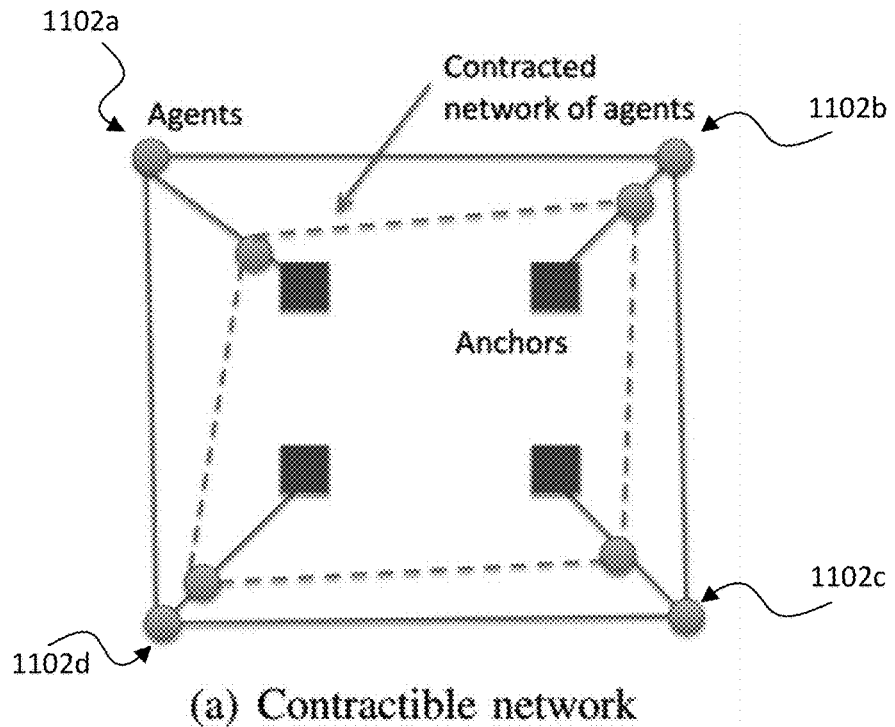
FIG. 11A depicts a plurality of UAVs for localization.

The UAVs needing to be localized may be conceived as a connection of points/nodes of a graph. FIG. 11A depicts a plurality of UAVs (1102a, 1102b, 1102c, and 1102d) for localization. It is noted that the nodes of FIG. 11A are organized in a contractable network formation. The edges of FIG. 11A represent the communication links between the connected nodes. These nodes represent drones that have a communication link between them over which they exchange ranging signals to aid in positioning.

It is known to increase the accuracy of detected UAV positions by utilizing one or more positioning formulas. The following describes a conventional positioning formula. Let $\{p_i\}$ be the positions of each node in the graph. Let $\{\widehat{d_{ij}}\}$ be the ranging estimates between nodes that are connected by edges in the graph. In the classical positioning problem formulation, the following optimization problem is solved to obtain the position estimates.

$$\min \sum_{ij} \left| \|p_i - p_j\| - \widehat{d_{ij}} \right|^2 \quad (3)$$

Figure 12:
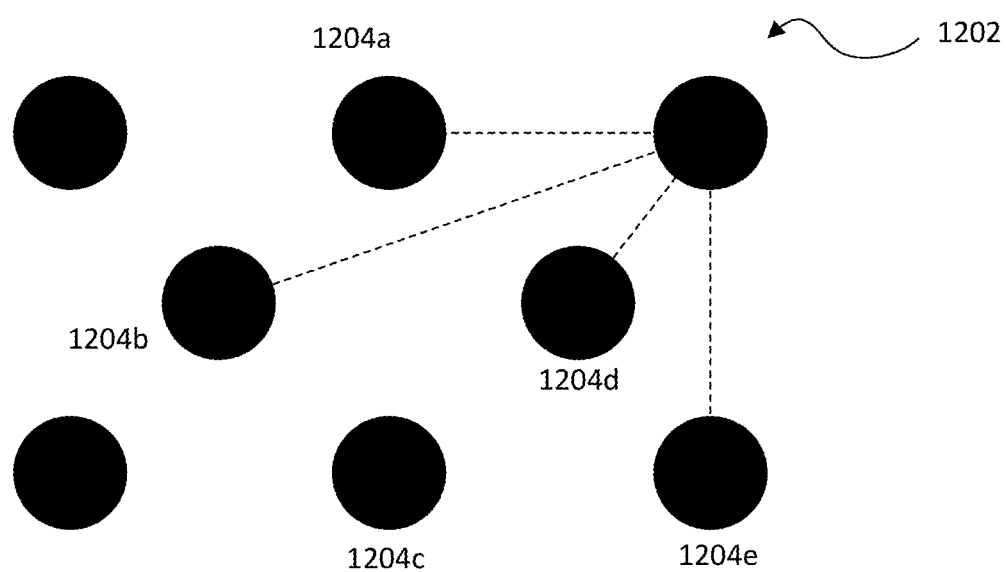
FIG. 12 shows the obtaining of various data for a positioning function.

FIG. 12 shows the obtaining of such data for the positioning function in equation (3). In this case, each of a plurality of nodes detect their position using a known position detection system (e.g., global positioning system, radio access technology positioning, etc.). For example, node 1202 detects its position. This node 1202 then measures its distance between itself and other neighboring nodes (1204a, 1204b, 1204c, 1204d, and 1204e). Any or each of the remaining nodes may carry out the same process. The detected position and the measured distances are then transmitted to a base station or other location for processing.

Various approximations or modifications to the cost function described above have been explored; however, these modifications generally focus on minimizing the error between the UAV-to-UAV measurements and minimizing the errors of the estimated positions.

Figure 11B:
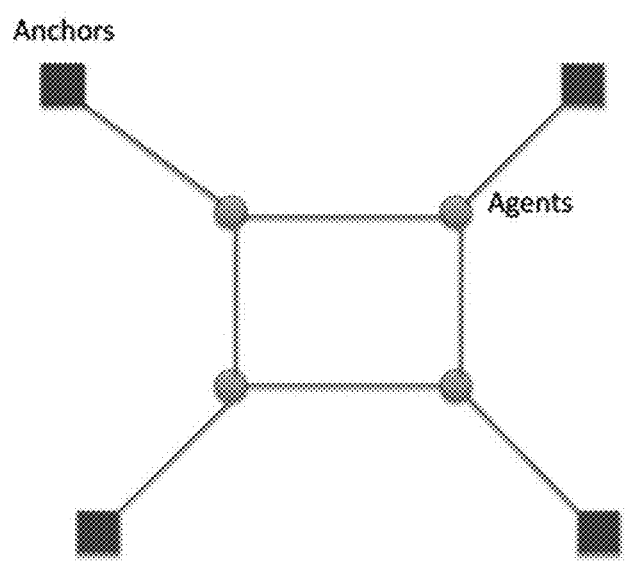
FIG. 11B depicts the nodes of FIG. 11A, reorganized in a non-contractable network.

In situations in which the UAVs do not have line-of-sight between them, some of the distance estimates may have a strong positive bias due to the multipath component, in which case it may be prudent to estimate the biases in conjunction with the positions. When the positions of the nodes conform to certain graph structures termed as "non-contractible" networks, even under the case of non-line-of-sight biases, the nodes can often be localized. FIG. 11B depicts the nodes of FIG. 11A, reorganized in a non-contractable network. Since UAVs can often be re-positioned within some constraints, the desired network structures could be imposed upon the drone formation to improve positioning accuracy.

A generalized cost function may be used to estimate node locations. In particular, the position estimates may be an output of a function $f(\{\widehat{d_{ij}}\})$, where the function is a parametrized Neural Network whose output is the position estimates and their biases.

In further details, the following cost function is presented:

$$\min \sum_{ij} \left| \|p_i - p_j\| + b_{ij} - \widehat{d_{ij}} \right|^2 \quad (4)$$

$$\text{s.t } b_{ij} \geq 0$$

$$p_i \in (p_i^+, p_i^-) \quad (1)$$

Such that $b_{ij}$ is included a cost function which modifies formula (3).

Note that the constraints on the positions $p_i \in (p_i^+, p_i^-)$ are based on the assumption that there is a rough idea of the nodes' initial locations within some error bounds (e.g. via other measurements like GPS). Furthermore, there may be bounds on how far nodes can move from their initial locations.

In light of this, it is proposed to perform the following algorithmic steps to determine the location estimates. First, the node communication graph may be determined, and based on initial node position estimates, it may be determined whether the network satisfies the non-contractability constraint, or any other constraints (e.g. rigidity, convex hull) for the positioning formulas (3) or (4). Second, for each node, it is determined whether the node can be moved within the specified bounds so that it can reduce the number of violations of the condition in Step 1. Third, the weights of a Neural Network may be optimized with the cost function as specified in equation (4). Fourth, steps 1 to 3 are repeated based on the updated position estimates until convergence or desired tolerance is met.

With respect to the steps one and two, the formation of the various nodes may be analyzed to determine whether any contractibility or non-contractibility restraints are satisfied. The satisfaction of one or more non-contractibility restraints may permit that are positioning using a positioning formula as described herein. As such, the nodes may be analyzed to determine whether, in the event that a non-contractibility criterion is not met, an adjustment in the positions of one or more nodes may satisfy a non-contractibility criterion and thus permit increased accuracy using a positioning formula. In this manner, an adjustment instruction for one or more of the nodes may be determined, and one or more processors of the device may be configured to instruct the one or more nodes to travel to a different position which then satisfies one or more non-contractibility criteria.

Figure 13:
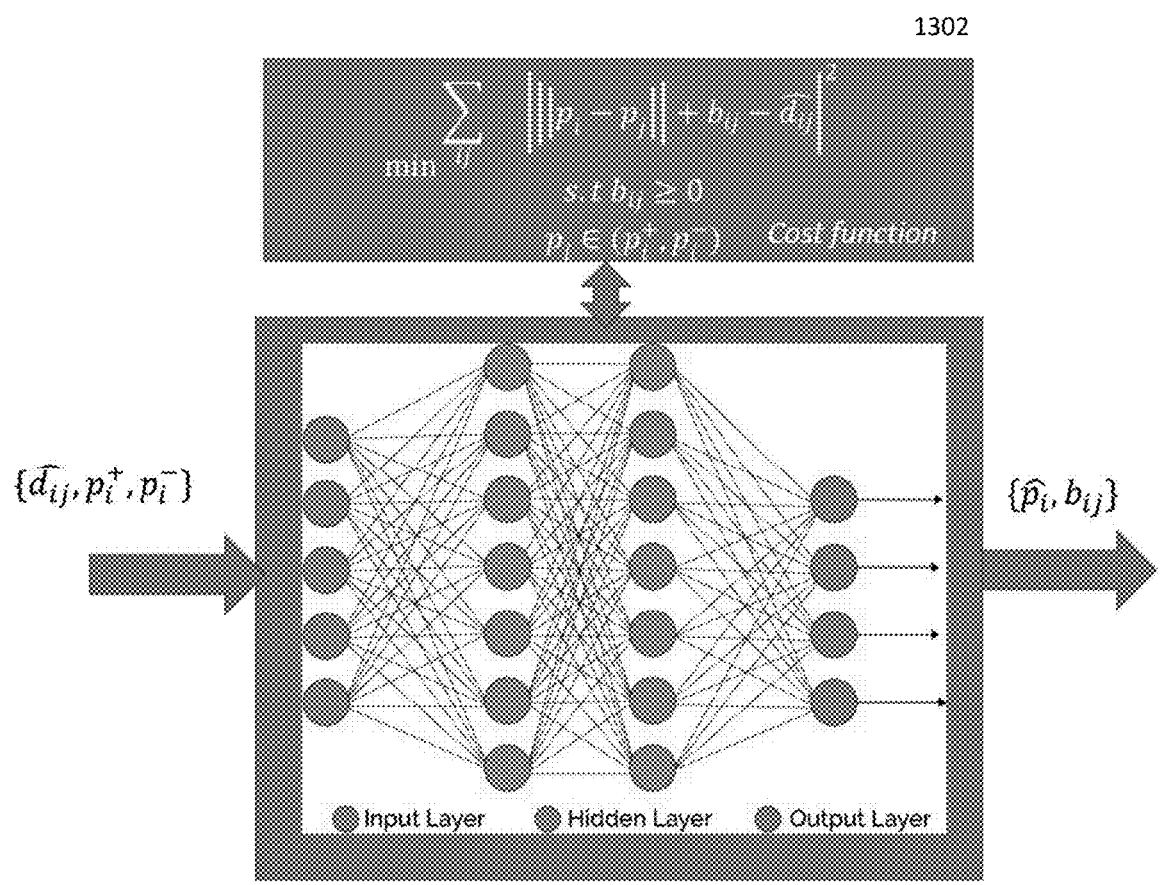
FIG. 13 depicts the revised calculation with the addition of a cost function, as determined by a neural network.

FIG. 13 depicts the revised calculation with the addition of a cost function, as determined by a neural network. The revised calculation with cost function is depicted as 1302. A neural network 1304 may be utilized to determine the cost function as used in formula 1302. In this case, the ranging estimates $\{\widehat{d_{ij}}\}$ and node positions may be entered into the neural network, which then analyzes this input according to its own weighting standards. The output layer becomes the cost function.

Figure 14:
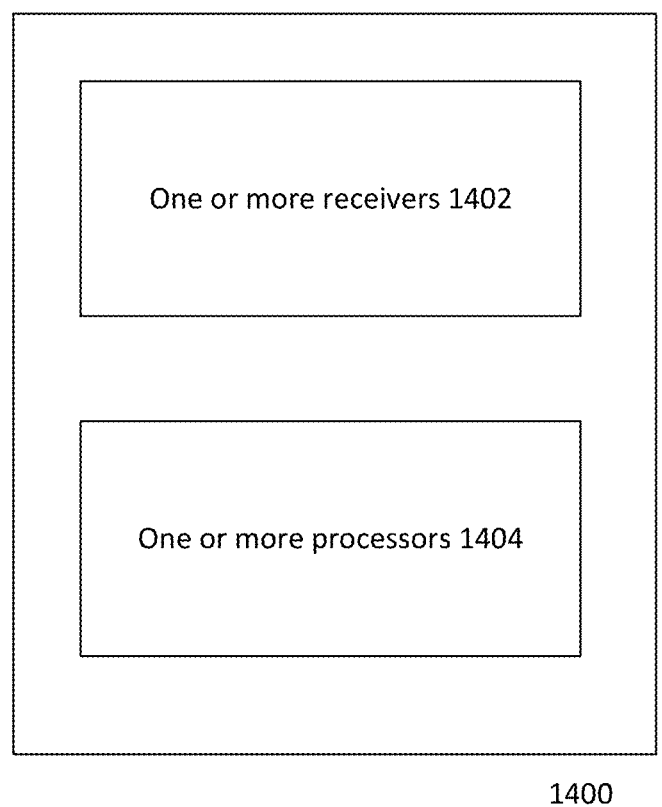
FIG. 14 shows a position device.

FIG. 14 shows a position device 1400, which is configured to perform the methods and procedures described according to the second aspect of the disclosure. The position device 1400 may comprise one or more receivers 1402, configured to receive wireless signals representing a plurality of detected positions of each of a plurality of unmanned aerial vehicles, and a plurality of detected distances between two or more of the plurality of unmanned aerial vehicles; and one or more processors 1404, configured to determine an uncertainty factor from the plurality of detected positions and the plurality of detected distances; determine a plurality of refined positions of the plurality of unmanned aerial vehicles based at least on the plurality of detected positions, the plurality of detected distances, and the uncertainty factor.

Figure 15:
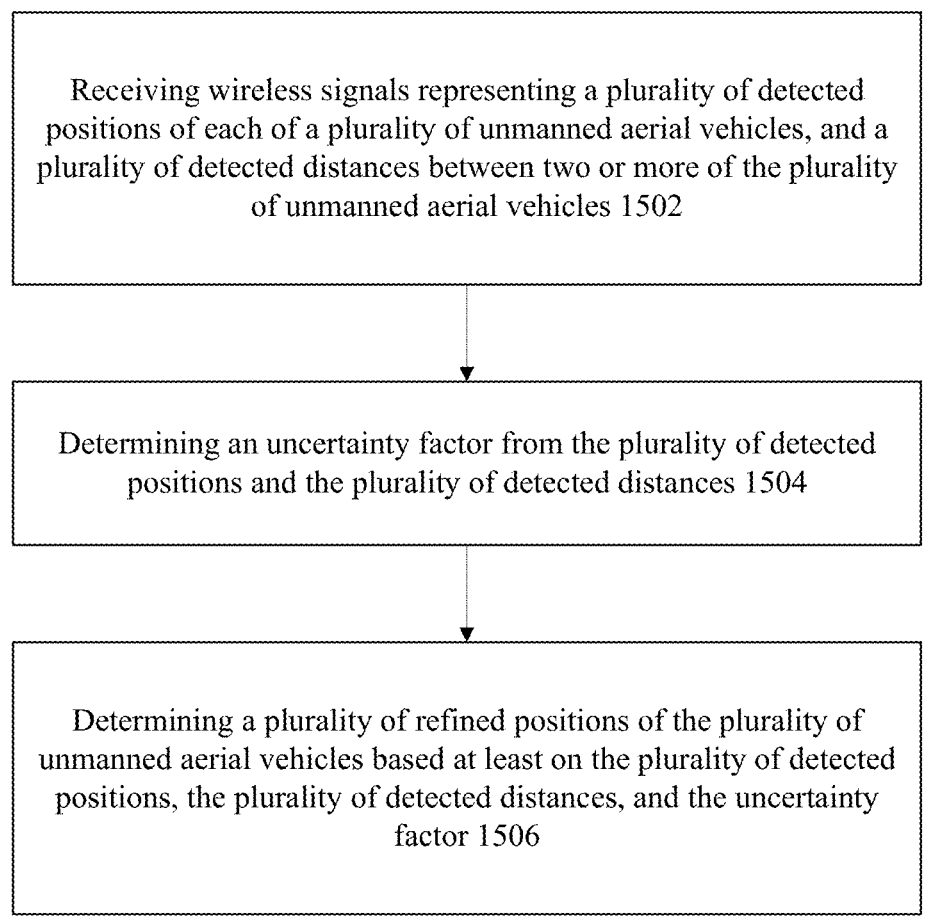
FIG. 15 shows a positioning method comprising receiving wireless signals.

FIG. 15 shows a positioning method comprising receiving wireless signals representing a plurality of detected positions of each of a plurality of unmanned aerial vehicles, and a plurality of detected distances between two or more of the plurality of unmanned aerial vehicles 1502; determining an uncertainty factor from the plurality of detected positions and the plurality of detected distances 1504; and determining a plurality of refined positions of the plurality of unmanned aerial vehicles based at least on the plurality of detected positions, the plurality of detected distances, and the uncertainty factor 1506.

Upon determining the one or more refined positions, the one or more processors may configure one or more transmitters to send a wireless signal representing one or more of the determined refined positions. The sending of the refined positions may include an instruction to travel to the refined positions. The refined positions may be determined such that the unmanned aerial vehicles arrange themselves in a configuration from which a better position determinations may be calculated. For example, the instructions may cause the one or more unmanned aerial vehicles to change a non-contractibility of their arrangement. That is, the one or more processors are further configured to determine one or more target positions of one or more of the unmanned aerial vehicles, which, if realized, would decrease uncertainty in the uncertainty factor; and control one or more transmitters to transmit a wireless signal representing instructions to cause one or more of the plurality of unmanned aerial vehicles to travel to the one or more target positions.

Determining the uncertainty factor may include determining from the plurality of detected positions and the plurality of detected distances a contractibility of the network. This network contractibility may be derived, for example, from positions of the unmanned aerial vehicles relative to a plurality of network anchors.

The uncertainty factor may include a rigidity factor of the unmanned aerial vehicles and/or a convex hull factor of the one or more unmanned aerial vehicles. According to another aspect, determining the uncertainty factor comprises determining from the plurality of detected positions and the plurality of detected distances a multipath determination of one or more signals between two or more of the plurality of unmanned aerial vehicles.

According to a third aspect of the disclosure, a swarm system may include multiple UAVs and/or autonomous agents working collaboratively and autonomously to solve problems that are beyond the scope of single UAV and/or autonomous agent. In a swarm system, collective decision-making may be utilized. As such, the agents may need to carry out individual tasks. In certain implementations, it may be desirable for swarm agents to be equipped with simple and/or inexpensive memory and/or processing components. As such, the computing and/or memory resources on each agent may be limited. Expanding the computing and/or memory resources may come at the expense of physical size, battery requirements, reduced battery runtime, and/or cost, which may be undesirable. Thus, if an agent encounters (or is required to carry out) a heavy computational task, it may either need to process the task with the resources it has onboard or send the task to a base station with more capable processing resources, each of which reduces the real-time functionality of the system and results in decreased speed.

According to a third aspect of the disclosure, a swarm system may include multiple UAVs or autonomous agents, working collaboratively and autonomously to solve problems that are beyond the scope of single UAV/autonomous agent systems. The autonomy in such swarm systems may be a result of UAVs/autonomous agents working without a base station control and/or UAVs/autonomous agents communicating for various forms of coordination. Complex missions may require intelligent collaboration between the agents of a swarm. Typically, individual swarm agents may have a specific role to play, wherein each specific role contributes to the overall mission. In other words, at a high level, each agent needs to complete its task individually, such that the overall mission can be accomplished. However, if an agent fails/malfunctions, then some other agent may assume the failed agent's task(s) and complete it/them without affecting the mission. As such, fault tolerance may be desired as a built-in feature of a swarm system. Furthermore, depending on the application and environmental conditions, the number of agents (scalability) could scale, and capabilities of such agents (homogenous agents/heterogeneous agents) would make the swarm adaptable. These properties (i.e., fault tolerance/redundancy, scalability, and flexibility (environmental conditions)) are key characteristics of swarm systems.

Typically, a swarm does not rely on any centralized control (i.e., a base station) for making decisions or coordinating its activities. However, data from agents can certainly be passed back to a central computer (e.g., in the case of a search and rescue, such as when a human/object of interest is identified and rescue information has to be sent), sometimes through direct channel/link, and in many cases through a daisy chain of neighboring agents/bots. More capable base stations potentially can be used to exploit the computational capability available.

As described above, collective decision-making may be employed in swarm systems. In current swarm systems, if an agent encounters (or is required to carry out) a demanding computational task, it may need to process the task with the resources it has onboard or send it to a base station with more capable processing resources. Either strategy makes the system non real-time and comparatively slow.

Herein is described a procedure and corresponding device to leverage the computational capabilities of the other agents in the swarm system (which may be relatively free and/or carrying out computationally light tasks) to overcome the computational limitation and/or memory limitation. This may be achieved via an intelligent, on-the-fly distribution of the computational task in a swarm of UAVs/autonomous agents for efficient use of computational and memory resources. Further, these procedures can be deployed with any swarm of UAVs and/or autonomous agents, whether homogeneous or heterogeneous, and is agnostic to the type of communication protocol incorporated for swarm collaboration.

Figure 16:
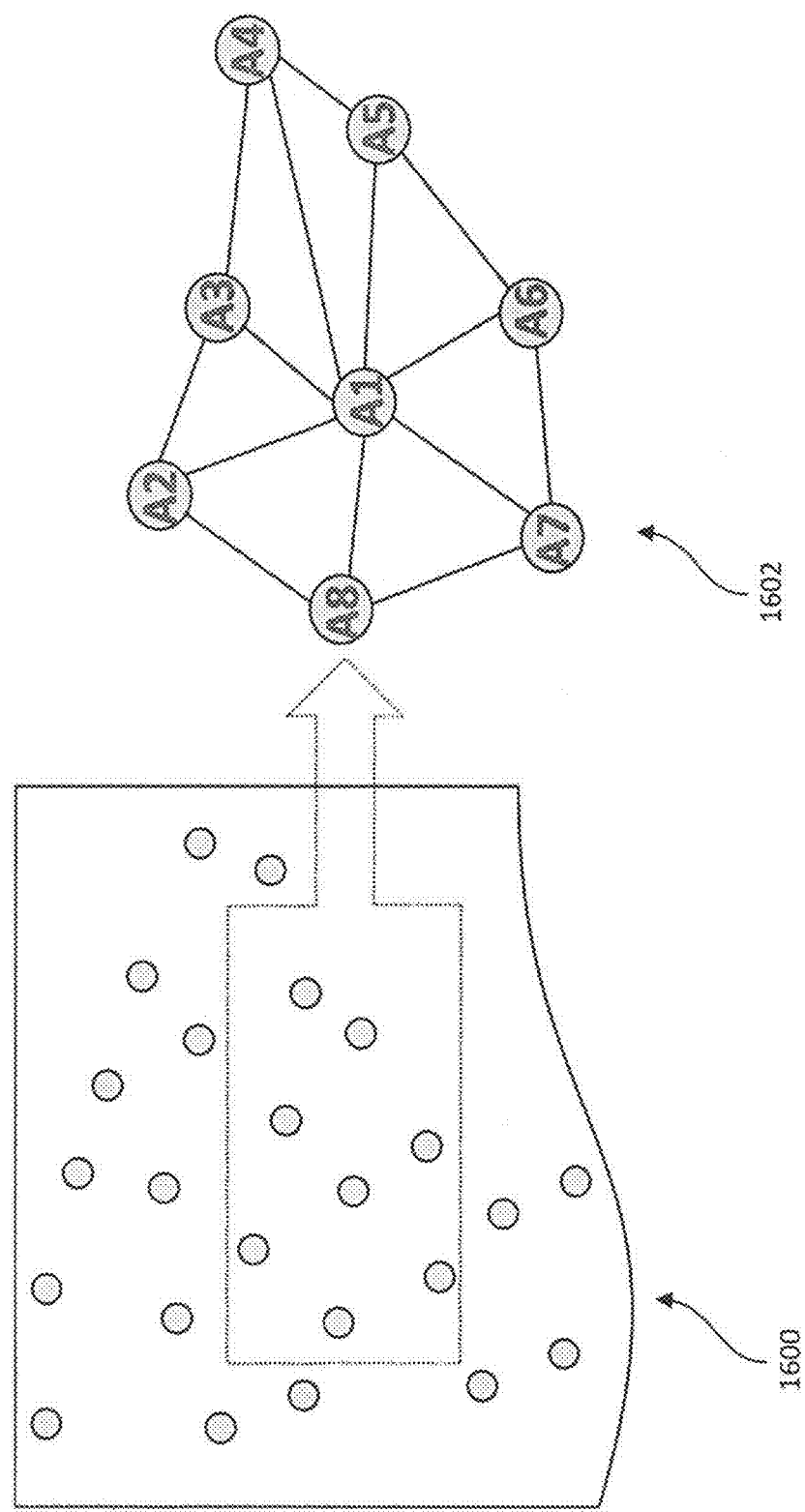
FIG. 16 shows a sample swarm system with coordinating agents.

FIG. 16 shows a sample swarm system with coordinating agents. 1602 shows a sample connectivity between eight agents of the swarm system of 1600. As will be described in detail, agent A1 must complete a computationally demanding task and seeks assistance from other agents. A1 is linked to nearby agents A3 through A8 and receives communication from each of the linked agents as to a computational availability and a memory availability. Using this information, A1 distributes subtasks to the various other agents for completion.

Prior attempts at developing swarm intelligence have principally explored abilities to control the overall behavior of a swarm and to determine how a specific mission can be accomplished. In contrast, the principles described herein allow each agent in the swarm to carry out a specific task in furtherance of a greater mission. In using the methods and principles described herein, computational tasks may be distributed from one agent (UAV/autonomous agent) in a swarm to other available neighboring agent(s) in the swarm on an as-needed basis. This can be performed even if the other neighboring agents have their own tasks, processing and/or objectives. As a broad overview, this may be performed with the following steps:

On an as-needed basis, an agent that is required to accomplish one or more heavy computational tasks may identify available neighbors for computational task distribution.

The agent may use existing ranging and/or computation capability to obtain information about neighboring agents' (i.e., UAV/autonomous agents) current computational resources and memory status.

After identifying target neighbors for task delivery, the agent may split the computational tasks to be distributed across target agents. These split tasks may be transmitted on a high bandwidth communication link. For example, this may be a peer-to-peer link between the source agent and target agent(s).

Once the computation from the target agents are complete then the results are merged to complete the task.

Figure 17:
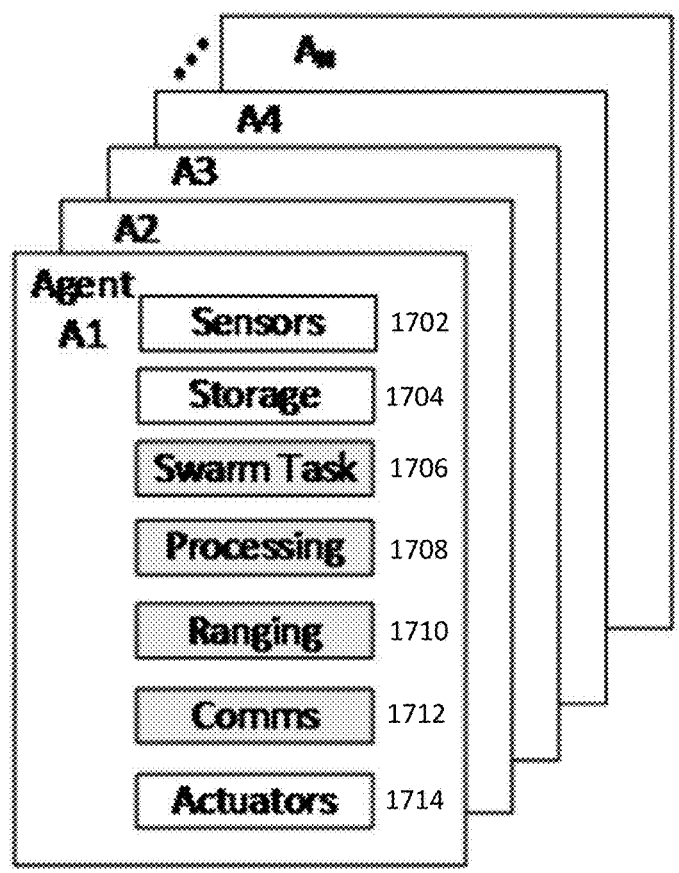
FIG. 17 shows a sample system of swarm agents with key components.

FIG. 17 shows a sample system of swarm agents $A_1 \ldots A_N$ with key components. In a given implementation, each of a plurality of agents $A_1 \ldots A_N$, may include one or more sensors 1702, one or more memories or storage 1704, one or more swarm tasks 1706, one or more processors 1708, one or more ranging modules 1710, one or more communication modules (i.e., one or more antennas, one or more transceivers, one or more baseband modems, etc.) 1712, and one or more actuators 1714. For the distribution of computational tasks as described herein, the swarm task module 1706, the one or more processors 1708, the ranging module 1710, and the one or more communications modules 1712 may be particularly relevant.

In the traditional sense, computational task distribution is generally understood to mean distributing a computational task on available resources or enabling parallel computational resources for faster task execution. However, in the case of swarm agents (e.g., UAVs/autonomous agents), each agent is expected to carry out a specific task. Thus, it is not trivial to merely distribute the computational task across agents. Rather, this process is greatly aided by intelligence to identify the agents that can best assume the computational task (i.e., assuming the computational task in light of the current task they are performing) and to determine how to distribute the tasks. Thus, herein is described at least a system and method to distribute computational tasks on an as-needed basis to other available neighboring agent(s). The procedures described herein may allow swarms to act more dynamically while still keeping their limited hardware; avoid a need for a central authority/base station to execute a complex computational task; and permit use of existing ranging/communication schemes with minor modifications to enable this methodology.

Real-time/on-the-fly decisions to dynamically distribute computational tasks may result in improved use of computational and memory resources across the swarm system. This system may be critical in applications/use-cases in which long-range communications are necessary to achieve the computational task on capable base stations and the connection to base cannot be established (e.g., in a search and rescue, the operation in thick forest/mountain area were base station connection is difficult).

According to one aspect, the system may be implemented such that an original task of any agent (e.g., the task that the agent was performing before receiving a distribute it swarm task) may remaining undisturbed and thus may have practically no impact on the current status of the system. Short communication range and distribution of tasks may result in (almost) real-time operation of the overall system. The additional computation (e.g., such as for percentage memory/percent computational resource availability on neighbors) may be simple and memory resource used may be small.

Figure 18:
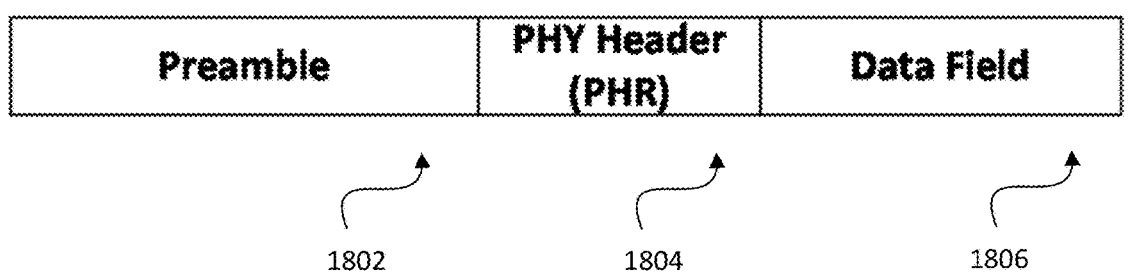
FIG. 18 depicts an existing or standard ranging/communication packet used in swarm communication.

FIG. 18 depicts an existing or standard ranging/communication packet used in swarm communication. Such packets may include a preamble 1802, a header 1804, and a data field 1806. The preamble 1802 may include, for example, data used to initiate a transfer, synchronization data, or otherwise. The header 1804 may contain addressing information related to the intended recipient or final destination. The data field 1806 may contain payload data.

Figure 19:
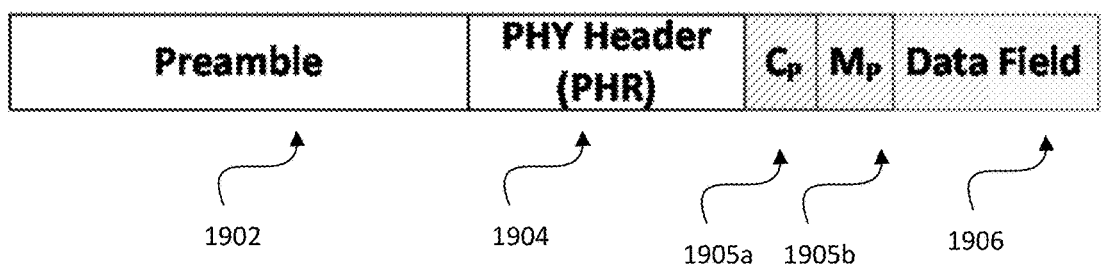
FIG. 19 depicts a sample, modified ranging/communication packet.

It is desired to modify the existing scheme to include additional information that will aid in computational task distribution. Specifically, it is desired to transmit data regarding availability of a computational resource and availability of a memory resource. FIG. 19 depicts a sample, modified ranging/communication packet to include these additional details. This packet may include a preamble 1902, a header 1904, and available computational capacity (Cp) 1905a, an available memory capacity (Mp) 1905b, and an available data field 1906. The available computational capacity 1905a may be structured in any way desired according to the implementation, including, but not limited to, a percentage of computational capacity available, a percentage of computational capacity utilized by current and/or future computational tasks, a number of bytes for anticipated computational task processing, or any other measure. The available memory capacity 1905b may be structured in any way desired according to the implementation including, but not limited to a percentage of memory capacity available, a percentage of memory capacity currently occupied, a percentage of memory capacity expected to become occupied, a percentage of memory capacity expected to become available, a number of bytes currently used, a number of bytes currently free, or any other measure. By providing these extra informational aspects to the packet, and agent needing to distribute computational task receives useful information to determine which agents should receive a subtask of the computational task and/or how the computational task should be subdivided. Various existing techniques (including techniques for multi-threaded applications) can be used to compute the references to computational capacity 1905a and/or memory capacity 1905b, and any procedure desired for an implementation may be used for the computation of this information.

According to an aspect of the disclosure, and agent receiving available computational resources and/or available memory resources may utilize this information to create a Neighbor Availability Matrix. Using one or both data points in the ($C_P$, $M_P$) pair, and agent desiring to distribute one or more computational tasks may identify neighboring agents that are available to take on additional computational task.

Figure 20:
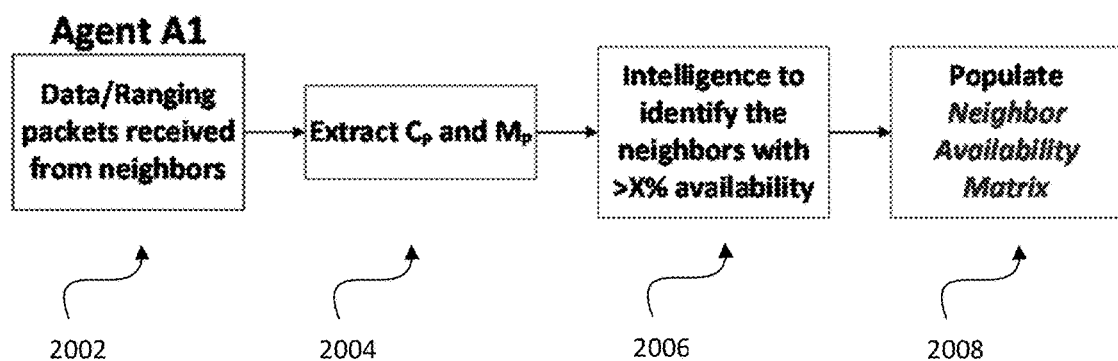
FIG. 20 depicts a scheme/procedure for computational task distribution according to an aspect of the disclosure.

FIG. 20 depicts a scheme/procedure for computational task distribution according to an aspect of the disclosure. According to this example, agent A1 (an agent desiring to distribute one or more computational tasks) receives data/ranging packets from one or more neighboring agents 2002. These data/ranging packets may include computational resource availability and/or memory resource availability. From these packets, agent A1 extracts computational resource availability and/or memory resource availability 2004. Agent A1 may then utilize one or more algorithms or artificial intelligence to determine agents with sufficient capacity or availability (e.g., agents with greater than x % availability) 2006. Agent A1 may then utilize this information to populate a neighbor availability matrix 2008. The x % availability metric may be application/scenario dependent and is configurable. That is, the x % availability factor may be selected based on any number of other factors including, but not limited to, any one or more of computational task complexity, computational task demands on resources, computational task priority, computational task latency factors, or any other factor.

Figures 21, 22:
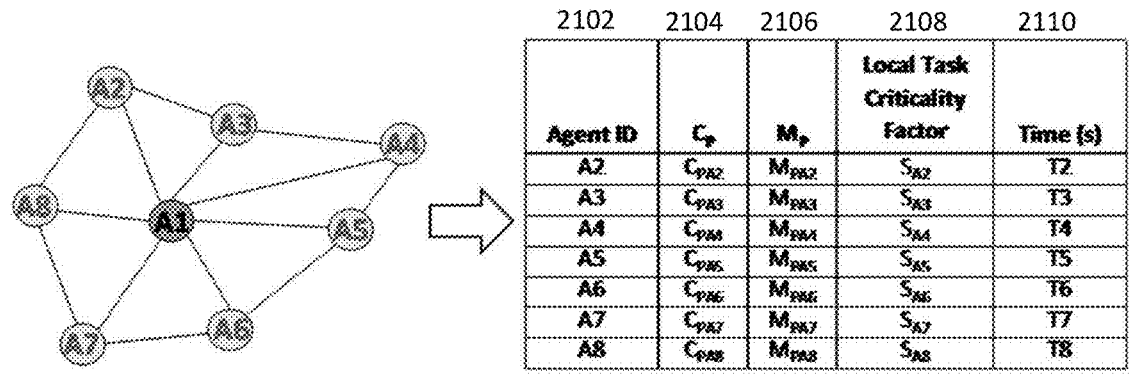
FIG. 21 depicts one possible configuration of a neighbor availability matrix.
FIG. 22 depicts a second implementation of the neighbor availability matrix.

FIG. 21 depicts one possible configuration of a neighbor information matrix. In this example, the matrix comprises five columns, labeled as agent ID 2102, computational availability 2104, memory availability 2106, local task criticality factor 2108, and time 2110. The local task criticality factor may be any one or more factors associated with the criticality, priority, or latency tolerance of a given task. It is assumed that some or all of the agents to receive computational subtasks may be engaged to perform one or more of their own processing tasks, each task having a criticality, priority, and/or latency tolerance. It may be desired to evaluate a criticality, a priority, and/or a latency tolerance of a task native to the receiving agent against that of a distributed computational task, to determine whether the distributed computational task should be, or can be, performed before the native task. The time element in 2110 may refer to an amount of time for which a neighbor is free and/or an amount of time for which the computational resource and/or memory resource transmitted to A1 is expected to be a current or representative value.

It is noted that some of all neighboring agents may have one or more of their own tasks. If the one or more tasks being performed on these neighboring agents are not time-critical, then these agents can still be marked available for receiving and accepting time-critical computational tasks from A1. This may be described as the Local Task Criticality Factor 2108. If a neighboring agent receives a request to accept a distributed computational task during a period in which a neighboring agent is engaged in a time critical computational task, the neighboring agent may reject the distributed computational task. In addition, after the agent is marked as available, if a critical task arises, the agent can return to a busy mode and/or become unavailable for receipt of distributed computational tasks. Finally, after the neighboring agent (e.g., A2) accepts one or more computational tasks from the requestor (e.g., A1), and during the processing of the one or more accepted tasks, if A2 receives an interrupt for a critical task, the computational task from A1 can be paused or discarded. Alternatively, in this scenario, A2 may return to A1 the partially computed information representing the portion of the task that had been carried out thus far. In this case, A1 may update its table accordingly to indicate that A2 is no longer available.

The matrix presented in FIG. 21 is only one of many potential configurations. As an example, and to indicate the flexibility of the matrix configuration for any given implementation, an intelligently derived matrix, "Neighbor Availability Matrix" can be determined (e.g., derived from the Neighbor Information Matrix shown in FIG. 21), as depicted in FIG. 22. In this case, a simplified version of the matrix may be constructed using, for example, only two columns including an agent ID 2202 and idle times 2204. The idle times 2204 may correspond to an anticipated period during which the corresponding agent anticipates being idle. The idle times may alternatively correspond to a duration since which the corresponding agent has been idle. It is emphasize that this can be constructed in many ways according to the desired implementation.

Figure 23:
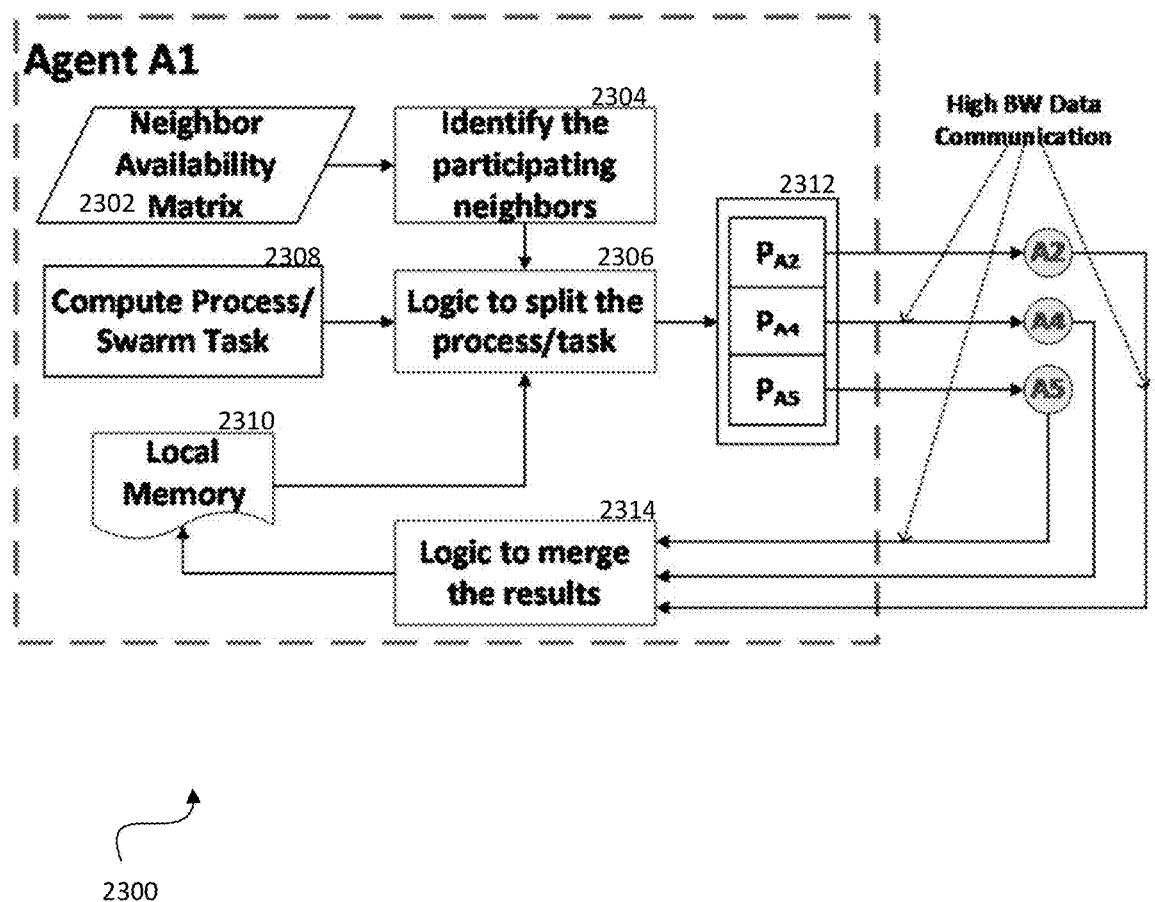
FIG. 23 depicts a procedure for a swarm agent to distribute computational tasks.

FIG. 23 depicts a procedure for a swarm agent to distribute computational tasks 2300. In this example, an agent desiring to distribute one or more combinational tasks (in this case, agent A1) completes a neighbor availability matrix 2302 as described above. The neighbor availability matrix 2302 may include any one or more of agent ID, computational resource availability, memory availability, task priority, idle duration, any combination thereof, or otherwise. Based on the neighbor availability matrix 2302, the agent may identify participating neighbors 2304. The participating neighbors may be understood as the selected neighbors to whom a computational task will be distributed. The agent may then utilize a logic 2306 to subdivide the computational task into one or more computational task subdivisions. This permits the computational task to be processed by a plurality of other agents, rather than requiring that a single, computationally burdensome computational task be performed by a single agent recipient of a distributed task. A variety of logics is currently available for task distribution. Any known logic may be utilized for this purpose without limitation. The logic to split the process task 2306 may take into account any of factors related to the computational task 2308 (e.g., task complexity, task priority, a latency factor, etc.) and/or local memory availability 2310. Upon selecting neighbors to whom the tasks should be distributed 2304 and upon splitting the task into a plurality of subdivisions or subtasks 2306, the various subdivisions are transmitted to the various identified neighbors as depicted in 2312. This transmission may be performed according to any transmission protocol. According to one aspect of the disclosure, a high-bandwidth data communication may be utilized or established between A1 and the one or more participating neighbors. The one or more participating neighbors may receive the distributed task and process the task accordingly. Thereafter, the one or more participating neighbors transmit the results of the process task to A1. This transmission may occur via any transmission protocol. According to one aspect of the disclosure, it may occur in the same high-bandwidth data communication used to transmit the task to the one or more identified neighbors. Upon receiving the processed results of the distributive tasks, A1 may use a logic 2314 to merge the results.

It is expressly noted that the Neighbor Availability Matrix can further be scrutinized based on the requirement to identify a set of neighbors as target agents. In the example used in FIG. 22, A2, A4, A5 and A7 are part of the Neighbor Availability Matrix; however, the logic may be such that, for example, only A2, A4 and A5 are chosen as target neighbors. The selection of fewer than all available agents may be based on any number of factors including, but not limited to any of required computational time, required computational complexity, a time for which neighbor has been available, any combination thereof, or any other factors.

During this computational process, the target neighbors carrying out the computational task can be stationary or moving, based on their respective capabilities and status. For instance, while the main loop on the target neighbor is executing the required computational task to keep the agent moving forward toward the accomplishment of the main task, the computational task request from the other agent can be carried out in a separate thread/loop—thus making it unnecessary for the target agent to halt or pause.

Figure 24:
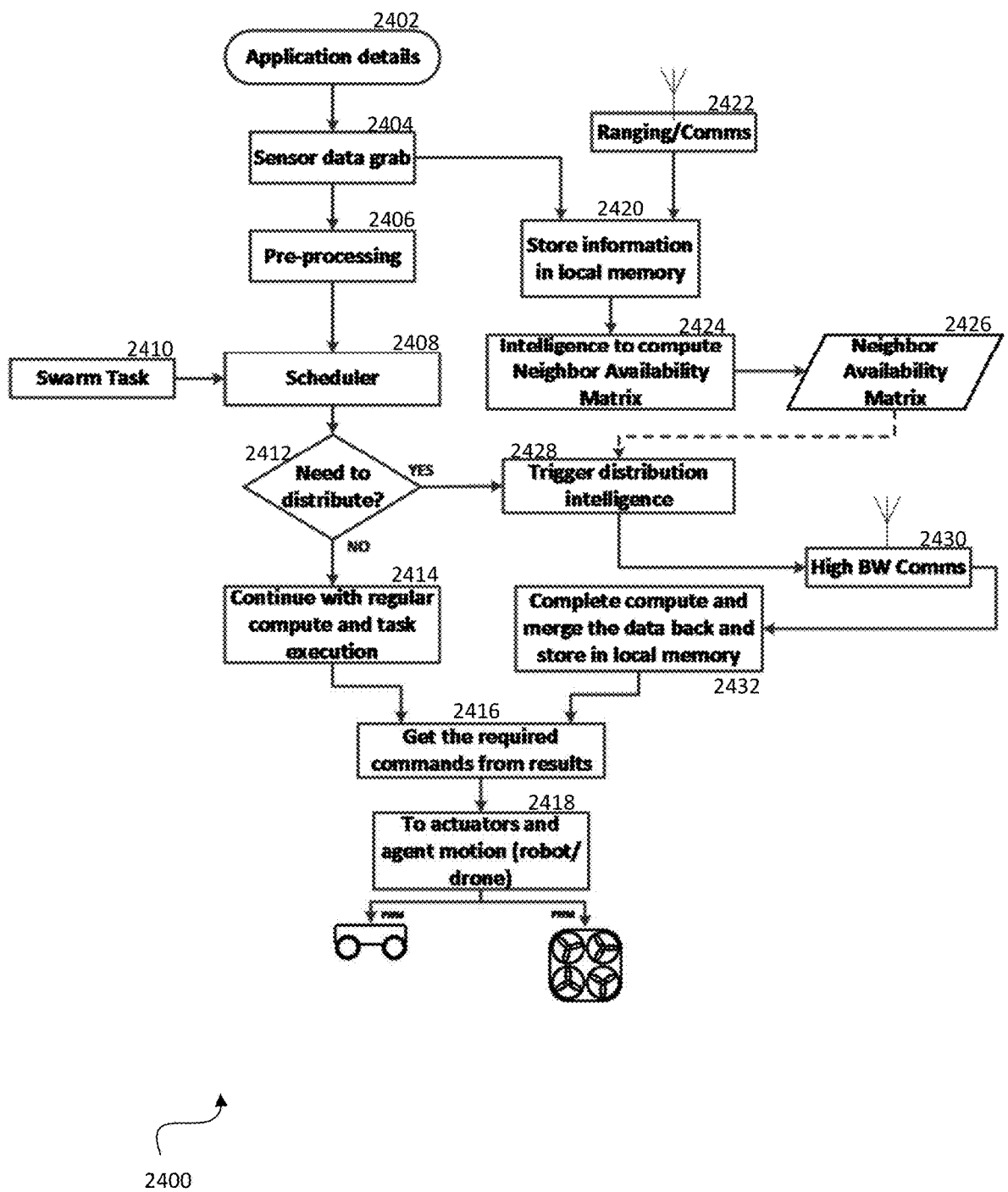
FIG. 24 depicts a flow chart of a task distribution method according to an aspect of the disclosure.

FIG. 24 depicts a flow chart of a task distribution method according to an aspect of the disclosure. According to this procedure, one or more applications may be executed in the regular fashion 2402. Depending on the application, it may be necessary or desired to obtain data from one or more sensors 2404. Upon obtaining this information, the sensor data information and/or information from the application may be sent for preprocessing 2406 and/or stored in local memory 2420. With respect to the preprocessing 2406, a scheduler 2408 may schedule processing tasks. This may include, for example, received swarm tasks 2410 and/or local tasks for processing. The agent may evaluate, based on at least the scheduler information 2408 whether it is necessary to distribute one or more tasks for distributive processing 2412. In the event that distribution is unnecessary, then the agent may continue with the regular computation and task execution 2414. The agent may then obtain the required commands from the results 2416 and passed to any actuators for agent motion 2418. With respect to the local memory reference previously under 2420, the local memory may also obtain information from one or more ranging or communications packets 2422. Using local memory information, one or more logical functions may be used to compute the neighbor availability matrix 2424 as described herein. Once the neighbor availability matrix 2426 is established, one or more agents may be selected for receipt of a distributed task via a trigger distribution intelligence or logic 2428. The selected agents receive the distributed tasks through transmission, such as high-bandwidth communications 2430. These receiving agents may carry out the computational task and return the results to the distributing agent. The disturbing agent than completes any necessary computations and merges the data to store local memory 2332. Any required commands may be obtained from the local memory results 2416, and as necessary, information or commands may be sent to actuators 2418.

According to one aspect, once the tasks are identified and the scheduler schedules them, depending on the complexity of the task and available resources on the current agent, the agent can trigger computational task distribution. This agent/bot now becomes the requestor; the selected bots from the Neighbor Availability Matrix become the target agents.

Once this is triggered, high bandwidth communication is enabled between the requestor and the target agent(s); required data is sent to the target agent(s). The computational task is performed, and the target agent(s) send(s) the result back to the requestor. Once the results are available in the local memory of the requestor, the flow proceeds as usual, and the actuators receive the command and the agent flies/moves as required.

According to one aspect, this may be used in a surveillance scenario. In a surveillance scenario, there may be multiple agents in a swarm and multiple swarm networks patrolling the area. They may periodically communicate with one another, exchanging the coverage information. However, if one of the agents captures a very dense scene, which needs heavy processing or involves a demanding computational task, and if there are other agents that have relatively light workload, then the proposed method can be used to quickly distribute the computational task, obtain the results, and take action. In a lot of situations, based on geographical area (borders, forests, deserts) where a swarm is deployed, communication to base station might not be possible; or, if possible, it might not be desired due to the delay incurred in sending and receiving the results (which could make the system non-real-time). Further, with the proposed method, the original tasks of agents in the system are not jeopardized and at the same time, the additional computations could make the system more dynamic in handling key situations.

Figure 25:
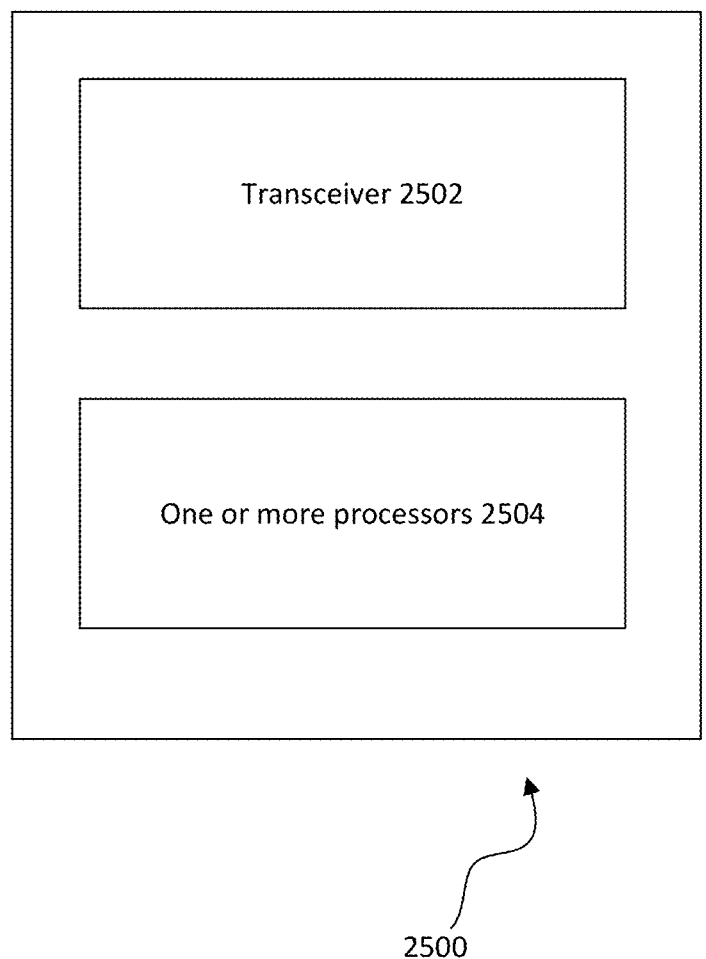
FIG. 25 depicts a device configured for computational task distribution.

FIG. 25 depicts a device configured for computational task distribution 2500 comprising a transceiver 2502, configured to receive one or more first wireless signals from each of one or more associated unmanned aerial vehicles, each of the received one or more first wireless signals representing at least one computational resource availability of the respective unmanned aerial vehicle of the one or more associated unmanned aerial vehicles; and one or more processors 2504, configured to select at least one of one or more associated unmanned aerial vehicles based on the computational resource availability of one or more associated unmanned aerial vehicles, according to a first logic; determine one or more computational tasks for disaggregate processing, according to a second logic; and control the transceiver to transmit at least one of the one or more computational tasks for disaggregate processing to each of the one or more associated unmanned aerial vehicles in the selected at least one of the one or more associated unmanned aerial vehicles.

Figure 26:
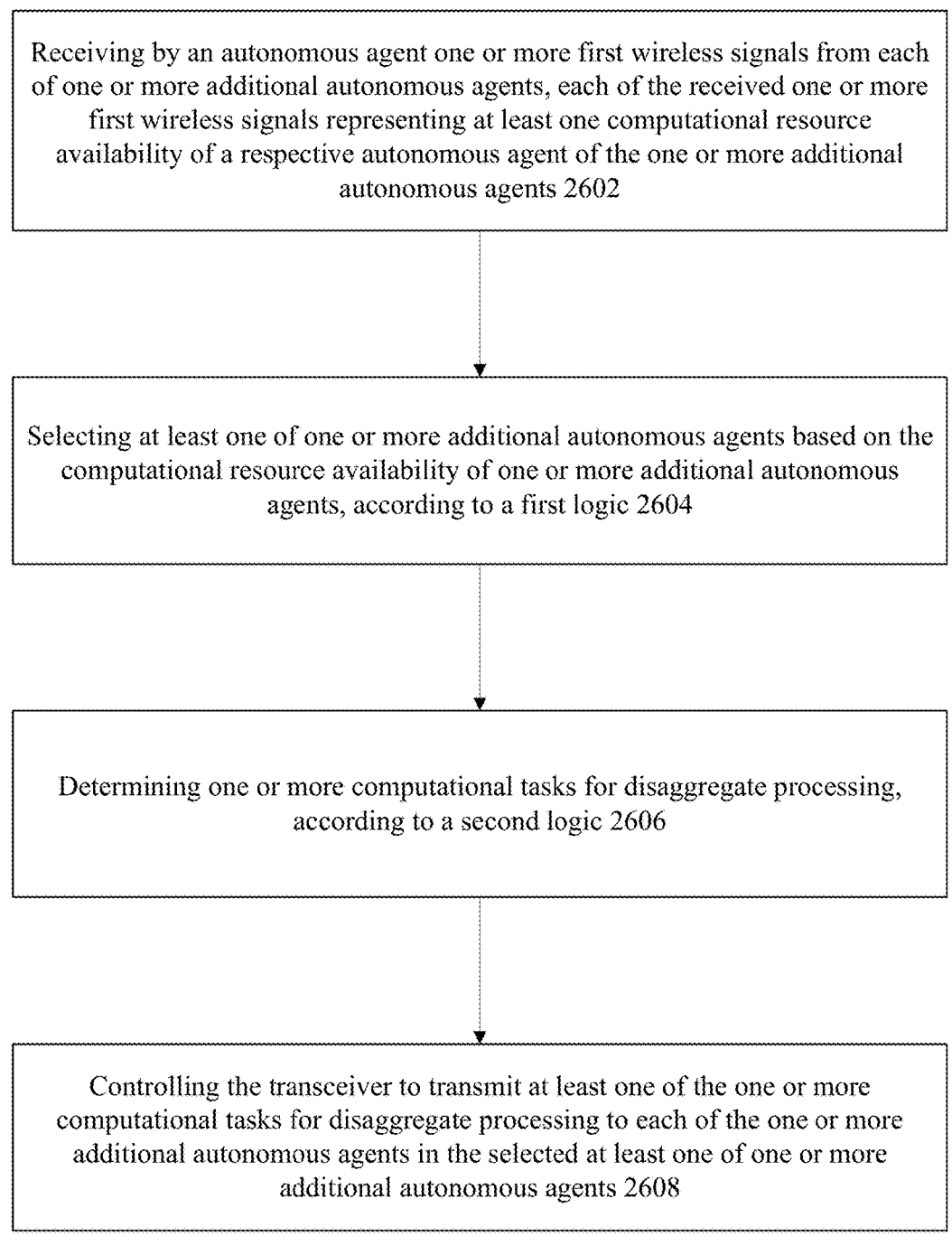
FIG. 26 depicts a method of autonomous agent task distribution.

FIG. 26 depicts a method of autonomous agent task distribution, comprising receiving by an autonomous agent one or more first wireless signals from each of one or more additional autonomous agents, each of the received one or more first wireless signals representing at least one computational resource availability of a respective autonomous agent of the one or more additional autonomous agents 2602; selecting at least one of one or more additional autonomous agents based on the computational resource availability of one or more additional autonomous agents, according to a first logic 2604; determining one or more computational tasks for disaggregate processing, according to a second logic 2606; and controlling the transceiver to transmit at least one of the one or more computational tasks for disaggregate processing to each of the one or more additional autonomous agents in the selected at least one of one or more additional autonomous agents 2608.

The various agents within the swarm may be configured to transmit their computational availability and/or memory availability repeatedly or at any time. Accordingly, the transceiver and one or more processors of the distributing agent may be configured to receive repeated or serial transmissions from the various swarm members.

The first logic for selecting a subset of agents for distributive task processing may utilize any criteria or algorithm(s) without limitation. In one implementation, the logic may be configured to select one or more agents for distributed task processing whenever either the memory availability or the computational availability is above a predetermined threshold. In another implementation, the one or more agents may be selected when both the memory availability and the computational availability are above a predetermined threshold. Depending on the implementation, any other factors may be utilized in addition to the memory availability and computational availability, such as, but not limited to, a processor speed of the agent, a strength of a wireless connection to the agent, a priority of one or more other tasks to be performed by the agent, a current mission of the agent, a latency tolerance of a distributed task, a latency tolerance of a task to be performed by the one or more agents, or otherwise.

To the extent that it is described herein to select a subset of swarm agents for task distribution, the term subset is used herein to be an imperfect subset, meaning that the number of agents selected may be equal to or less than the number of agents. As such, it is not necessary to select fewer than all available agents for task distribution.

According to an aspect of the disclosure, the one or more agents may also transmit anticipated duration of availability. The anticipated duration of availability may be a duration of time until a next scheduled task is begun. According to an aspect of the disclosure, the distributing agent may select a subset of the agents for task distribution based on the reported, anticipated durations of availability. In this manner, the distributing agent may determine an approximate duration needed for task processing and may select only agents that have an anticipated availability of at least that time. Alternatively, in situations where the distributing agent does not calculate an anticipated required processing time, the distributing agent may select one or more agents based on their having reported the longest anticipated availability.

According to an aspect of the disclosure, the one or more agents may report one or more criticality factors of one or more tasks currently being performed by the agents or scheduled to be performed by the agents. A task criticality factor may indicate a task priority or necessity that the task be performed within a given duration. The task criticality factor make correlate with or describe a task latency tolerance. The distributing agent may utilize the reported task criticality factors in selecting the subset of agents for distributed tasks. For example, agents having tasks with more urgent task criticality factors may be unable to interrupt their processing of the time-critical tasks to accept and process distributed tasks from the distributing agent. On the other hand, agents with no tasks or with non-critical tasks may be able to accept distributed tasks from the distributing agent without unacceptably delaying the completion of one or more local tasks.

According to an aspect of the disclosure, a task to be distributed may be associated with a criticality factor. The criticality factor may be assigned by the disturbing agent, may be inherent in the task to be distributed, or may arise in any other manner whatsoever. The disturbing agent may utilize the criticality factor in an implementation in which the agents report criticality factors of their own local tasks. In this case, the disturbing agent may select only agents that report criticality factors of their local tasks of less criticality than the task to be distributed.

The transmissions of memory availability and/or computational resource availability may be contained within a ranging packet or data packet. In this manner, the agents may utilize a known transmission packet structure to transmit the additional data of memory availability and/or computational availability. Alternatively, a known packet structure may be altered to create a designated transmission of memory availability and/or computational availability.

According to a fourth aspect of the disclosure, in a multi autonomous agent setup with heterogeneous agents, localization may be of prime importance. Localization can be categorized as primary-layer (relative) or secondary-layer (absolute). Primary layer localization does not depend on other agents or surroundings where measurements are relative to the robot itself. Rather, one has to integrate (dead recon) the measurements over time to obtain measurements with respect to a reference (robot starting point). This can be seen in, e.g., internal measurement unit calculation, wheel encoders, and/or basic visual odometry. Secondary layer localization depends on other robots and/or the surroundings for which the measurements are absolute. When such measurements are available it is an opportunity for the robot to minimize the errors it has accumulated in the primary layer. If the available techniques for an agent to localize are insufficient, the localization fails (e.g., errors accumulate beyond defined limits), and the robot is lost and it is considered "kidnapped".

According to a fourth aspect of the disclosure, secondary layer sensors may be used for localization. Robots frequently encounter situations in which one or more sources of positioning information on which they rely become unavailable, and the robots may be unable to position themselves using their usual positioning systems. Robots may have a limited ability to use primary layer data to continue to localize (with respect to its starting point) through integration/dead-reckoning; however, due to the fact that integration/dead-reckoning accumulates errors, it is not recommended to use this method for anything longer than a brief period of time. Without the regular positioning system information available and/or after it becomes impractical to use integration/dead-reckoning, it may be possible to maintain adequate localization through secondary layer sensors.

Secondary layer sensors may take advantage of the fact that the exact location of the robot with respect to the world is known, and this data can be used by the primary layer to correct integration/dead-reckoning errors. The primary layer information is available to the robot at a much higher rate than secondary layer information. For a robot to localize reliably, both primary and secondary layers need to be in place. Secondary layer data is not guaranteed to be available to the robot throughout the mission, as it depends on factors external to the robot. At least for a single-robot installations, the localization error and positioning error increase as the robot travels and localizes via dead reckoning.

In multi-robot localization, relatively large numbers of single robots may communicate with each other and localize themselves. Due to localization error (from both primary and secondary layers), any resulting map from these localizations may be erroneous (i.e., the same objects will be seen in different parts of the map).

In both single- and multi-robot localization, secondary layer availability may play a crucial role. Considering the exploration of unknown/dynamic environments, the availability of secondary layer information (landmark, ref base station, etc.) may be very limited/unavailable. Accordingly, a reference system may assist in robot localization.

Many of these repeated errors may be eliminated by the incorporation of a landmark-tagging scheme, which creates a surrogate secondary layer for the robots, thereby reducing localization errors. As described in greater detail herein, the robot may carry beacons that are capable of ranging and are deployed appropriately when the secondary layer is not available.

Various elements of the fourth aspect of the disclosure may reduce localization errors by effectively tagging landmarks using "anchors" or "beacons" (e.g., small form factors that a robot carries and deploys at specific locations), which may reduce the likelihood of a robot being kidnapped (e.g. unable to localize, or unable to localize to a required degree of certainty). If a robot is able to communicate with at least three neighboring robots and/or anchors, the robot may maintain secondary layer functioning in 3D via ranging.

Figure 27:
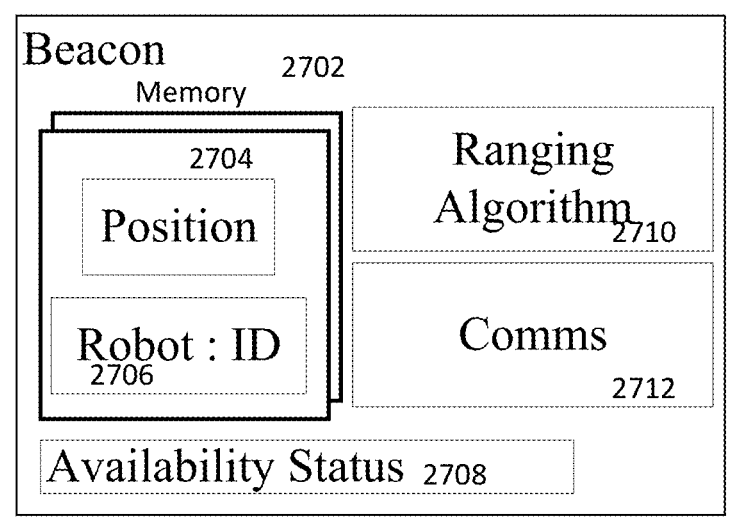
FIG. 27 depicts a beacon used for ranging, according to an aspect of the disclosure.

FIG. 27 depicts a beacon 2700 used for ranging, according to an aspect of the disclosure. The beacon may have a programmable memory 2702 in which a robot can store a landmark's position 2704 (e.g., a position with respect to the base station, an absolute position, etc.) and the ID of the robot 2706 that programmed the position. The beacon may also have an availability status 2708, which can be set/reset via the communication link to let other robots know whether the beacon is being used, or whether the beacon has been released from use. Beacons that are released by a robot can be used by other robots. In a scenario where neighboring robots are out of communication range or damaged, a single robot may be localized accurately if it carries a minimum of four anchors and deploys them properly. The beacon may include one or more processors that are configured to control various elements of the beacon including, but not limited to, the memory and a communications module. The one or more processors serves may be configured to carry out one or more ranging algorithms 2710. The beacon 2702 may include one or more communication modules 2712, which may comprise one or more antennas, one or more transmitters, one or more transceivers, one or more baseband modems, or any combination thereof.

The following describes a manner in which the beacons may be used according to an aspect of the disclosure. During a robot mission, communication between the robot and a base station or ground station may become poor. This may occur, for example, if the robot travels into an area into which certain positioning signals (e.g., GPS signals) may not extend. This could be, for example, the inside of the building, the inside of a cave, underground, or otherwise. In the event that the communication between the robot and the base station or ground station becomes poor or lost, but the robot's position is still known to an acceptable degree of accuracy (e.g. based on sensor fusion), the robot may drop a beacon that has been programmed with the known position. According to one aspect, an appropriate place to drop an anchor satisfies the following criteria: (i) it provides maximum communications coverage, and (ii) there is no line of sight to another localization signal source.

Figure 28:
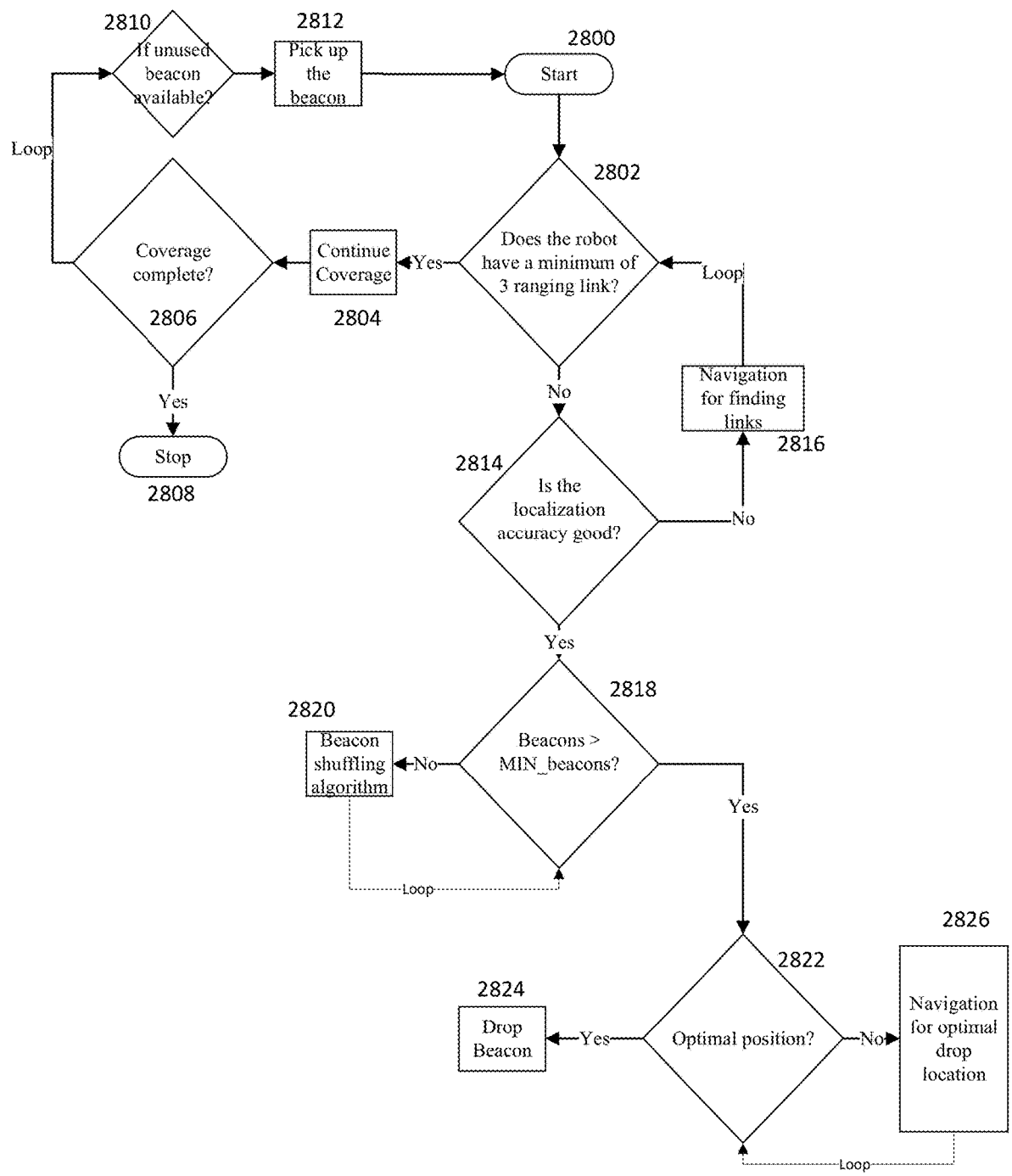
FIG. 28 shows a landmark-tagging scheme according to an aspect of the disclosure.

FIG. 28 shows a landmark-tagging scheme according to an aspect of the disclosure. Once the scheme is initialized 2800, the robot determines whether it has a minimum of three ranging links 2802. If at least three minimum ranging links are present, it will continue its mission 2804. Once the mission is complete, 2806, the robot will stop and cease to attempt placing beacons 2808. If however, the coverage is not yet complete, the robot may verify whether any unused beacons are available (i.e., if the robot encounters an unused beacon) 2810. If a beacon is available and unused the robot may pick up the beacon 2812, and the process continues in a loop fashion. If in step 2802, the robot determines that it does not have a minimum of at least three ranging lengths, then the robot will evaluate the localization accuracy 2814. If the localization accuracy is insufficient, then the robot may employ one or more navigation strategies for finding additional links for localization 2816. If, however, in step 2814, the robot decides that the localization accuracy is satisfactory, then it must evaluate whether the number of beacons with the robot is greater than a predefined minimum number of beacons 2818. If not, the robot may employ a beacon-shuffling algorithm 2820. If the number of beacons is greater than the minimum number of beacons in step 2818, then the robot may evaluate whether it is at an optimal position for dropping a beacon 2822. If the position is optimal, the robot may drop a beacon 2824. If the position is not optimal for beacon drop, the robot may navigate to an optimal drop location 2826.

For an anchor drop: the robot may check whether there are any landmarks to localize with (at-least three robots and/or anchors are required in order to provide the desired localization accuracy). If these landmarks are available, the robot may continue with its mission without performing an anchor drop. If fewer than three robots are anchors are present for localization, the robot may checks its localization accuracy. If the localization accuracy is sufficient, the robot may check whether it has anchors to deploy. If anchors are available, the robot may check whether the current location satisfies the necessary communication requirements. If so, the robot drops the anchors and the landmark is tagged.

For anchor shuffling: In the case where a robot has the minimum number of anchors and wants to deploy more, it enters the shuffle mode where it tries to pick up more anchors with which it can range.

For robot recovery: If there are insufficient anchors to determine a robot's position with good accuracy, and the robot's localization confidence is poor, the robot can be understood to have entered a "lost scenario". The robot has to intelligently back track based on its previous moves and try to find another robot or anchor to range with. Every motion the robot makes in the attempt to find another robot or anchor to range with will increase localization uncertainty.

Figure 29:
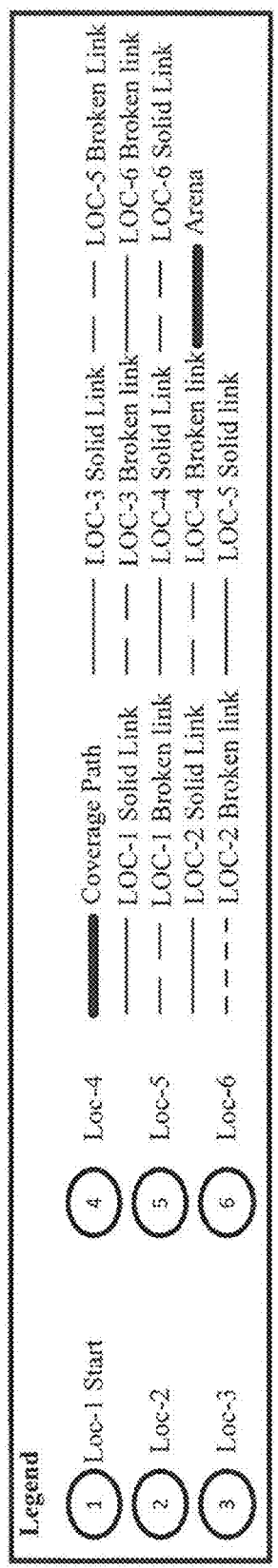
FIG. 29 depicts an exemplary situation of the procedures described above.
Figure 29:
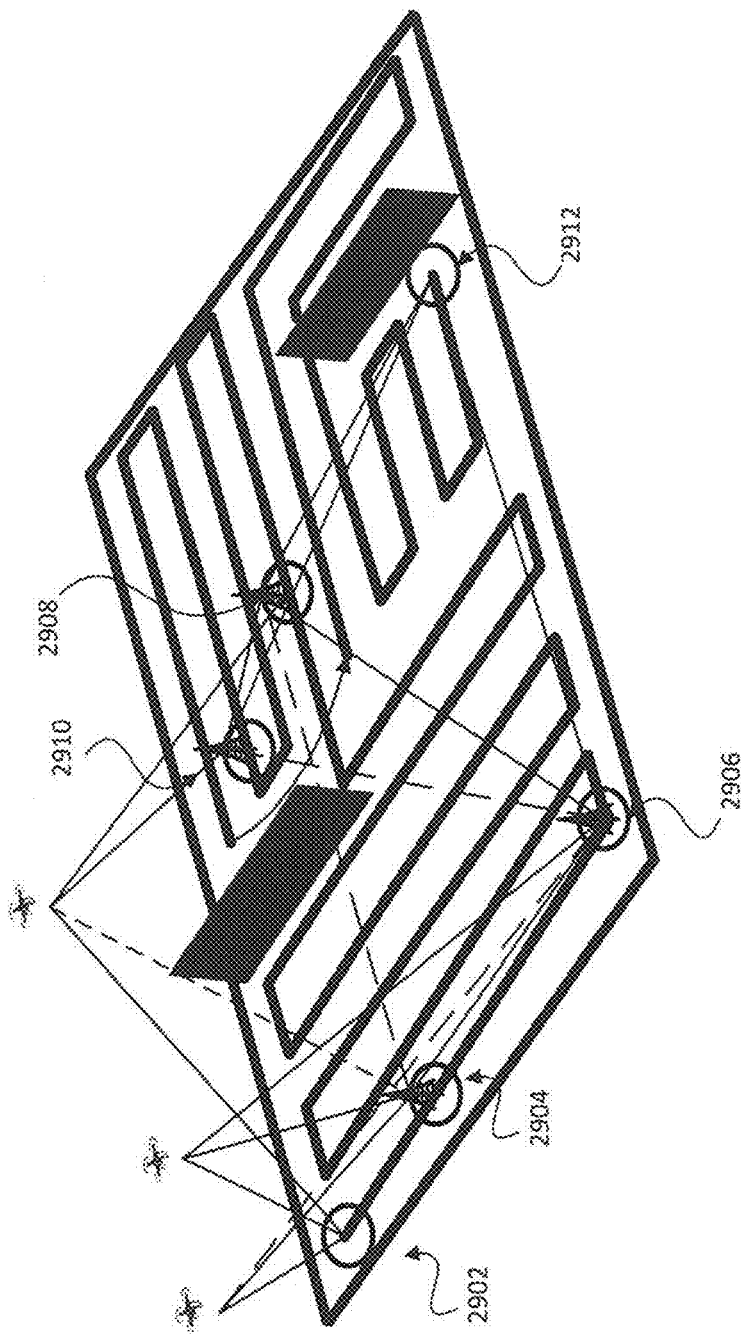

FIG. 29 depicts an exemplary situation of the procedures described above. In FIG. 29, a ground robot and three UAVs are deployed in the same area location. The UAVs are on a mission outside the building, and the task assigned to the ground robot is to cover a specific room. UAVs may have a secondary layer capability such as GPS, vison, etc. They may be self-sufficient and do not need other agents for localization. The ground robot may from location 1 and may finish covering the room at location 6. At location 1 2902 the ground robot connected with three UAVs as shown via the robot-to-robot links. As the ground robot moved to location 2 2904, one of the three robot-to-robot links failed. At this point, the robot had good localization accuracy. Based on the flow chart shown in FIG. 1, the ground robot should check whether it is a good location in which to drop an anchor. Since there are no anchors available in the area, and the robot has a sufficient number of anchors, the robot may stop and deploy an anchor. The robot may continue to navigate further and experience a similar situation at location 3 2906. From location 2 2906 to location 3 2906, the robot established two robot-to-robot links and one anchor-to-robot link. However, at location 3 2906, another robot-to-robot link failed. From Location 3 2906, however, the robot can establish a link to beacon 2908, to an entity at Location 6 2912, but not to beacon 2910. According to FIG. 28, the robot may deploy another beacon in location 3 2906. This may be repeated until the entire area is covered. If a robot does not have the minimum number of anchors to proceed, the robot may engage in the shuffling algorithm and pick up anchors that are not currently participating in the localization process. With these capabilities, the robot may be self-sufficient and can perform navigation without any external help.

In the case of a multi-robot scenario, the other robots can collaboratively use anchors and engage anchors that other robots have deployed based on a robot's own anchor count. The collaborative algorithm can make sure all the robots have sufficient number of anchors to complete their missions.

Figure 30:
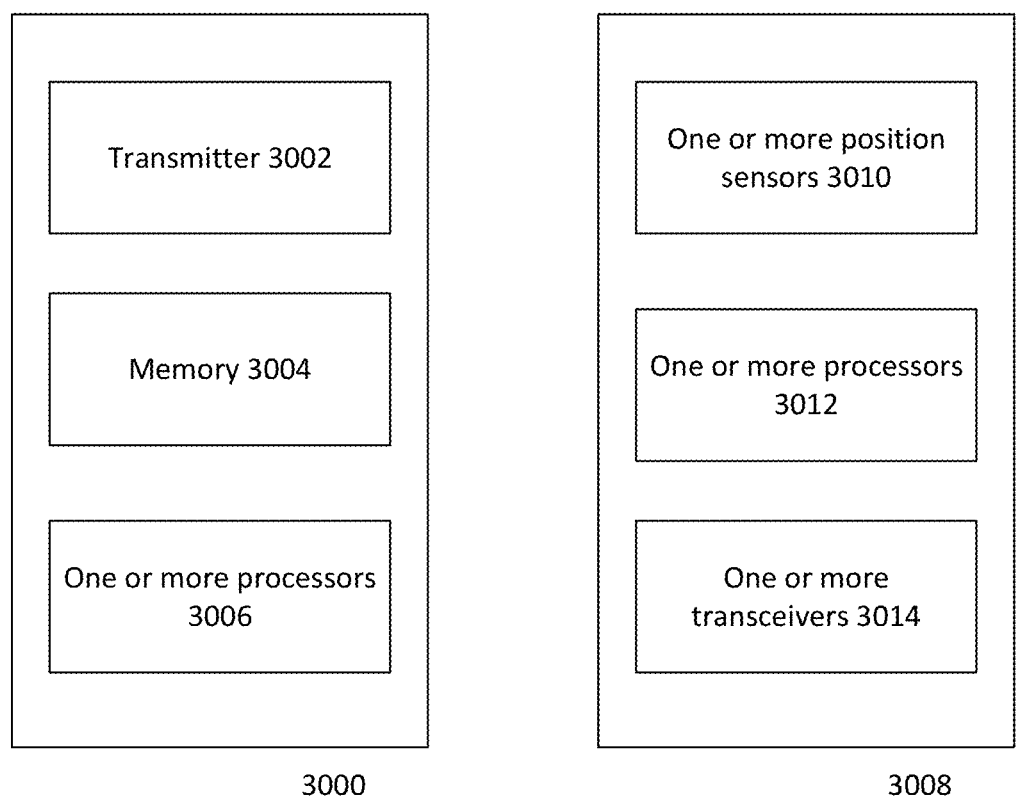
FIG. 30 shows an autonomous agent localization system.

FIG. 30 shows an autonomous agent localization system comprising one or more localization beacons 3000, each comprising a transmitter 3002; a memory 3004; and one or more processors 3006, configured to store in the memory data representing a position of an autonomous agent; and to control the transmitter to transmit a signal representing the stored data; and an autonomous agent 3008, comprising one or more position sensors 3010, configured to receive position sensor data; one or more processors 3012, configured to determine a first position of the autonomous agent using the received position sensor data; send data representing the first position to a first localization beacon of the one or more localization beacons; and send a placement instruction, configured to case the first location beacon to be placed at the determined first position. The autonomous agent may be further configured with one or more transceivers 3014, configured to send and/or receive a wireless signal representing a localization transmission.

Figure 31:
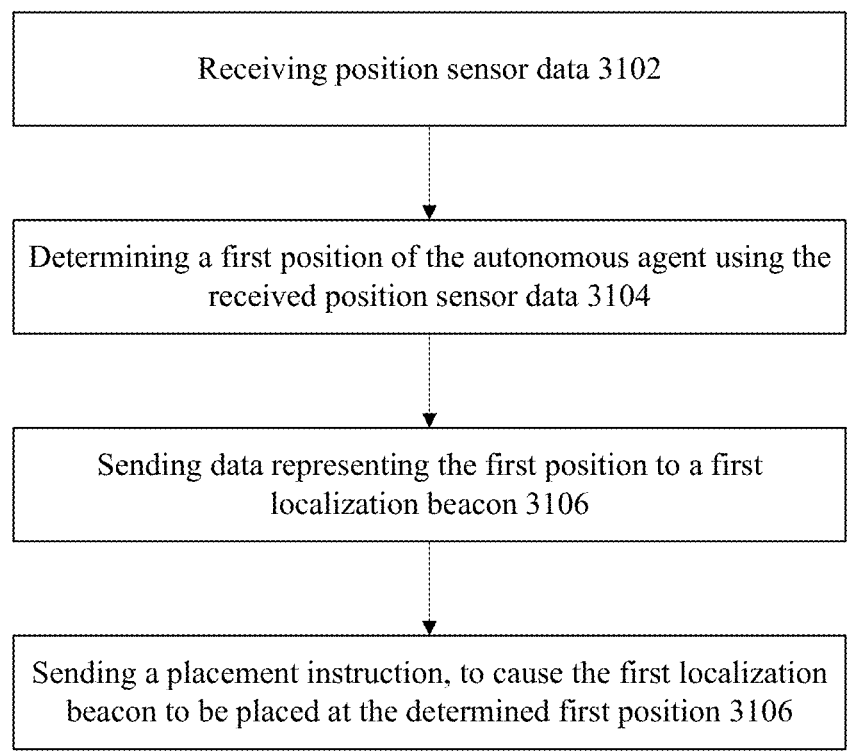
FIG. 31 shows a method of autonomous agent localization.

FIG. 31 shows a method of autonomous agent localization comprising receiving position sensor data 3102; determining a first position of the autonomous agent using the received position sensor data 3104; sending data representing the first position to a first localization beacon 3106; and sending a placement instruction, to cause the first localization beacon to be placed at the determined first position 3106.

Prior to dropping a beacon, an agent may store a position on the beacon. That is, the beacon may be configured with a memory, configured to store position information. The beacon may have an interface with which to transfer the position information from an agent to the beacon, whether via one or more wires, and inductive connection, a capacitive connection, a wireless connection according to a radio access technology, or any other type of connection. The transferred position information may be a position information derived from one or more position sensors according to a position system, a position derived from one or more transceivers as triangulated in a radio access technology, a combination of any of these methods, or through any other means whatsoever. According to an aspect of the disclosure, the position information stored on the beacon may correspond with a position that is dead-reckoned after losing connection to it and outside positioning system. However the position is derived, the best-known position corresponding to the agent may be stored on the beacon. The beacon may then be configured to transmit this stored position as described herein.

The transmission of the stored position via the beacon may be performed via any known transmission means, without limitation. The transmission may be according to a global positioning system protocol or any other positioning system protocol, according to a radio access technology (e.g., 3G, LTE, 5G, Wi-Fi, etc.) or any other method. The autonomous agent may be configured with a transceiver or other sensor configured to receive transmissions of stored locations from one or more beacons. Using the transmitted locations from the beacons, the agent may be configured to derive its own position. The agent may derive its own position using only the transmitted positions for the beacons, using a combination of transmitted positions from the beacons with position sensor information, or otherwise.

As the autonomous agent is traveling, it may encounter areas in which it is unable to localize itself or otherwise detect its position via a traditional positioning method, such as global positioning system, or otherwise. In this case, the autonomous agent may detect its position using one or more beacons that have been deposited by one or more other agents. If no position can be detected (i.e., insufficient beacons have been laid), the agent may lay its own beacon, the signal of which may be subsequently used for positioning.

The agent may be triggered by any number of factors to place a beacon with a current position. The factors may be selected based on the given implementation. For example, the agent may be configured to place a beacon with the current position if a reliability of the current position falls beneath the predetermined threshold or if the reliability of position sensor information falls beneath a predetermined threshold.

The autonomous agent may utilize position sensors comprising Global Positioning System sensors, one or more accelerometers, one or more magnetic field sensors, one or more internal measurement unit (IMU) sensors, or any combination thereof. The autonomous agent may determine its first position is determined using data from one or more Global Positioning System sensors, and data from at least one of one or more accelerometers, one or more magnetic field sensors, and/or one or more internal measurement unit (IMU) sensors.

According to a fifth aspect of the disclosure, aside from positioning or localization in the sense of obtaining a position of an object relative to a reference point, it may be desired to determine object orientation (e.g., heading, whether two dimensionally or three dimensionally). Such object-orientation information may be critically important, e.g., in applications related to automated docking/landing/aerial refueling and otherwise.

ToF is a known calculation that is used in wireless communication, typically to approximate distances between a transmitter and a receiver. Because wireless electromagnetic signals travel at the speed of light, ToF is used to approximate distances between the two devices using a measured ToF value and the known constant for the speed of light. Assuming multiple antennas (i.e., at least three antennas) on each of the two devices, and assuming some information about the placement of each antenna on a given device with respect to one another, ToF may be used to determine not only distance, but also orientation. The principles described herein use ToF ranging along with carefully prescribed antenna placement (e.g., the transmit and receive antennas form a "rigid graph") to accurately calculate as much as Six Degrees of Freedom (6DOF) positioning data.

Conventional attempts at using various sensor information to obtain 6DOF information have proved challenging. For example, 6DOF information may be obtained in radar only if both nodes take radar measurements and then share their data with each other over a communications channel. LED (or other active, light-emitting) markers of some sort may provide 6DOF information when viewed with multiple cameras. Quick Response (QR) codes or some similarly distinct, but static, markers may provide 6DOF information viewed with multiple cameras. Notably, each of these methods requires advanced signal (in particular, image) processing, which may tax the computational resources of the nodes, as well as a side channel for communication of the observed data. In addition, the camera-based methods are unreliable when visibility is less than perfect (e.g., in sun, glare, fog, snow, or rain; and when dirt is present on cameras, etc.). The proposed solution relies on ToF measurements and is consequently immune to problems associated with diminished visibility and thus substantially more robust than other methods under certain circumstances. Computationally, ToF orientation information may be obtained using least-squares analysis and thus may be rapidly computed and is robust to noisy input data. Moreover, since this solution does not require expensive cameras, it is lower in cost. Since it requires no lights or other markers on the nodes, it is also less "bulky".

As ToF calculations require wireless communication, each node may be configured with a transceiver and one or more processors that are configured to control the transceiver to perform wireless communication according to a wireless communication protocol. Any wireless communication protocol capable of carrying out a ToF communication and performing ToF measurements may be utilized. According to one aspect, the wireless communications protocol may be a Wi-Fi protocol.

Each object for ToF measurement must be equipped with multiple antennas, which are placed on each node in positions that form a rigid graph over the space where ToF measurements are to be made. The rigid graph may be understood as an embedding of a graph in a Euclidean space that is structurally rigid. That is, if the points on the graph were connected by rods and the vertices by flexible hinges, the resulting structure would be rigid. Otherwise stated, the antenna arrangement may form a rigid graph if continuous motion of the points of the antenna configuration maintain distance-preserving constraints within the Euclidian space. For example, if only two antennas are placed on each of two different mobile nodes that move in 2D space (e.g. surface watercraft), they will not form to a rigid graph and, therefore, these nodes will not be able to determine a unique solution to their relative positions/orientations. However, if they are given three antennas each, and as long as these antennas are not collinear, their relative positions/orientations can be determined uniquely.

As an extension of this principle, if the mobile nodes move in 3D space (e.g. an aircraft), they each need to be equipped with enough antennas to form a rigid graph. Furthermore, fewer than all of the antennas may be coplanar, if the nodes are to determine their relative positions and orientations uniquely.

Figure 32:
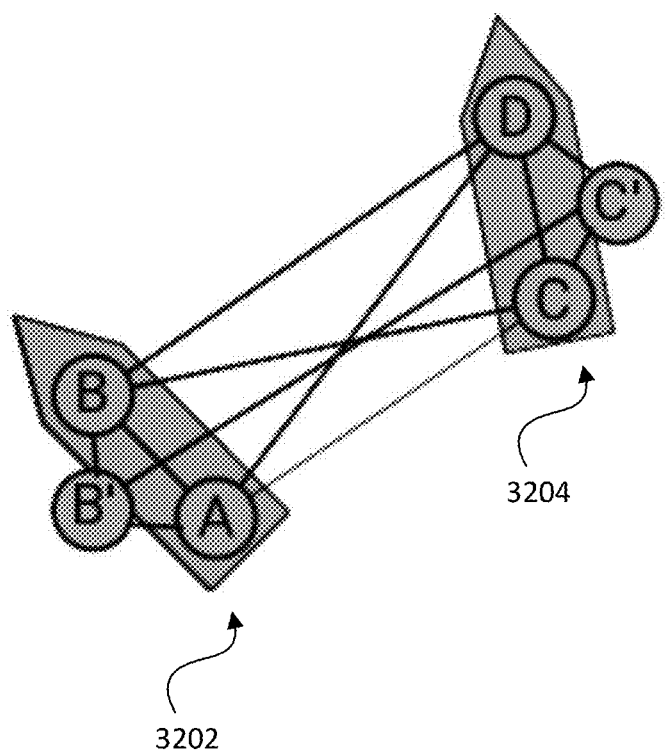
FIG. 32 depicts two watercraft vessels configured with three non-collinear antennas for Time of Flight (ToF) calculation.

FIG. 32 depicts two watercraft vessels 3202 and 3204, each configured with three non-collinear antennas (3202: A, B and B', and 3204: C, D, and C') for ToF calculation. Such calculation requires an intra-vessel measurement regarding the relative positions of each antenna on the vessel with respect to one another, and an inter-vessel measurement regarding calculations of the antennas on one vessel with respect to antennas on another vessel. With respect to the intra-vessel measurement, this may be achieved using one of at least two methods. First, if the relative distances of the antennas of a vessel to one another are known (i.e. through a placement at a known location, through physical measurement, etc.), this will suffice. If the relative distances of the antennas of a vessel to one another are not known, then the intra-vessel measurement may be satisfied by performing a ToF transmission and calculation between each of the at least three antennas on the vessel. With this information, an approximate distance between the antennas may be determined. With approximate distances, and given at least three antennas placed in a rigid graph formation, the antenna arrangement of the vessel may be determined.

Assuming that the antenna arrangements of each vessel are determined (whether through prior knowledge of the arrangement, prior knowledge of the distances between the antennas, or ToF measurements between the antennas), the second step is for ToF measurements to be performed between each antenna of a first vessel and each antenna of a second vessel (i.e. inter-vessel measurement). Assuming three antennas per vessel, each antenna of the first vessel will be associated with a measurement to each of the three antennas on the second vessel, and vice versa. Using a least-squares algorithm, the positions of the antennas relative to one another may be determined. In so determining, the orientations of the vehicles relative to one another may also be determined.

For the calculations, the mobile node may create a system of equations that represents the relationships between the measured inter-antenna distances and the unknown position coordinates <X, Y, Z> and orientation angles <a, b, c> of the other mobile node. Although this set of equations will rarely have an exact solution due to measurement errors, it can generally be solved in a leased-squares fashion. The least-squares method is a type of regression analysis that may be used to approximate solutions in set of equations for which there are more equations than unknowns. By implementing a least-squares analysis, a best fit for available data is determined such that a sum of squared residuals is minimized. Because a person skilled in the art will understand the implementation of a least-squares method and how to implement it for the principles and methods described, the details of a least-squares implementation will not be provided herein.

Figure 33:
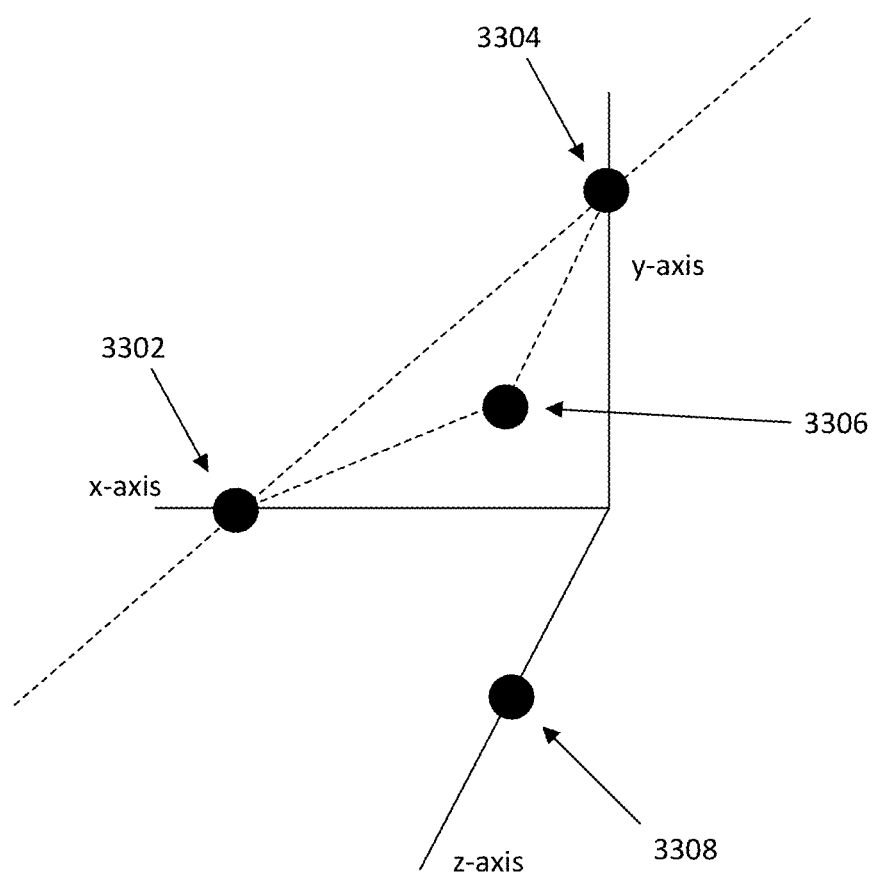
FIG. 33 depicts an antenna placement for a three-dimensional ToF-based orientation calculation.

FIG. 33 depicts an antenna placement for a three-dimensional ToF-based orientation calculation. The above example, as shown in FIG. 32, utilizes three non-collinear antennas to calculate a two-dimensional orientation. In that case, the three non-collinear antennas are placed within a single plane. By adding a fourth, non-coplanar antenna, a three-dimensional calculation may also be achieved. In this figure, the three non-collinear antennas from the two-dimensional method are shown as 3302 along the x-axis, 3304 along the y-axis, and a non-co-linear antenna 3306. In this case, a fourth antenna 3308 is also added. The fourth antenna 3308 may be located along a z-axis and thereby not coplanar with the remaining three antennas. Such an antenna arrangement may be desired in situations wherein the vehicle travels within three dimensions, such as an aircraft. In this manner, each of two vehicles (e.g., each of two aircraft) are equipped with at least four antennas as described above. An intra-vehicle measurement (whether based on knowledge of the relative distances between the antennas or ToF measurements among the antennas of the vehicle) is required to determine relative distances and thus configurations of the antennas, and an inter-vehicle measurement between each antenna of one vehicle and all other antennas of the other vehicle to determine relative distances between antennas of the two different vehicles. As described above, and using a least-squares method, a unique solution between the antennas of each vehicle may be obtained. Based on this unique solution, a relative orientation of one vehicle to another can be identified.

As an optional conformational step, once a solution is obtained, the mobile nodes may share and compare their estimates of each other's position coordinates <X, Y, Z> and orientation angles <a,b,c>. If the calculated 6DOF positions do not agree within a reasonable error tolerance, the nodes may choose to discard the 6DOF calculations and start again. Whether to perform this additional conformational step and, if so, the degree of acceptable error tolerance may be a matter of preference, said variables being selected based on any of accuracy requirements, computational capacity, or otherwise.

Once the orientation of the vessels with respect to one another is determined, the procedures described herein may be repeated as desired. It is anticipated that the positions of the vessels may not remain static, and as such, repeated performance of the methods and principles described herein may provide up-to-date orientation calculations. These procedures may be repeated at any given period or frequency.

Some wireless communication protocols include cryptographic authentication of packets for additional security. If such cryptographic authentication of packets exists (e.g., when using Wi-Fi), such encryption may be used when exchanging position/angle estimates. With this added security measure, and even if an attacker could affect the ToF measurements, the attacker would be unlikely to be able to circumvent the verification procedure. This makes any attack (except for denial of service) significantly more difficult to implement. This sort of security is not easily achievable with other systems, and may be impossible in the case of camera-based systems relying on static markings painted on the mobile agents.

Figure 34:
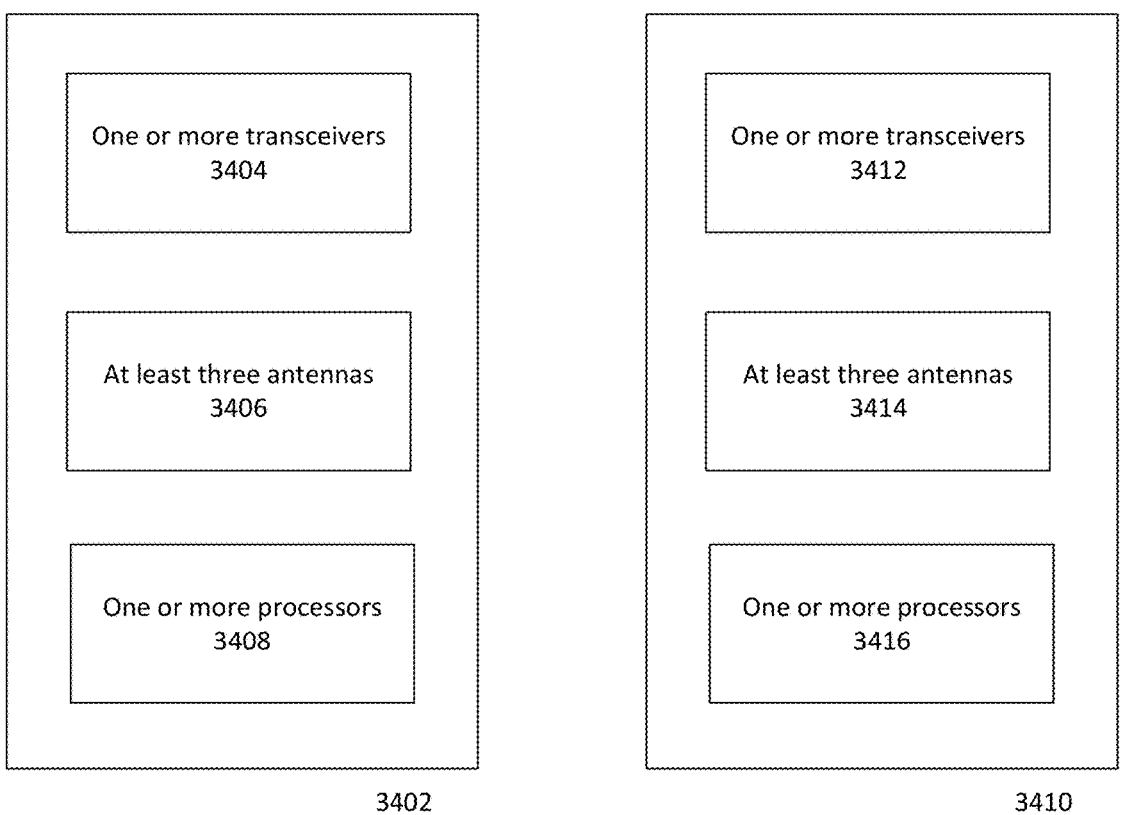
FIG. 34 shows a ToF system.

FIG. 34 shows a ToF system configured to perform the methods and principles described herein comprising a first vehicle 3402, the first vehicle comprising one or more transceivers 3404, configured to send and receive wireless signals; at least three antennas 3406, placed non-collinearly with respect to one another, each of the at least three antennas connected to a transceiver of the one or more transceivers; and one or more processors 3408; and a second vehicle 3410, comprising one or more transceivers 3412, configured to send and receive wireless signals; at least three antennas 3414, placed non-collinearly with respect to one another, each of the at least three antennas connected to a transceiver of the one or more transceivers; and one or more processors 3416; wherein the one or more processors of the second vehicle are configured to cause the one or more transceivers of the second vehicle to send a first wireless signal; wherein the one or more processors of the first vehicle are configured to determine first ToF measurements between each of the at least three antennas of the first vehicle and at least one of the at least three antennas of the second vehicle based on the first wireless signal; and determine from the first ToF measurements and an arrangement information of the at least three antennas relative to one another, a first position and a first orientation of the at least three antennas of the first vehicle relative to at least one of the at least three antennas of the second vehicle.

It is axiomatic that the procedure described above with respect to the one or more processors of the first vehicle relative to the second vehicle may also be performed via one or more processors of the second vehicle relative to the first vehicle. More specifically, the one or more processors of the first vehicle may be configured to cause the one or more transceivers of the first vehicle to send a first wireless signal; wherein the one or more processors of the second vehicle may be configured to determine first ToF measurements between each of the at least three antennas of the second vehicle and at least one of the at least three antennas of the first vehicle based on the first wireless signal; and determine from the first ToF measurements and an arrangement information of the at least three antennas relative to one another, a first position and a first orientation of the at least three antennas of the second vehicle relative to at least one of the at least three antennas of the first vehicle.

The procedures described above relative to the one or more processors of the first vehicle and the one or more processors of the second vehicle may be performed multiple times. The number of times that these procedures must be performed may be determined by a degree of synchronization between the one or more processors of the first vehicle and the one or more processors of the second vehicle. Unless a high degree of synchronization is present, multiple ToF measurements may be necessary. In cases of less than ideal synchronization, it may be known to perform three or more ToF measurements.

Figure 35:
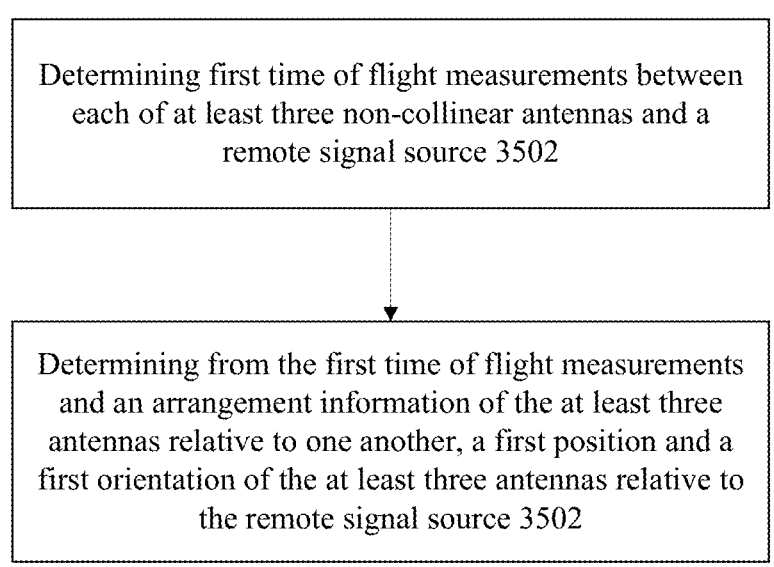
FIG. 35 shows a method of position orientation determination.

FIG. 35 shows a method of position orientation determination comprising determining first ToF measurements between each of at least three non-collinear antennas and a remote signal source 3502; determining from the first ToF measurements and an arrangement information of the at least three antennas relative to one another, a first position and a first orientation of the at least three antennas relative to the remote signal source 3502.

The arrangement information referred to herein may include known distances between the antennas of a vessel (e.g. physical measurements or placement at locations with known distances from one another) or through measurements such as ToF or otherwise.

Although it is anticipated that the ToF transmissions between each of the at least three antennas of a first vehicle and each of the at least three antennas of the second vehicle will allow determination of position and orientation of each vehicle relative to the other vehicle, these results may be verified through a sharing operation. In this case, an additional transmission may occur between the two vehicles in which a first vehicle shares its position and/or orientation information with the second vehicle and the second vehicle shares its position and/or orientation information with the first vehicle. The received position and/or orientation information may be compared to the determined position and/or orientation information to verify the determined results. If the results are similar or are within a reasonable tolerance, the results may be verified. If the results are not within a reasonable tolerance, the results may be rejected. According to one aspect of the reasonable tolerance may be based on any predetermined threshold.

It is anticipated that the results of the procedure described herein will include a position and an orientation of one vehicle with respect to the other vehicle. If one of the two vehicles is aware of its absolute position (i.e., its position relative to the Earth), it may resolve an absolute position of the other vehicle based on the known absolute position and the determined relative position. By determining the absolute position in this manner, or by sharing a known absolute position, the absolute position of both vehicles may be obtained.

Similarly, if one of the vehicles knows its absolute orientation (i.e., its heading, such as a compass heading), the absolute orientation of the other vehicle may be obtained using the known absolute orientation and the relative orientation. By transmitting either the calculated absolute orientation of the other vehicle or the known absolute orientation of the transmitting vehicle, the absolute orientation of both vehicles may be obtained.

The system described herein may comprise one or more transceivers and/or one or more baseband modems. Each vehicle may be configured with one or more processors, which are configured to control the one or more modems and/or the one or more transceivers to transmit and/or receive the ToF signals as described herein. The one or more processors may further be configured to perform the computational calculations, such as the least-squares method computations, to derive the relative position and orientation.

According to an aspect of the disclosure, the relative positions of the vehicles may be determined two-dimensionally, such as along an x-axis and a y-axis. The relative orientation may be expressed as a yaw orientation of one or both vehicles.

According to a sixth aspect of the disclosure, aerial vehicles may use an Instrument Landing System (ILS) to assist in landing, such as in the automated landing of fixed-wing aircraft. In ILS, wireless signals may be transmitted in overlapping lobes or transmission regions, and a quality of the signals, i.e., the relative signal strength of the overlapping signals, may be used to guide an aircraft into a desired landing position. Such signals, however, are unsecure and may require a substantial buffer area without interference.

ILS is used at least for the automated landing of fixed-wing aircraft. A basic principle of ILS is to use analog radio signals to guide fixed-wing aircraft during a landing procedure. These analog transmissions are currently not secure and carry no payload. The human pilot is expected to confirm that the landing area is valid by visual observation. ILS systems are traditionally susceptible to signal interference and require a significant critical area in which unnecessary transmissions and even physical obstacles (i.e., buildings, vehicles, or even people) are ideally avoided. This critical area is inconvenient or unworkable for various applications. Moreover, ILS's requirement of human verification is unworkable in the context of unmanned vehicles.

In contrast to ILS, existing wireless technology (e.g. Wi-Fi) contains robust, built-in security mechanisms and is adapt at delivering and receiving transmissions even when interfering signals are present. By using such wireless technology, ILS systems could be improved to offer increased security and diminish the requirement for a critical area.

The following describes a secure ILS procedure that enables unmanned aircraft to use an ILS system. First, ILS systems may use encrypted radio signals (e.g., Wi-Fi) instead of the conventional FM signals used in current ILS installations. Second, power measurements from these encrypted radio signals can be used to perform actual flight path determination. Third, the encrypted radio signals can be decoded to authenticate the source. Conversely, and if decoding fails, the landing can be aborted. Unlike current ILS, which relies on frequency multiplexing, methods and procedures described herein utilize scheduling of ILS transmissions to ensure landing accuracy.

In a conventional ILS installation, multiple directional antennas are placed along a landing strip. When an aircraft approaches for landing, these antennas transmit predetermined signals, which are frequency modulated. The aircraft measures the received signal strengths of the transmissions from all of the antennas, and based on these measurements, the aircraft may determine its deviation from the correct flight path. As a simplistic example, assume two antennas are placed toward the end of a landing strip, along an axis perpendicular to the landing strip's longitudinal axis, each antenna being an equal distance from the longitudinal axis such that the longitudinal axis is between the two antennas. The antennas may be configured such that the signals from the antennas overlap, with an area of overlap being along the longitudinal axis of the landing strip. Theoretically, the received signal strength of the left antenna and the right antenna will be equal when an aircraft is flying along the longitudinal axis of the landing strip. If an incoming aircraft determines that one receive signal strength is stronger than the other, the aircraft may assume that it has traveled away from the longitudinal axis toward the side corresponding to the antenna with the stronger signal strength. The aircraft must correct its course by travelling toward the antenna with the weaker signal strength, such that it re-approaches the longitudinal axis of the landing strip. A similar technique can also be used for vertical alignment.

Conventional ILS multiplexes antenna transmissions across different frequencies so that all antennas can transmit simultaneously. This is important in conventional applications, since any delay in transmission time will result in a change in the aircraft's location, which in turn will alter the received signal strength, which can lead to errors in location estimation. However, if antenna transmissions are multiplexed across time quickly enough, (i.e. before the aircraft has moved far enough to cause a noticeable change in signal strength), then time division multiplexing can be used as well.

Many current wireless technologies utilize a time-multiplexed scheme that is rapid enough to provide time multiplexed signals without a meaningful change in aircraft position between the time-multiplexed transmissions. For example, for an ILS that uses four Wi-Fi ground antennas to guide UAVs to the landing area, the multiplexing period would be approximately 500 µs. For a UAV approaching at a speed of 10 m/s, this delay between the first and last antenna's transmission would result in a difference in the UAV's location of about 0.5 cm, which is negligible with respect to signal power. Thus for the average UAV, Wi-Fi can be used in standard TDMA mode while still providing timely antenna signal strength measurements.

Figure 36A:
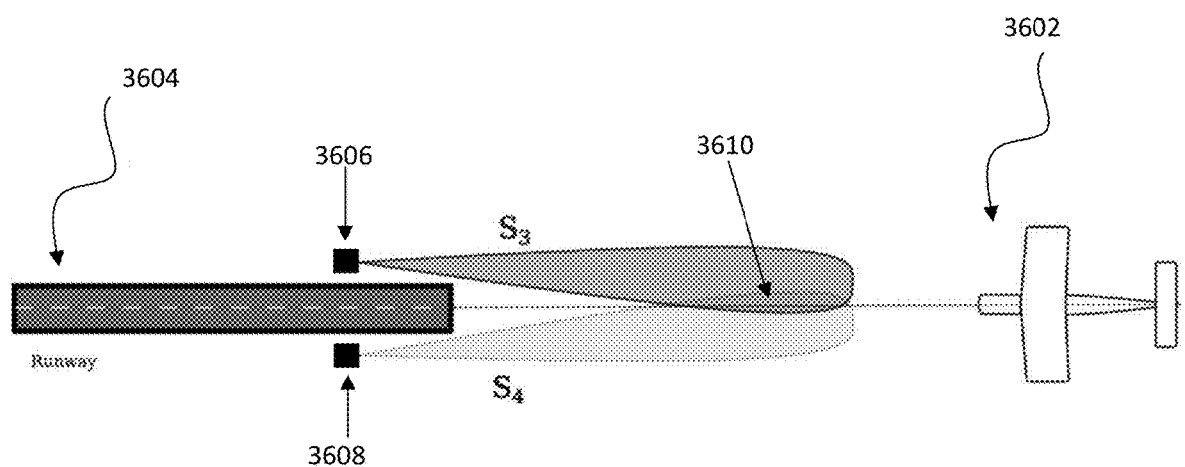
FIG. 36A shows an implementation of a landing assistance technology for horizontal localization.

FIG. 36A shows an implementation of a landing assistance technology for horizontal localization using time multiplexed signals according to an aspect of the disclosure. Aircraft 3602 is approaching landing strip 3604. On the sides of landing strip 3604 are two beacons; beacon one 3606 and beacon two 3608. The signals projected from these beacons overlap at an overlapping region 3610, which corresponds to a horizontal element of an ideal flight path for approaching the runway 3604. As the aircraft 3602 enters the overlapping region 3610, the aircraft 3602 will receive signals from both beacon one 3606 and beacon two 3608. The aircraft 3602 will measure the receive signal strength of the signal from beacon one 3606 and the signal from beacon two 3608. Ideally, the received signal strengths from these beacons should be equal. If the receive signal strength of one of beacon one 3606 or beacon two 3608 is greater than that of the other beacon, the aircraft 3602 must create a trajectory adjustment to move toward the beacon with the lower signal strength. In this manner, the aircraft 3602 may horizontally localize itself with respect to the ideal trajectory for landing on the landing strip.

Figure 36B:
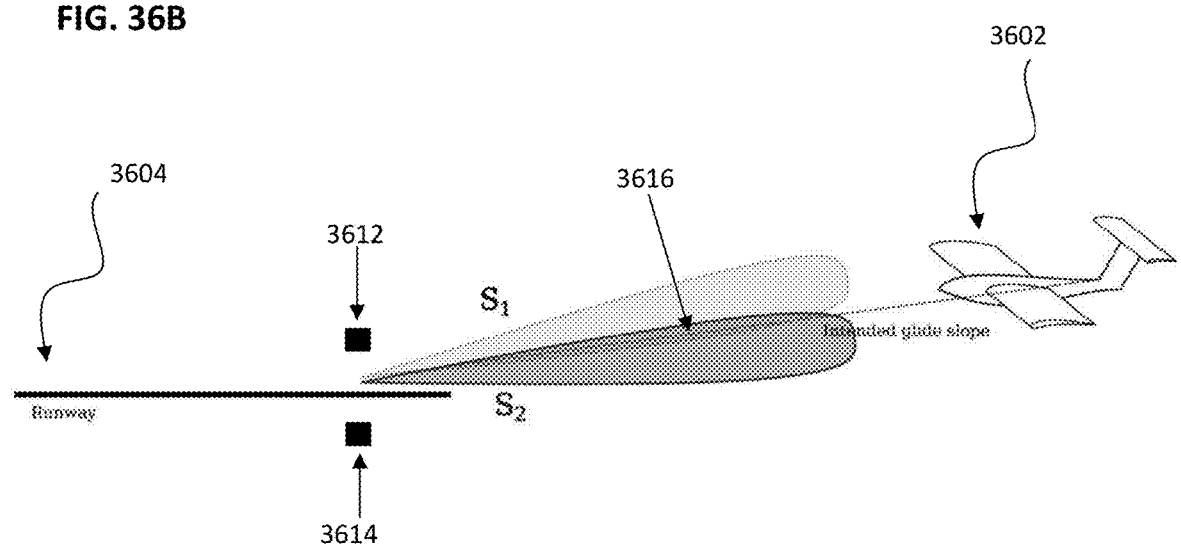
FIG. 36B shows an implementation of a landing assistance technology for vertical localization.

This procedure may also be carried out with respect to vertical localization, as depicted in FIG. 36B. In this example, the aircraft 3602 is approaching the landing strip 3604. Two beacons, beacon three 3612 and beacon four 3614 are transmitting signals into a higher lobe and lower lobe, respectively, that overlap at overlapping region 3616. Overlapping region 3616 corresponds to an ideal vertical element of a flight path for approaching the runway 3604. As the aircraft 3602 enters the overlapping region 3616, the aircraft 3602 measures the received signal strengths from beacon three 3612 and beacon four 3614. If the signal strengths are equal, the aircraft 3602 may assume that it is operating in the correct flight path. If the signal strength of one of beacon three 3612 or beacon four 3614 is stronger than the other, then the aircraft 3602 may adjust its flight trajectory to travel toward the beacon with the weaker signal strength. In this manner, the aircraft 3602 may correct its flight trajectory to reach or approximate the ideal trajectory for approaching the runway 3604.

Figure 37:
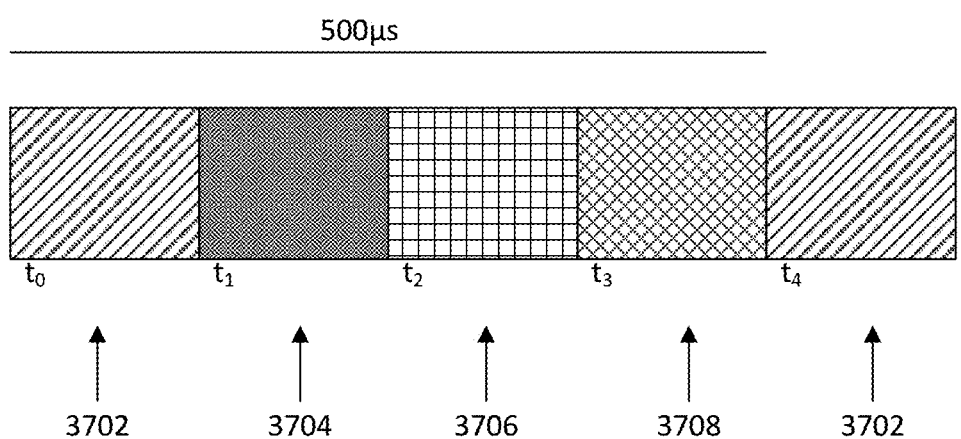
FIG. 37 shows a time multiplexing scheme for a sample four-antenna system.

FIG. 37 shows a time multiplexing scheme for a sample four-antenna system. In this case, a first transmission time corresponding to beacon one is depicted at 3702; a second transmission time corresponding to beacon two is depicted at 3704; a third transmission time corresponding to beacon three is depicted at 3706; a fourth transmission time corresponding to beacon four is depicted at 3708. The transmissions may occur on any schedule as desired for a given implementation. In this particular implementation, the transmissions of each of the four beacons are scheduled to repeat after completion of the first four transmissions, such that the transmission of beacon number one repeats at $t_4$, or every for transmission blocks. As described above, the elapsed time between $t_0$ and $t_4$ may be approximately 500 µs.

Assuming the use of TDMA Wi-Fi transmissions to guide UAVs to their landing site, the landing procedure according to an aspect of the disclosure may be as follows. First, ensure that all ILS antenna transmissions are heard with sufficient signal quality so that the authenticity of the transmitted packets can be established. Note that authenticity is established using the existing cryptographic protocol of the underlying wireless technology (e.g. WPA2 may be used for Wi-Fi). Second, listen for the reference signals from all of the ILS antennas (S1 through S4) and compute a location-offset vector $v_t$ based on the corresponding measured signal strengths. Third, listen for the next set of reference signals from the ILS antennas and compute the location offset vector $v_{t+1}$. Fifth, compare offset vectors $v_t$ and $v_{t+1}$. If they are sufficiently close, i.e. if their difference can be explained by the current groundspeed of the UAV, make trajectory adjustments based on them and continue landing. If they are not sufficiently similar, discard the measurements and abort landing. The assumption here is that, if the offset vectors are insufficiently close, then the likely explanations would be instrument error or deliberate attack, either of which would likely preclude landing. Finally, let $v_t = v_{t+1}$ and return to the third step.

Theoretically, the necessary corrections could be made even after determining only the first offset vector in step two. In some installations, it may be preferable to perform steps one and two to determine an offset vector, and then to make trajectory adjustments based on the offset vector. At the conclusion of the trajectory adjustment, step two may be repeated in any necessary trajectory adjustments may be made. In this manner, the comparison described in step five may be dispensed with. Although workable without the comparison of step five, the addition of step five allows for a safety check to ensure accuracy and instrumental readings and that the signals use for landing are reasonably reliable as being free from attack.

The proposed protocol of steps one through five ensures that only authenticated landing signals are used to guide the UAV to the runway, thereby reducing the ability for someone to either steal the UAV or cause it to crash. Any attempt to modify the signals would either result in a failure of the cryptographic checks, or would cause sudden changes in the location estimate (in case of multipath).

Figure 38:
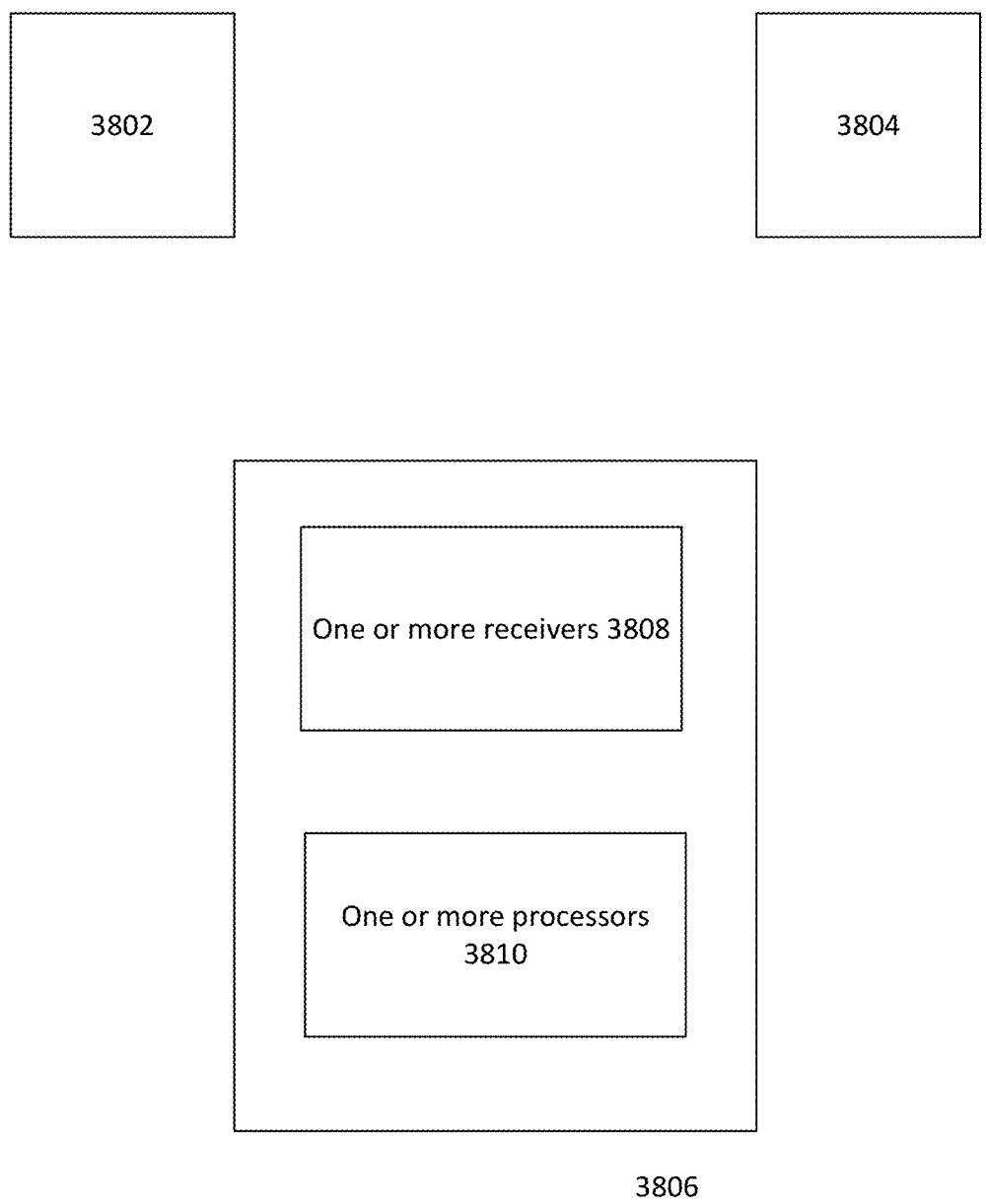
FIG. 38 shows an unmanned aerial vehicle navigation assistance system.

FIG. 38 shows an unmanned aerial vehicle navigation assistance system, comprising a first transmission station 3802 configured to transmit a first wireless signal representing a first identifier associated with the first transmission station into a first space region; a second transmission station 3804 configured to transmit a second wireless signal representing a second identifier associated with the second transmission station into a second space region; wherein the first space region and the second space region at least partially overlap; and an unmanned aerial vehicle 3806 comprising one or more receivers 3808, configured to receive the first wireless signal and the second wireless signal, and one or more processors 3810, configured to determine the first identifier of the first wireless signal and the second identifier of the second wireless signal; detect a first signal quality of the first wireless signal and the second wireless signal during a first sampling time; determine a first location offset from a predetermined trajectory based on the detected first signal quality and at least one of the first identifier or the second identifier; detect a second signal quality of the first wireless signal and the second wireless signal during a second sampling time; determine a second location offset from the predetermined trajectory based on the detected second signal quality and at least one of the first identifier or the second identifier; compare the first location offset to the second location offset; and if a difference between the first location offset and the second location offset is less than a predetermined threshold, control the unmanned aerial vehicle to adjust its trajectory according to at least one of the first location offset or the second location offset.

Figure 39:
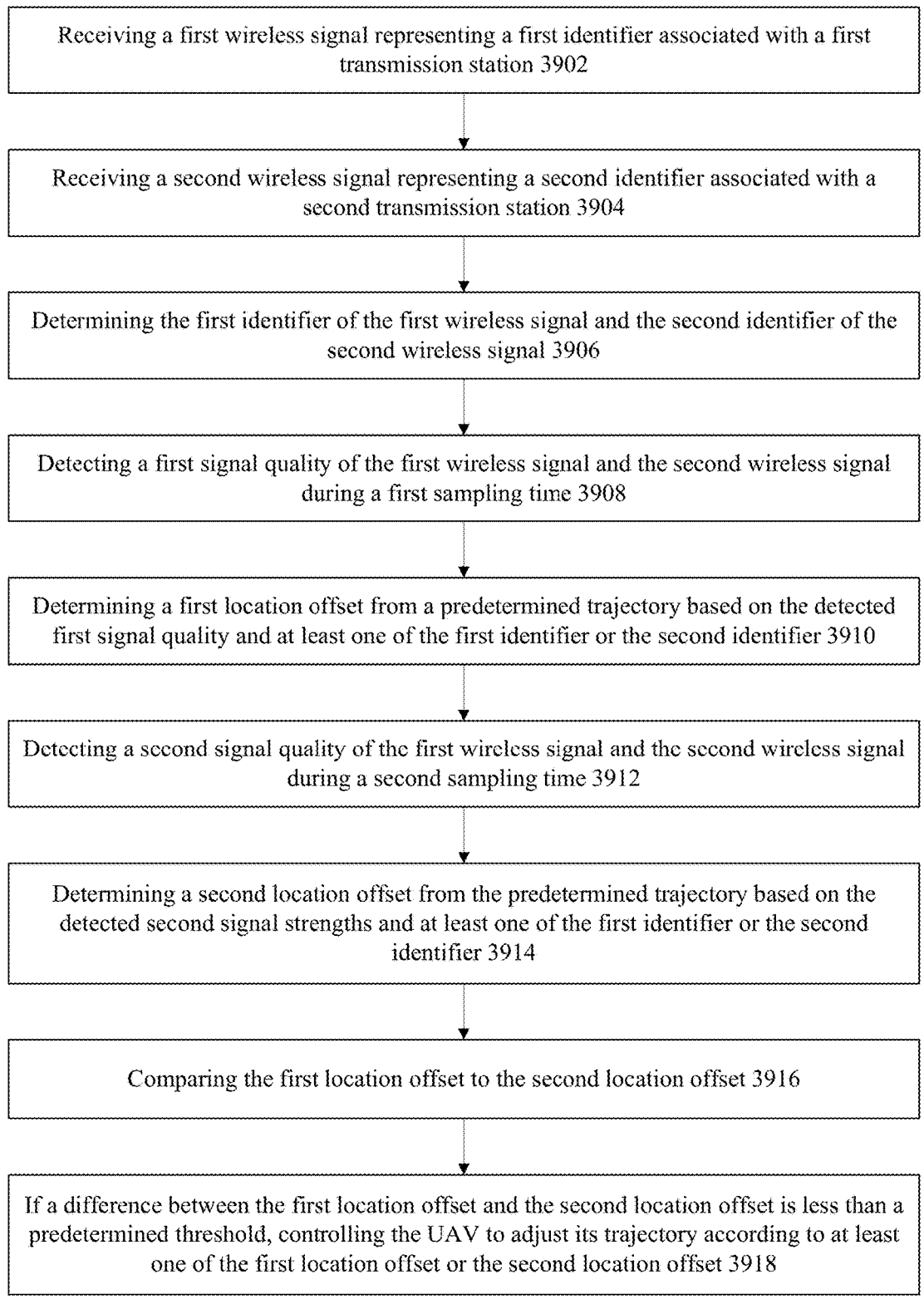
FIG. 39 shows a method of unmanned aerial vehicle navigation.

FIG. 39 shows a method of unmanned aerial vehicle navigation, comprising receiving a first wireless signal representing a first identifier associated with a first transmission station 3902; receiving a second wireless signal representing a second identifier associated with a second transmission station 3904; determining the first identifier of the first wireless signal and the second identifier of the second wireless signal 3906; detecting a first signal quality of the first wireless signal and the second wireless signal during a first sampling time 3908; determining a first location offset from a predetermined trajectory based on the detected first signal quality and at least one of the first identifier or the second identifier 3910; detecting a second signal quality of the first wireless signal and the second wireless signal during a second sampling time 3912; determining a second location offset from the predetermined trajectory based on the detected second signal strengths and at least one of the first identifier or the second identifier 3914; comparing the first location offset to the second location offset 3916; and if a difference between the first location offset and the second location offset is less than a predetermined threshold, controlling the UAV to adjust its trajectory according to at least one of the first location offset or the second location offset 3918.

According to one aspect, the transmitted signals may be time multiplexed. That is, the various transmission stations may be configured to transmit signals one after the other, in a staggered or time-multiplexed manner. By coordinating the transmissions in a time-multiplexed manner, interference of one station created by another station may be minimized or avoided altogether. The time-multiplexed signal transmission, however, is described herein because it is a feature of many wireless transmission protocols (e.g., Wi-Fi). Most such systems that utilize time multiplexing transmit sufficiently quickly that a time difference between receiving signals from the different stations corresponds to only small changes in location of the unmanned vehicle and thus is unlikely to have more than a trivial impact.

Although the use of the multiple stations for navigation assistance of an unmanned vehicle has been described, the methods and principles described herein may also be used for a manned vehicle. That is, the navigation assistance system described herein may also be implemented for use with manned vehicles in much the same way as with unmanned vehicles.

The signals as described herein may be encrypted. The encryption may occur according to any known encryption method, without limitation. For example, and according to one aspect, the unmanned aerial vehicle navigation assistance system may utilize Wi-Fi Protected Access 2 encryption.

The predetermined threshold for first location offset and second location offset may be any threshold whatsoever as selected for the implementation. A purpose in the predetermined threshold may be to create an acceptable tolerance in deviation from measured values. In measuring qualities of received wireless signals, some variation in measurement results may be expected, even where the signal is unchanged. As such, it may be desirable to incorporate a measurement tolerance threshold to permit validation of slightly differing measurement results. It is anticipated that the threshold may be selected to allow results with expected deviations to be verified and to identify results with more than expected deviations, such that said results may be rejected.

According to an aspect of the disclosure, the predetermined threshold may be selected based, at least in part, on a velocity of the landing vehicle. In a time-multiplexed system, or in any system in which to successive signal samples are measured, the landing vehicle will be expected to have changed positions between the first measurement and the second measurement. This positional difference may affect the measurement results. There may be a roughly proportional relationship between the change in position and the change in measurement results, such that larger changes in position are associated with larger changes in measurement results and smaller changes in position are associated with smaller changes in measurement results. As such, a velocity of the vehicle during signal quality measurement may directly affect the disparity of measurement results. Accordingly, the predetermined threshold for comparison of the first location offset and the second location offset may be selected at least by a determination of the current velocity.

The first location offset and the second location offset, if different, may be used individually or in combination to adjust the trajectory. That is, the vehicle may be configured to adjust its trajectory based on the first location offset, the second location offset, or a combination thereof. With respect to a combination of the location offsets, the first location offset and the second location offset may be averaged, and the trajectory may be modified based on the average of the first location offset and second location offset.

The signal quality as described herein may be any signal quality including, but not limited to any of a signal strength, a time stamp, a ToF, or any combination thereof.

According to one aspect, the first offset vector and the one or more processors may be configured to compare the first offset vector and the second offset vector. If the comparison of the first offset vector and second offset vector shows that the first offset vector and the second offset vector are not sufficiently similar, then one or both of the first offset vector and/or the second offset vector may be disregarded.

In the following, various examples are described that may refer to one or more aspects of the disclosure.

In Example 1, a location verification device is disclosed, including one or more receivers, configured to receive a wireless signal representing a position; and one or more processors, configured to determine from the signal the position and a signal characteristic of the signal; predict a signal characteristic of a wireless signal based on the position and a position of the one or more receivers; compare the determined signal characteristic to the predicted signal characteristic; and verify the position based on the comparison.

In Example 2, the location verification device of Example 1 is disclosed, wherein the signal characteristic includes an angle of arrival of the wireless signal, and wherein the predicting the signal characteristic includes determining a predicted angle of arrival based on the reported position and a position of the one or more receivers.

In Example 3, the location verification device of Example 1 or 2 is disclosed, wherein the signal characteristic includes a received power of the wireless signal, and wherein the predicting the signal characteristic includes determining a predicted received signal power based on the reported position and a position of the one or more receivers.

In Example 4, the location verification device of any one of Examples 1 to 3 is disclosed, wherein the signal characteristic includes a path loss of the wireless signal, and wherein predicting the signal characteristic includes determining a predicted path loss of the wireless signal based on the reported position and a position of the one or more receivers.

In Example 5, the location verification device of any one of Examples 1 to 4 is disclosed, wherein the signal characteristic includes a time of flight of the wireless signal, and wherein predicting the signal characteristic includes determining a predicted time of flight of the wireless signal based on the reported position and a position of the one or more receivers.

In Example 6, the location verification device of any one of Examples 1 to 4 is disclosed, wherein the location verification device is configured as an unmanned aerial vehicle.

In Example 7, the location verification device of any one of Examples 1 to 4 is disclosed, wherein the location verification device is configured as a base station.

In Example 8, the location verification device of any one of Examples 1 to 7 is disclosed, wherein the one or more processors are further configured to reject the position if a difference between the determined signal characteristic and the predicted signal characteristic is outside a predetermined range.

In Example 9, the location verification device of any one of Examples 1 to 8 is disclosed, wherein the one or more processors are further configured to accept the position if a difference between the determined signal characteristic and the predicted signal characteristic is inside a predetermined range.

In Example 10, the location verification device of any one of Examples 1 to 9 is disclosed, wherein the one or more processors are further configured to disregard future wireless signals received from a source of the wireless signal if a difference between the determined signal characteristic and the predicted signal characteristic is outside a predetermined range.

In Example 11, the location verification device of any one of Examples 1 to 10 is disclosed, wherein the one or more processors are further configured to control a transmitter to send a wireless signal representing a non-authorization of the signal source if a difference between the determined signal characteristic and the predicted signal characteristic is outside a predetermined range.

In Example 12, the location verification device of any one of Examples 1 to 11 is disclosed, wherein the one or more processors are further configured to control a transmitter to send a wireless signal representing an authorization of the signal source if a difference between the determined signal characteristic and the predicted signal characteristic is within a predetermined range.

In Example 13, a location verification device is disclosed, including one or more receivers, configured to receive a wireless signal representing a position and one or more ambient signal characteristics; and one or more processors, configured to determine from the signal the position and the one or more ambient signal characteristics; determine from a database one or more recorded ambient signal characteristics corresponding to the position; compare the one or more ambient signal characteristics to the one or more recorded ambient signal characteristic; and verify the position based on the comparison.

In Example 14, the location verification device of Example 13 is disclosed, wherein the one or more ambient signal characteristics include one or more reference signal received power transmission measurements, and wherein the one or more recorded ambient signal characteristics include one or more reference signal received power transmission measurements as measured at the reported position.

In Example 15, the location verification device of Example 13 or 14 is disclosed, wherein the one or more ambient signal characteristics include one or more detected cell IDs, and wherein the one or more recorded ambient signal characteristics include one or more cell IDs as detected at the reported position.

In Example 16, the location verification device of any one of Examples 13 to 15 is disclosed, wherein the one or more ambient signal characteristics include one or more position reference signal correlation values, and wherein the one or more recorded ambient signal characteristics include one or more position reference signal correlation values as detected at the reported position.

In Example 17, the location verification device of any one of Examples 13 to 16 is disclosed, wherein the one or more processors are further configured to reject the position if a difference between the reported ambient signal characteristic and the recorded ambient signal characteristic is outside of a predetermined range.

In Example 18, the location verification device of any one of Examples 13 to 17 is disclosed, wherein the one or more processors are further configured, if a difference between the ambient signal characteristic and the recorded ambient signal characteristic is outside of a predetermined range, to disregard future wireless signals received from a source of the wireless signal.

In Example 19, the location verification device of any one of Examples 13 to 18 is disclosed, wherein the one or more processors are further configured, if a difference between the ambient signal characteristic and the recorded ambient signal characteristic is less than a predetermined threshold, to control a transmitter to send a wireless signal representing a non-authorization of the unmanned aerial vehicle.

In Example 20, an encryption and decryption system is disclosed, including an encryption device, including one or more transmitters, configured to transmit an wireless signal; and one or more processors, configured to determine from a database one or more stored characteristics corresponding to a position; select one or more of the one or more stored characteristics as an encryption key; encrypt data accorded the selected encryption key; control the one or more transmitters to transmit a wireless signal representing the encrypted data; and an unmanned aerial vehicle, including; one or more sensors, configured to detect one or more characteristics associated with a position of the unmanned aerial vehicle; one or more receivers, configured to receive the wireless signal representing the encrypted data; and one or more processors, configured to select one or more of the one or more of the detected characteristics as a decryption key; decrypt the encrypted data according to the selected decryption key.

In Example 21, the encryption and decryption system of Example 20 is disclosed, wherein the one or more stored characteristics corresponding to the position include one or more stored ambient signal characteristics associated with the position, and wherein the one or more detected characteristics include one or more ambient signal characteristics detectable from a position of the unmanned aerial vehicle.

In Example 22, the encryption and decryption system of Example 20 or 21 is disclosed, wherein the stored one or more ambient signal characteristics include one or more stored reference signal received power transmissions associated with the position, and wherein the one or more detected characteristics include one or more ambient signal characteristics detectable from the position of the unmanned aerial vehicle.

In Example 23, the encryption and decryption system of any one of Examples 20 to 22 is disclosed, wherein the stored one or more ambient signal characteristics include one or more cell IDs associated with the position, and wherein the one or more detected characteristics include one or more cell IDs detectable from the position of the unmanned aerial vehicle.

In Example 24, the encryption and decryption system of any one of Examples 20 to 23 is disclosed, wherein the stored one or more ambient signal characteristics include one or more position reference signal correlation values associated with the position, and wherein the one or more detected characteristics include one or more position reference signal correlation values detectable from the position of the unmanned aerial vehicle.

In Example 25, an encryption device is disclosed, including one or more transmitters, configured to transmit an wireless signal; and one or more processors, configured to determine from a database one or more stored qualities corresponding to a position; select one or more of the one or more stored qualities as an encryption key; encrypt data accorded the selected encryption key; and control the one or more transmitters to transmit a wireless signal representing the encrypted data.

In Example 26, the encryption device of Example 25 is disclosed, wherein the one or more stored qualities corresponding to the position include one or more stored ambient signal qualities associated with the position.

In Example 27, the encryption device of Example 25 or 26 is disclosed, wherein the stored one or more ambient signal qualities include one or more stored reference signal received power transmissions associated with the position.

In Example 28, the encryption device of any one of Examples 25 to 27 is disclosed, wherein the stored one or more ambient signal qualities include one or more cell IDs associated with the position.

In Example 29, the encryption device of any one of Examples 25 to 28 is disclosed, wherein the stored one or more ambient signal qualities include one or more position reference signal correlation values associated with the position.

In Example 30, an unmanned aerial vehicle is disclosed, including one or more sensors, configured to detect one or more characteristics associated with a position of the unmanned aerial vehicle; one or more receivers, configured to receive a wireless signal representing encrypted data; and one or more processors, configured to select one or more of the one or more of the detected characteristics as a decryption key; and decrypt the encrypted data according to the selected decryption key.

In Example 31, the unmanned aerial vehicle of Example 30 is disclosed, wherein the one or more detected characteristics include one or more ambient signal characteristics detectable from a position of the unmanned aerial vehicle.

In Example 32, the unmanned aerial vehicle of Example 30 or 31 is disclosed, wherein the one or more detected characteristics include one or more ambient signal characteristics detectable from the position of the unmanned aerial vehicle.

In Example 33, the unmanned aerial vehicle of any one of Examples 30 to 32 is disclosed, wherein the one or more detected characteristics include one or more cell IDs detectable from the position of the unmanned aerial vehicle.

In Example 34, the unmanned aerial vehicle of any one of Examples 30 to 33 is disclosed, wherein the one or more detected characteristics include one or more position reference signal correlation values detectable from the position of the unmanned aerial vehicle.

In Example 35, a method of location verification is disclosed, including receiving a wireless signal representing a position; determining from the signal the position and a signal characteristic of the signal; predicting a signal characteristic of a wireless signal based on the position and a position of the one or more receivers; comparing the determined signal characteristic to the predicted signal characteristic; and verifying the position based on the comparison.

In Example 36, the method of location verification of Example 35 is disclosed, wherein the signal characteristic includes an angle of arrival of the wireless signal, and wherein the predicting the signal characteristic includes determining a predicted angle of arrival based on the reported position and a position of one or more receivers.

In Example 37, the method of location verification of Example 35 or 36 is disclosed, wherein the signal characteristic includes a received power of the wireless signal, and wherein the predicting the signal characteristic includes determining a predicted received signal power based on the reported position and a position of one or more receivers.

In Example 38, the method of location verification of any one of Examples 35 to 37 is disclosed, wherein the signal characteristic includes a path loss of the wireless signal, and wherein predicting the signal characteristic includes determining a predicted path loss of the wireless signal based on the reported position and a position of one or more receivers.

In Example 39, the method of location verification of any one of Examples 35 to 38 is disclosed, wherein the signal characteristic includes a time of flight of the wireless signal, and wherein predicting the signal characteristic includes determining a predicted time of flight of the wireless signal based on the reported position and a position of one or more receivers.

In Example 40, the method of location verification of any one of Examples 35 to 39 is disclosed, further including rejecting the position if a difference between the determined signal characteristic and the predicted signal characteristic is outside a predetermined range.

In Example 41, the method of location verification of any one of Examples 35 to 40 is disclosed, further including accepting the position if a difference between the determined signal characteristic and the predicted signal characteristic is inside a predetermined range.

In Example 42, the method of location verification of any one of Examples 35 to 41 is disclosed, further including disregarding future wireless signals received from a source of the wireless signal if a difference between the determined signal characteristic and the predicted signal characteristic is outside a predetermined range.

In Example 43, the method of location verification of any one of Examples 35 to 42 is disclosed, further including controlling a transmitter to send a wireless signal representing a non-authorization of the signal source if a difference between the determined signal characteristic and the predicted signal characteristic is outside a predetermined range.

In Example 44, the method of location verification of any one of Examples 35 to 43 is disclosed, further including controlling a transmitter to send a wireless signal representing an authorization of the signal source if a difference between the determined signal characteristic and the predicted signal characteristic is within a predetermined range.

In Example 45, a method of location verification is disclosed, including receiving a wireless signal representing a position and one or more ambient signal characteristics determining from the signal the position and the one or more ambient signal characteristics; determining from a database one or more recorded ambient signal characteristics corresponding to the position; comparing the one or more ambient signal characteristics to the one or more recorded ambient signal characteristic; and verifying the position based on the comparison.

In Example 46, the method of location verification of Example 45 is disclosed, wherein the one or more ambient signal characteristics include one or more reference signal received power transmission measurements, and wherein the one or more recorded ambient signal characteristics include one or more reference signal received power transmission measurements as measured at the reported position.

In Example 47, the method of location verification of Example 45 or 46 is disclosed, wherein the one or more ambient signal characteristics include one or more detected cell IDs, and wherein the one or more recorded ambient signal characteristics include one or more cell IDs as detected at the reported position.

In Example 48, the method of location verification of any one of Examples 45 to 47 is disclosed, wherein the one or more ambient signal characteristics include one or more position reference signal correlation values, and wherein the one or more recorded ambient signal characteristics include one or more position reference signal correlation values as detected at the reported position.

In Example 49, the method of location verification of any one of Examples 45 to 48 is disclosed, further including rejecting the position if a difference between the reported ambient signal characteristic and the recorded ambient signal characteristic is outside of a predetermined range.

In Example 50, the method of location verification of any one of Examples 45 to 48 is disclosed, further including, if a difference between the ambient signal characteristic and the recorded ambient signal characteristic is outside of a predetermined range, disregarding future wireless signals received from a source of the wireless signal.

In Example 51, the method of location verification of any one of Examples 45 to 50 is disclosed, further including, if a difference between the ambient signal characteristic and the recorded ambient signal characteristic is less than a predetermined threshold, controlling a transmitter to send a wireless signal representing a non-authorization of the unmanned aerial vehicle.

In Example 52, a method of position detection is disclosed, including detecting one or more characteristics associated with a position of the unmanned aerial vehicle; receive a wireless signal representing encrypted data; selecting one or more of the one or more of the detected characteristics as a decryption key; and decrypting the encrypted data according to the selected decryption key.

In Example 53, the method of position detection of Example 52 is disclosed, wherein the one or more detected characteristics include one or more ambient signal characteristics detectable from a position of the unmanned aerial vehicle.

In Example 54, the method of position detection of Example 52 or 53 is disclosed, wherein the one or more detected characteristics include one or more ambient signal characteristics detectable from the position of the unmanned aerial vehicle.

In Example 55, the method of position detection of any one of Examples 52 to 54 is disclosed, wherein the one or more detected characteristics include one or more cell IDs detectable from the position of the unmanned aerial vehicle.

In Example 56, the method of position detection of any one of Examples 52 to 55 is disclosed, wherein the one or more detected characteristics include one or more position reference signal correlation values detectable from the position of the unmanned aerial vehicle.

In Example 57, a position device is disclosed, including one or more receivers, configured to receive wireless signals representing a plurality of detected positions of each of a plurality of unmanned aerial vehicles, and a plurality of detected distances between two or more of the plurality of unmanned aerial vehicles; one or more processors, configured to determine an uncertainty factor from the plurality of detected positions and the plurality of detected distances; determine a plurality of refined positions of the plurality of unmanned aerial vehicles based at least on the plurality of detected positions, the plurality of detected distances, and the uncertainty factor.

In Example 58, the position device of Example 57 is disclosed, wherein the one or more processors are further configured to control a transmitter to send a wireless signal representing one or more of the determined plurality of refined positions.

In Example 59, the position device of Example 57 or 58 is disclosed, wherein the one or more processors are further configured to determine one or more target positions of one or more of the unmanned aerial vehicles, which, if realized, would decrease uncertainty in the uncertainty factor; and control one or more transmitters to transmit a wireless signal representing instructions to cause one or more of the plurality of unmanned aerial vehicles to travel to the one or more target positions.

In Example 60, the position device of any one of Examples 57 to 59 is disclosed, wherein determining the uncertainty factor includes determining from the plurality of detected positions and the plurality of detected distances a contractibility of a network of the plurality of unmanned aerial vehicles.

In Example 61, the position device of Example 60 is disclosed, wherein the contractibility of the network includes a contractibility of the network of the plurality of unmanned aerial vehicles relative to a plurality of network anchors.

In Example 62, the position device of any one of Examples 57 to 61 is disclosed, wherein determining the uncertainty factor includes determining from the plurality of detected positions and the plurality of detected distances a rigidity factor of a network of the plurality of unmanned aerial vehicles.

In Example 63, the position device of any one of Examples 57 to 62 is disclosed, wherein determining the uncertainty factor includes determining from the plurality of detected positions and the plurality of detected distances a convex hull factor of a network of the plurality of unmanned aerial vehicles.

In Example 64, the position device of any one of Examples 57 to 63 is disclosed, wherein determining the uncertainty factor includes determining from the plurality of detected positions and the plurality of detected distances a multipath determination of one or more signals between two or more of the plurality of unmanned aerial vehicles.

In Example 65, the position device of any one of Examples 57 to 64 is disclosed, wherein the uncertainty factor is a positive value as an offset to a difference between one or more distances from the plurality of detected positions and the plurality of the one or more detected distances.

In Example 66, the position device of any one of Examples 57 to 65 is disclosed, wherein determining the plurality of calculated positions includes resolving at least distances between the detected positions with the plurality of detected distances.

In Example 67, the position device of any one of Examples 57 to 66 is disclosed, wherein determining the plurality of refined positions includes resolving at least distances between the detected positions with the plurality of detected distances and the uncertainty factor.

In Example 68, a positioning method is disclosed, including receiving wireless signals representing a plurality of detected positions of each of a plurality of unmanned aerial vehicles, and a plurality of detected distances between two or more of the plurality of unmanned aerial vehicles; determining an uncertainty factor from the plurality of detected positions and the plurality of detected distances; and determining a plurality of refined positions of the plurality of unmanned aerial vehicles based at least on the plurality of detected positions, the plurality of detected distances, and the uncertainty factor.

In Example 69, the positioning method of Example 68 is disclosed, further including controlling a transmitter to send a wireless signal representing one or more of the determined plurality of refined positions.

In Example 70, the positioning method of Example 68 or 69, further including determining one or more target positions of one or more of the unmanned aerial vehicles, which, if realized, would decrease uncertainty in the uncertainty factor; and controlling one or more transmitters to transmit a wireless signal representing instructions to cause one or more of the plurality of unmanned aerial vehicles to travel to the one or more target positions.

In Example 71, the positioning method of any one of Examples 68 to 70 is disclosed, wherein determining the uncertainty factor includes determining from the plurality of detected positions and the plurality of detected distances a contractibility of a network of the plurality of unmanned aerial vehicles.

In Example 72, the positioning method of Example 71 is disclosed, wherein the contractibility of the network includes a contractibility of the network of the plurality of unmanned aerial vehicles relative to a plurality of network anchors.

In Example 73, the positioning method of any one of Examples 68 to 72 is disclosed, wherein determining the uncertainty factor includes determining from the plurality of detected positions and the plurality of detected distances a rigidity factor of a network of the plurality of unmanned aerial vehicles.

In Example 74, the positioning method of any one of Examples 68 to 73 is disclosed, wherein determining the uncertainty factor includes determining from the plurality of detected positions and the plurality of detected distances a convex hull factor of a network of the plurality of unmanned aerial vehicles.

In Example 75, the positioning method of any one of Examples 68 to 74 is disclosed, wherein determining the uncertainty factor includes determining from the plurality of detected positions and the plurality of detected distances a multipath determination of one or more signals between two or more of the plurality of unmanned aerial vehicles.

In Example 76, the positioning method of any one of Examples 68 to 75 is disclosed, wherein the uncertainty factor is a positive value as an offset to a difference between one or more distances from the plurality of detected positions and the plurality of the one or more detected distances.

In Example 77, the positioning method of any one of Examples 68 to 76 is disclosed, wherein determining the plurality of calculated positions includes resolving at least distances between the detected positions with the plurality of detected distances.

In Example 78, the positioning method of any one of Examples 68 to 77 is disclosed, wherein determining the plurality of refined positions includes resolving at least distances between the detected positions with the plurality of detected distances and the uncertainty factor.

In Example 79, an unmanned aerial vehicle is disclosed, including a transceiver, configured to receive one or more first wireless signals from each of one or more associated unmanned aerial vehicles, each of the received one or more first wireless signals representing at least one computational resource availability of the respective unmanned aerial vehicle of the one or more associated unmanned aerial vehicles; one or more processors, configured to select at least one of one or more associated unmanned aerial vehicles based on the computational resource availability of one or more associated unmanned aerial vehicles, according to a first logic; determine one or more computational tasks for disaggregate processing, according to a second logic; and control the transceiver to transmit at least one of the one or more computational tasks for disaggregate processing to each of the one or more associated unmanned aerial vehicles in the selected at least one of the one or more associated unmanned aerial vehicles.

In Example 80, the unmanned aerial vehicle of Example 79 is disclosed, wherein the transceiver is further configured to receive a second wireless signal from each of the one or more associated unmanned aerial vehicles in the at least one of the one or more associated unmanned aerial vehicles, the second wireless signal representing an output of the one or more computational tasks for disaggregate processing for the respective unmanned aerial vehicle; and wherein the one or more processors are further configured to aggregate the output of the one or more computational tasks for disaggregate processing.

In Example 81, the unmanned aerial vehicle of Example 79 or 80 is disclosed, wherein the at least one computational resource availability includes a processor availability and a memory availability.

In Example 82, the unmanned aerial vehicle of Example 81 is disclosed, wherein the first logic includes selecting an unmanned aerial vehicle of the one or more associated unmanned aerial vehicles for the at least one of the one or more associated unmanned aerial vehicles if at least one of the processor availability or the memory availability is greater than a predetermined threshold.

In Example 83, the unmanned aerial vehicle of Example 82 is disclosed, wherein the first logic includes selecting an unmanned aerial vehicle of the one or more associated unmanned aerial vehicles for the at least one of the one or more associated unmanned aerial vehicles if the processor availability and the memory availability is greater than a predetermined threshold.

In Example 84, the unmanned aerial vehicle of Example 82 or 83 is disclosed, wherein the first logic further includes selecting an unmanned aerial vehicle of the one or more associated unmanned aerial vehicles for the at least one of the one or more associated unmanned aerial vehicles based on at least one of required computational time, duration of availability of the autonomous agent, duration since receipt of the at least one computational resource availability, or any combination thereof.

In Example 85, the unmanned aerial vehicle of any one of Examples 79 to 84 is disclosed, wherein the first wireless signal further represents a local task criticality factor, and wherein the first logic further includes selecting an unmanned aerial vehicle of the one or more associated unmanned aerial vehicles for the at least one of the one or more associated unmanned aerial vehicles if the local task criticality factor is below a predetermined threshold.

In Example 86, the unmanned aerial vehicle of any one of Examples 79 to 85 is disclosed, wherein the at least one computational resource availability is received within a ranging packet or a data packet.

In Example 87, an autonomous agent task distribution system is disclosed, including
one or more first autonomous agents, including a transceiver; one or more processors; wherein the one or more processors of each of the one or more first autonomous agents are configured to determine at least one computational resource availability of the respective first autonomous agent, and to control the respective transceiver to send a first wireless signal representing the at least one computational resource availability; a second autonomous agent, including, a transceiver, configured to receive the first wireless signals from each of one or more first autonomous agents; one or more processors, configured to, select at least one of the one or more first autonomous agents based on the computational resource availability of one or more additional autonomous agents, according to a first logic; determine one or more computational tasks for disaggregate processing, according to a second logic; and control the transceiver to transmit at least one of the one or more computational tasks for disaggregate processing to each of the first autonomous agents in the selected at least one of the one or more first autonomous agents.

In Example 88, the autonomous agent task distribution system of Example 87 is disclosed, wherein the second autonomous agent is further configured to receive a second wireless signal from each of the one or more first autonomous agents in the selected at least one of the one or more first autonomous agents, the second wireless signals representing an output of the one or more computational tasks for disaggregate processing for the respective first autonomous agent; and wherein the one or more processors of the second autonomous agent are further configured to aggregate the output of the one or more computational tasks for disaggregate processing.

In Example 89, the autonomous agent task distribution system of Example 87 or 88 is disclosed, wherein the at least one computational resource availability includes a processor availability and a memory availability of the respective first autonomous agent.

In Example 90, the autonomous agent task distribution system of Example 89 is disclosed, wherein the first logic includes selecting a first autonomous agent of the one or more first autonomous agents for the selected at least one of the one or more first autonomous agents if at least one of the processor availability or the memory availability is greater than a predetermined threshold.

In Example 91, the autonomous agent task distribution system of Example 90 is disclosed, wherein the first logic includes selecting a first autonomous agent of the one or more first autonomous agents for the selected at least one of the one or more first autonomous agents if the processor availability and the memory availability is greater than a predetermined threshold.

In Example 92, the autonomous agent task distribution system of Example 90 or 91 is disclosed, wherein the first logic further includes selecting a first autonomous agent of the one or more first autonomous agents for the selected at least one of the one or more first autonomous agents based on at least one of required computational time, duration of availability of the first autonomous agent, duration since receipt of the at least one computational resource availability, or any combination thereof.

In Example 93, the autonomous agent task distribution system of any one of Examples 88 to 93 is disclosed, wherein the first wireless signal further represents a local task criticality factor, and wherein the first logic further includes selecting a first autonomous agent of the one or more first autonomous agents for the selected at least one of the one or more first autonomous agents if the local task criticality factor is below a predetermined threshold.

In Example 94, the autonomous agent task distribution system of any one of Examples 88 to 95 is disclosed, wherein the at least one computational resource availability is received within a ranging packet or a data packet.

In Example 95, the autonomous agent task distribution system of any one of Examples 88 to 94 is disclosed, wherein the one or more first autonomous agents are configured to send the first wireless signal according to a predetermined periodic schedule.

In Example 96, the autonomous agent task distribution system of any one of Examples 88 to 95 is disclosed, wherein the second autonomous agent is configured to send a request for a computational resource availability, and wherein the one or more first autonomous agents are configured to send the first wireless signal in response to the request for the computational resource availability.

In Example 97, a method of autonomous agent task distribution is disclosed, including: receiving by an autonomous agent one or more first wireless signals from each of one or more additional autonomous agents, each of the received one or more first wireless signals representing at least one computational resource availability of a respective autonomous agent of the one or more additional autonomous agents; selecting at least one of one or more additional autonomous agents based on the computational resource availability of one or more additional autonomous agents, according to a first logic; determining one or more computational tasks for disaggregate processing, according to a second logic; and controlling the transceiver to transmit at least one of the one or more computational tasks for disaggregate processing to each of the one or more additional autonomous agents in the selected at least one of one or more additional autonomous agents.

In Example 98, the method of autonomous agent task distribution of Example 97 is disclosed, further including receiving a second wireless signal from each of the one or more additional autonomous agents in the selected at least one of one or more additional autonomous agents, the second wireless signal representing an output of the one or more computational tasks for disaggregate processing for the respective additional autonomous agent; and aggregating the output of the one or more computational tasks for disaggregate processing.

In Example 99, the method of autonomous agent task distribution of Example 97 or 98 is disclosed, wherein the at least one computational resource availability includes a processor availability and a memory availability.

In Example 100, the method of autonomous agent task distribution of Example 99 is disclosed, wherein the first logic includes selecting an autonomous agent of the one or more additional autonomous agents for the selected at least one of one or more additional autonomous agents if at least one of the processor availability or the memory availability is greater than a predetermined threshold.

In Example 101, the method of autonomous agent task distribution of Example 99 is disclosed, wherein the first logic includes selecting an autonomous agent of the one or more additional autonomous agents for the selected at least one of one or more additional autonomous agents if the processor availability and the memory availability is greater than a predetermined threshold.

In Example 102, the method of autonomous agent task distribution of Example 100 or 101 is disclosed, wherein the first logic further includes selecting an autonomous agent of the one or more additional autonomous agents for the selected at least one of one or more additional autonomous agents based on at least one of required computational time, duration of availability of the autonomous agent, duration since receipt of the at least one computational resource availability, or any combination thereof.

In Example 103, the method of autonomous agent task distribution of any one of Examples 97 to 102 is disclosed, wherein the first wireless signal further represents a local task criticality factor, and wherein the first logic further includes selecting an autonomous agent of the one or more additional autonomous agents for the selected at least one of one or more additional autonomous agents if the local task criticality factor is below a predetermined threshold.

In Example 104, the method of autonomous agent task distribution of any one of Examples 97 to 103 is disclosed, wherein the at least one computational resource availability is received within a ranging packet or a data packet.

In Example 105, an autonomous agent localization system is disclosed including: one or more localization beacons, each including a transmitter; a memory; and one or more processors, configured to store in the memory data representing a position of an autonomous agent; and to control the transmitter to transmit a signal representing the stored data; and an autonomous agent, including: one or more position sensors, configured to receive position sensor data; one or more processors, configured to determine a first position of the autonomous agent using the received position sensor data; send data representing the first position to a first localization beacon of the one or more localization beacons; and send a placement instruction, configured to case the first location beacon to be placed at the determined first position.

In Example 106, the autonomous agent localization system of Example 105 is disclosed, further including wherein the autonomous agent further includes a transceiver, configured to receive a signal representing stored data from the first localization beacon; and wherein the one or more processors of the autonomous agent are further configured to determine a second position of the autonomous agent from at least a received signal from the first localization beacon representing the determined first position.

In Example 107, the autonomous agent localization system of Example 106 is disclosed, wherein determining the second position of the autonomous agent including determining the second position from the received signal from the first localization beacon and position sensor data from the one or more position sensors.

In Example 108, the autonomous agent localization system of Example 106 or 107 is disclosed, wherein the one or more processors of the autonomous agent are further configured to send data representing the second position to a second localization beacon of the one or more localization beacons; send a placement instruction to cause the second localization beacon to be placed at the determined second position; and determine a third position of the autonomous agent from at least a received signal from the first localization beacon representing the determined first position and a received signal from the second localization beacon representing the determined second position.

In Example 109, the autonomous agent localization system of any one of Examples 105 to 108 is disclosed, wherein sending data representing the first position to a first localization beacon of the one or more localization beacons includes wirelessly transmitting data representing the first position to the first localization beacon.

In Example 110, the autonomous agent localization system of any one of Examples 105 to 109 is disclosed, wherein sending data representing the first position to a first localization beacon of the one or more localization beacons includes connecting an interface of the first localization beacon to an interface of the autonomous agent, and sending the data representing the first position through the interfaces.

In Example 111, the autonomous agent localization system of any one of Examples Example 105 to 110 is disclosed, wherein the autonomous agent is configured to store a determined position on a localization beacon of the one or more localization beacons if a reliability of the determined position from the received position sensor data falls beneath a predetermined threshold.

In Example 112, the autonomous agent localization system of any one of Examples 105 to 111 is disclosed, wherein the autonomous agent is configured to store a determined position on a localization beacon of the one or more localization beacons if a quality of sensor information received by the one or more position sensors falls beneath a predetermined threshold.

In Example 113, the autonomous agent localization system of any one of Examples 105 to 112 is disclosed, wherein the one or more position sensors include Global Positioning System sensors, one or more accelerometers, one or more magnetic field sensors, one or more internal measurement unit (IMU) sensors, or any combination thereof.

In Example 114, the autonomous agent localization system of Example 113 is disclosed, wherein the first position is determined using data from one or more Global Positioning System sensors, and data from at least one of one or more accelerometers, one or more magnetic field sensors, and/or one or more internal measurement unit (IMU) sensors.

In Example 115, an autonomous agent is disclosed including one or more position sensors, configured to receive position sensor data; one or more processors, configured to determine a first position of the autonomous agent using the received position sensor data; send data representing the first position to a first localization beacon; send a placement instruction, to cause the first localization beacon to be placed at the determined first position.

In Example 116, the autonomous agent of Example 115 is disclosed, further including a transceiver, configured to receive a signal representing stored data from a localization beacon; and wherein the one or more processors are further configured to: determine a second position of the autonomous agent from at least the received signal from the first localization beacon.

In Example 117, the autonomous agent of Example 116 is disclosed, wherein determining the second position of the autonomous agent including determining the second position from the received signal from the first localization beacon and position sensor data from the one or more position sensors.

In Example 118, the autonomous agent of Example 116 or 117 is disclosed, wherein the one or more processors of the autonomous agent are further configured to send data representing the second position to a second localization beacon of the one or more localization beacons; place the second localization beacon at the determined second position; and determine a third position of the autonomous agent from at least a received signal from the first localization beacon representing the determined first position and a received signal from the second localization beacon representing the determined second position.

In Example 119, the autonomous agent of any one of Examples 116 to 118 is disclosed, wherein sending data representing the first position to the first localization beacon includes wirelessly transmitting data representing the first position to the first localization beacon.

In Example 120, the autonomous agent of any one of Examples 116 to 119 is disclosed, wherein sending data representing the first position to a first localization beacon of the one or more localization beacons includes connecting an interface of the first localization beacon to an interface of the autonomous agent, and sending the data representing the first position through the interfaces.

In Example 121, the autonomous agent of any one of Examples 116 to 120 is disclosed, wherein the autonomous agent is configured to store a determined position on a localization beacon if a reliability of the determined position from the received position sensor data falls beneath a predetermined threshold.

In Example 122, the autonomous agent of any one of Examples 116 to 121 is disclosed, wherein the autonomous agent is configured to store a determined position on a localization beacon if a quality of sensor information received by the one or more position sensors falls beneath a predetermined threshold.

In Example 123, the autonomous agent of any one of Examples 116 to 112 is disclosed, wherein the one or more position sensors include Global Positioning System sensors, one or more accelerometers, one or more magnetic field sensors, one or more internal measurement unit (IMU) sensors, or any combination thereof.

In Example 124, the autonomous agent of Example 123 is disclosed, wherein the first position is determined using data from one or more Global Positioning System sensors, and data from at least one of one or more accelerometers, one or more magnetic field sensors, and/or one or more internal measurement unit (IMU) sensors.

In Example 125, a method of autonomous agent localization is disclosed including: receiving position sensor data; determining a first position of the autonomous agent using the received position sensor data; sending data representing the first position to a first localization beacon; and sending a placement instruction, to cause the first localization beacon to be placed at the determined first position.

In Example 126, the method of autonomous agent localization of Example 125 is disclosed, further including receiving a signal representing stored data from the first localization beacon; and determining a second position of the autonomous agent from at least the received signal from the first localization beacon.

In Example 127, the method of autonomous agent localization of Example 126 is disclosed, wherein determining the second position of the autonomous agent includes determining the second position from the received signal from the first localization beacon and position sensor data from the one or more position sensors.

In Example 128, the method of autonomous agent localization of Example 126 or 127 is disclosed, further including sending data representing the second position to a second localization beacon of the one or more localization beacons; placing the second localization beacon at the determined second position; and determining a third position of the autonomous agent from at least a received signal from the first localization beacon representing the determined first position and a received signal from the second localization beacon representing the determined second position.

In Example 129, the method of autonomous agent localization of any one of Examples 126 to 128 is disclosed, wherein sending data representing the first position to the first localization beacon includes wirelessly transmitting data representing the first position to the first localization beacon.

In Example 130, the method of autonomous agent localization of any one of Examples 126 to 128 is disclosed, wherein sending data representing the first position to a first localization beacon of the one or more localization beacons includes connecting an interface of the first localization beacon to an interface of the autonomous agent, and sending the data representing the first position through the interfaces.

In Example 131, the method of autonomous agent localization of any one of Examples 126 to 130 is disclosed, further including storing a determined position on a localization beacon if a reliability of the determined position from the received position sensor data falls beneath a predetermined threshold.

In Example 132, the method of autonomous agent localization of any one of Examples 126 to 131, further including storing a determined position on a localization beacon if a quality of sensor information received by the one or more position sensors falls beneath a predetermined threshold.

In Example 133, a non-transient computer readable medium is disclosed, configured to cause one or more processors to perform the method of any one of Examples 125 through 132.

In Example 134, an unmanned aerial vehicle navigation assistance system is disclosed, including: a first transmission station configured to transmit a first wireless signal representing a first identifier associated with the first transmission station into a first space region; a second transmission station configured to transmit a second wireless signal representing a second identifier associated with the second transmission station into a second space region; wherein the first space region and the second space region at least partially overlap; and an unmanned aerial vehicle including one or more receivers, configured to receive the first wireless signal and the second wireless signal, and one or more processors, configured to determine the first identifier of the first wireless signal and the second identifier of the second wireless signal; detect a first signal quality of the first wireless signal and the second wireless signal during a first sampling time; determine a first location offset from a predetermined trajectory based on the detected first signal quality and at least one of the first identifier or the second identifier; detect a second signal quality of the first wireless signal and the second wireless signal during a second sampling time; determine a second location offset from the predetermined trajectory based on the detected second signal quality and at least one of the first identifier or the second identifier; compare the first location offset to the second location offset; and if a difference between the first location offset and the second location offset is less than a predetermined threshold, control the unmanned aerial vehicle to adjust its trajectory according to at least one of the first location offset or the second location offset.

In Example 135, the unmanned aerial vehicle navigation assistance system of Example 134 is disclosed, wherein the first wireless signal and the second wireless signal are time multiplexed.

In Example 136, the unmanned aerial vehicle navigation assistance system of Example 134 or 135 is disclosed, wherein the predetermined threshold is determined based on a transmission timing of the first wireless signal and the second wireless signal.

In Example 137, the unmanned aerial vehicle navigation assistance system of any one of Examples 134 to 136 is disclosed, wherein the first wireless signal and the second wireless signal are Wireless Local Area Network (WLAN) signals.

In Example 138, the unmanned aerial vehicle navigation assistance system of any one of Examples 136 to 137 is disclosed, wherein the first wireless signal and the second wireless signal are wireless signals according to Wi-Fi Alliance Standard IEEE 802.11.

In Example 139, the unmanned aerial vehicle navigation assistance system of any one of Examples 134 to 138 is disclosed, wherein the first wireless signal and the second wireless signal are encrypted.

In Example 140, the unmanned aerial vehicle navigation assistance system of Example 139 is disclosed, wherein the first wireless signal and the second wireless signal are encrypted by Wi-Fi Protected Access 2 encryption.

In Example 141, the unmanned aerial vehicle navigation assistance system of any one of Examples 134 to 140 is disclosed, wherein the first transmission station and the second transmission station are WLAN stations.

In Example 142, the unmanned aerial vehicle navigation assistance system of any one of Examples 134 to 141 is disclosed, wherein the one or more processors are further configured to determine the predetermined threshold based on at least a velocity of the unmanned aerial vehicle and a duration between the first sampling time and the second sampling time.

In Example 143, the unmanned aerial vehicle navigation assistance system of any one of Examples 134 to 142 is disclosed, wherein the one or more processors are further configured to determine an average of the first location offset and the second location offset, and wherein controlling the unmanned aerial vehicle to adjust its trajectory according to at least one of the first location offset or the second location offset includes controlling the unmanned aerial vehicle to adjust its trajectory according to the average of the first location offset and the second location offset.

In Example 144, the unmanned aerial vehicle navigation assistance system of any one of Examples 134 to 143 is disclosed, wherein the one or more processors are further configured to detect a third signal quality of the first wireless signal and the second wireless signal during a third sampling time; determine a third location offset from the predetermined trajectory based on the detected third signal quality and at least one of the first identifier or the second identifier; compare the third location offset to the second location offset; and if a difference between the third location offset and the second location offset is less than a predetermined threshold, control the unmanned aerial vehicle to adjust its trajectory according to at least one of the third location offset or the second location offset.

In Example 145, the unmanned aerial vehicle navigation assistance system of any one of Examples 134 to 144 is disclosed, wherein the signal quality includes any of a signal strength, a time stamp, a time of flight, or any combination thereof.

In Example 146, an unmanned aerial vehicle is disclosed, including one or more receivers, configured to receive a first wireless signal representing a first identifier associated with a first transmission station, and a second wireless signal representing a second identifier associated with a second transmission station, and one or more processors, configured to determine the first identifier of the first wireless signal and the second identifier of the second wireless signal; detect a first signal quality of the first wireless signal and the second wireless signal during a first sampling time; determine a first location offset from a predetermined trajectory based on the detected first signal quality and at least one of the first identifier or the second identifier; detect a second signal quality of the first wireless signal and the second wireless signal during a second sampling time; determine a second location offset from the predetermined trajectory based on the detected second signal quality and at least one of the first identifier or the second identifier; compare the first location offset to the second location offset; and if a difference between the first location offset and the second location offset is less than a predetermined threshold, control the UAV to adjust its trajectory according to at least one of the first location offset or the second location offset.

In Example 147, the unmanned aerial vehicle of Example 146 is disclosed, wherein the first wireless signal and the second wireless signal are time multiplexed.

In Example 148, the unmanned aerial vehicle of Example 146 or 147 is disclosed, wherein the predetermined threshold is determined based on a transmission timing of the first wireless signal and the second wireless signal.

In Example 149, the unmanned aerial vehicle of any one of Examples 146 to 148 is disclosed, wherein the first wireless signal and the second wireless signal are WLAN signals.

In Example 150, the unmanned aerial vehicle of any one of Examples 146 to 149 is disclosed, wherein the first wireless signal and the second wireless signal are wireless signals according to Wi-Fi Alliance Standard IEEE 802.11.

In Example 151, the unmanned aerial vehicle of any one of Examples 146 to 150 is disclosed, wherein the first wireless signal and the second wireless signal are encrypted.

In Example 152, the unmanned aerial vehicle of Example 151 is disclosed, wherein the first wireless signal and the second wireless signal are encrypted by Wi-Fi Protected Access 2 encryption.

In Example 153, the unmanned aerial vehicle of any one of Examples 146 to 152 is disclosed, wherein the one or more processors are further configured to determine the predetermined threshold based on at least a velocity of the unmanned aerial vehicle and a duration between the first sampling time and the second sampling time.

In Example 154, the unmanned aerial vehicle of any one of Examples 146 to 153 is disclosed, wherein the one or more processors are further configured to determine an average of the first location offset and the second location offset, and wherein controlling the UAV to adjust its trajectory according to at least one of the first location offset or the second location offset includes controlling the UAV to adjust its trajectory according to the average of the first location offset and the second location offset.

In Example 155, the unmanned aerial vehicle of any one of Examples 146 to 154 is disclosed, wherein the one or more processors are further configured to detect a third signal quality of the first wireless signal and the second wireless signal during a third sampling time; determine a third location offset from the predetermined trajectory based on the detected third signal quality and at least one of the first identifier or the second identifier; compare the third location offset to the second location offset; and if a difference between the third location offset and the second location offset is less than a predetermined threshold, control the UAV to adjust its trajectory according to at least one of the third location offset or the second location offset.

In Example 156, the unmanned aerial vehicle of any one of Examples 146 to 155 is disclosed, wherein the signal quality includes any of a signal strength, a time stamp, a time of flight, or any combination thereof.

In Example 157, a method of unmanned aerial vehicle navigation is disclosed, including receiving a first wireless signal representing a first identifier associated with a first transmission station; receiving a second wireless signal representing a second identifier associated with a second transmission station; determining the first identifier of the first wireless signal and the second identifier of the second wireless signal; detecting a first signal quality of the first wireless signal and the second wireless signal during a first sampling time; determining a first location offset from a predetermined trajectory based on the detected first signal quality and at least one of the first identifier or the second identifier; detecting a second signal quality of the first wireless signal and the second wireless signal during a second sampling time; determining a second location offset from the predetermined trajectory based on the detected second signal strengths and at least one of the first identifier or the second identifier; comparing the first location offset to the second location offset; and if a difference between the first location offset and the second location offset is less than a predetermined threshold, controlling the UAV to adjust its trajectory according to at least one of the first location offset or the second location offset.

In Example 158, the method of unmanned aerial vehicle navigation of Example 157 is disclosed, wherein the first wireless signal and the second wireless signal are time multiplexed.

In Example 159, the method of unmanned aerial vehicle navigation of Example 157 or 158 is disclosed, wherein the predetermined threshold is determined based on a transmission timing of the first wireless signal and the second wireless signal.

In Example 160, the method of unmanned aerial vehicle navigation of any one of Examples 157 to 159 is disclosed, wherein the first wireless signal and the second wireless signal are WLAN signals.

In Example 161, the method of unmanned aerial vehicle navigation of any one of Examples 157 to 160 is disclosed, wherein the first wireless signal and the second wireless signal are wireless signals according to Wi-Fi Alliance Standard IEEE 802.11.

In Example 162, the method of unmanned aerial vehicle navigation of any one of Examples 157 to 161 is disclosed, wherein the first wireless signal and the second wireless signal are encrypted.

In Example 163, the method of unmanned aerial vehicle navigation of Example 162 is disclosed, wherein the first wireless signal and the second wireless signal are encrypted by Wi-Fi Protected Access 2 encryption.

In Example 164, the method of unmanned aerial vehicle navigation of any one of Examples 157 to 163 is disclosed, further including determining the predetermined threshold based on at least a velocity of the unmanned aerial vehicle and a duration between the first sampling time and the second sampling time.

In Example 165, the method of unmanned aerial vehicle navigation of any one of Examples 157 to 164 is disclosed, further including determining an average of the first location offset and the second location offset, and wherein controlling the UAV to adjust its trajectory according to at least one of the first location offset or the second location offset includes controlling the UAV to adjust its trajectory according to the average of the first location offset and the second location offset.

In Example 166, the method of unmanned aerial vehicle navigation of any one of Examples 157 to 165 is disclosed, further including detecting a third signal quality of the first wireless signal and the second wireless signal during a third sampling time; determining a third location offset from the predetermined trajectory based on the detected third signal strengths and at least one of the first identifier or the second identifier; comparing the third location offset to the second location offset; and if a difference between the third location offset and the second location offset is less than a predetermined threshold, controlling the UAV to adjust its trajectory according to at least one of the third location offset or the second location offset.

In Example 167, the method of unmanned aerial vehicle navigation of any one of Examples 157 to 166 is disclosed, wherein the signal quality includes any of a signal strength, a time stamp, a time of flight, or any combination thereof.

In Example 168, a time of flight device is disclosed, including: one or more transceivers, configured to send and receive wireless signals; at least three antennas, placed non-collinearly with respect to one another, each of the at least three antennas connected to a receiver of the one or more transceivers; one or more processors, configured to determine first time of flight measurements between each of the at least three antennas and a remote signal source; determine from the first time of flight measurements and an arrangement information of the at least three antennas relative to one another, a first position and a first orientation of the at least three antennas relative to the remote signal source.

In Example 169, the time of flight device of Example 168 is disclosed, wherein the arrangement information includes known distances between each of the at least three antennas relative to one another.

In Example 170, the time of flight device of Example 168 or 169 is disclosed, wherein the arrangement information includes second time of flight measurements between the at least three antennas.

In Example 171, the time of flight device of any one of Examples 168 to 170 is disclosed, further including the one or more processors controlling the one or more transceivers to transmit second time of flight signals, and the one or more processors determining second time of flight measurements between each of the at least three antennas based on a receipt of the second time of flight signals; and wherein the arrangement information of the at least three antennas relative to one another includes the second time of flight measurements.

In Example 172, the time of flight device of any one of Examples 168 to 171 is disclosed, wherein one or more of the at least three antennas receive a signal representing a position and an orientation of the remote signal source relative to at least one of the at least three antennas, and wherein the one or more processors are further configured to determine a second position and second orientation of the at least three antennas based on the determined first position and first orientation and the received signal representing the position and the orientation of the remote signal source relative to at least one of the at least three antennas.

In Example 173, the time of flight device of any one of Examples 168 to 172 is disclosed, wherein the one or more processors are further configured to determine a first position and first orientation of the device based on the first position and the first orientation of the at least three antennas relative to the remote signal source and an arrangement information of the at least three antennas relative to the device.

In Example 174, the time of flight device of any one of Examples 168 to 173 is disclosed, wherein the one or more processors are further configured to control the one or more transmitters to transmit a signal representing the first position and the first orientation.

In Example 175, the time of flight device of any one of Examples 168 to 174 is disclosed, wherein the one or more processors are further configured to control the one or more transmitters to transmit a signal representing the second position and the second orientation.

In Example 176, the time of flight device of any one of Examples 168 to 175 is disclosed, wherein the one or more processors are further configured to determine a discrepancy between the determined first position and first orientation, and the received position of the orientation of the remote signal source relative to at least one of the at least three antennas; and if the discrepancy is greater than a predetermined threshold, redetermine the first position and first orientation.

In Example 177, the time of flight device of any one of Examples 168 to 176 is disclosed, wherein determining the first position of the at least three antennas relative to the remote signal source includes determining a position of at least one of the at least three antennas along two axes relative to the remote signal source.

In Example 178, the time of flight device of any one of Examples 168 to 177 is disclosed, wherein determining the first position of the at least three antennas relative to the remote signal source includes determining a position of at least one of the at least three antennas along an x-axis and a y-axis relative to the remote signal source.

In Example 179, the time of flight device of any one of Examples 168 to 178 is disclosed, wherein determining the first orientation of the at least three antennas relative to the remote signal source includes determining a yaw orientation at least one of at least one of the at least three antennas relative to the remote signal source.

In Example 180, the time of flight device of any one of Examples 168 to 179 is disclosed, wherein the at least three antennas are coplanar.

In Example 181, the time of flight device of any one of Examples 168 to 180 is disclosed, further including a fourth antenna within the at least three antennas is disclosed, wherein three of the at least three antennas are coplanar but not co-linear relative to one another, and wherein the fourth antenna is not coplanar with the three of the at least three antennas.

In Example 182, the time of flight device of Example 181 is disclosed, wherein determining the first position of the at least three antennas relative to the remote signal source includes determining a position along three axes.

In Example 183, the time of flight device of Examples 181 or 182 is disclosed, wherein determining the first position of the at least three antennas relative to the remote signal source includes determining a position along an x-axis, a y-axis, and a z-axis.

In Example 184, the time of flight device of any one of Examples 181 to 183 is disclosed, wherein determining the first orientation of the at least three antennas relative to the remote signal source includes determining a yaw orientation relative to the signal source and at least one or a roll or a pitch orientation of the at least three antennas relative to the remote signal source.

In Example 185, a vehicle is disclosed, including one or more transceivers, configured to send and receive wireless signals; at least three antennas, placed non-collinearly with respect to one another, each of the at least three antennas connected to a transceiver of the one or more transceivers; one or more processors, configured to determine first time of flight measurements between each of the at least three antennas and a remote signal source; determine from the first time of flight measurements and an arrangement information of the at least three antennas relative to one another, a first position and a first orientation of the at least three antennas relative to the remote signal source.

In Example 186, the vehicle of Example 185 is disclosed, wherein the arrangement information includes known distances between each of the at least three antennas relative to one another.

In Example 187, the vehicle of Example 185 or 186 is disclosed, wherein the arrangement information includes second time of flight measurements between the at least three antennas.

In Example 188, the vehicle of any one of Examples 185 to 187 is disclosed, further including the one or more processors controlling the one or more transceivers to transmit second time of flight signals, and the one or more processors determining second time of flight measurements between each of the at least three antennas based on a receipt of the second time of flight signals; and wherein the arrangement information of the at least three antennas relative to one another includes the second time of flight measurements.

In Example 189, the vehicle of any one of Examples 185 to 188 is disclosed, wherein one or more of the at least three antennas receive a signal representing a position and an orientation of the remote signal source relative to at least one of the at least three antennas, and wherein the one or more processors are further configured to determine a second position and second orientation of the at least three antennas based on the determined first position and first orientation and the received signal representing the position and the orientation of the remote signal source relative to at least one of the at least three antennas.

In Example 190, the vehicle of any one of Examples 185 to 189 is disclosed, wherein the one or more processors are further configured to determine a first position and first orientation of the vehicle based on the first position and the first orientation of the at least three antennas relative to the remote signal source and an arrangement information of the at least three antennas relative to the vehicle.

In Example 191, the vehicle of any one of Examples 185 to 190 is disclosed, wherein the one or more processors are further configured to control the one or more transmitters to transmit a signal representing the first position and the first orientation.

In Example 192, the vehicle of any one of Examples 185 to 191 is disclosed, wherein the one or more processors are further configured to control the one or more transmitters to transmit a signal representing the second position and the second orientation.

In Example 193, the vehicle of any one of Examples 185 to 192 is disclosed, wherein the one or more processors are further configured to determine a discrepancy between the determined first position and first orientation, and the received position of the orientation of the remote signal source relative to at least one of the at least three antennas; and if the discrepancy is greater than a predetermined threshold, redetermine the first position and first orientation.

In Example 194, the vehicle of any one of Examples 185 to 193 is disclosed, wherein determining the first position of the at least three antennas relative to the remote signal source includes determining a position of at least one of the at least three antennas along two axes relative to the remote signal source.

In Example 195, the vehicle of any one of Examples 185 to 194 is disclosed, wherein determining the first position of the at least three antennas relative to the remote signal source includes determining a position of at least one of the at least three antennas along an x-axis and a y-axis relative to the remote signal source.

In Example 196, the vehicle of any one of Examples 185 to 195 is disclosed, wherein determining the first orientation of the at least three antennas relative to the remote signal source includes determining a yaw orientation at least one of at least one of the at least three antennas relative to the remote signal source.

In Example 197, the vehicle of any one of Examples 185 to 196 is disclosed, wherein the at least three antennas are coplanar.

In Example 198, the vehicle of any one of Examples 185 to 197 is disclosed, further including a fourth antenna within the at least three antennas is disclosed, wherein three of the at least three antennas are coplanar but not co-linear relative to one another, and wherein the fourth antenna is not coplanar with the three of the at least three antennas.

In Example 199, the vehicle of Example 198 is disclosed, wherein determining the first position of the at least three antennas relative to the remote signal source includes determining a position along three axes.

In Example 200, the vehicle of Examples 198 or 199 is disclosed, wherein determining the first position of the at least three antennas relative to the remote signal source includes determining a position along an x-axis, a y-axis, and a z-axis.

In Example 201, the vehicle of any one of Examples 198 to 200 is disclosed, wherein determining the first orientation of the at least three antennas relative to the remote signal source includes determining a yaw orientation relative to the signal source and at least one or a roll or a pitch orientation of the at least three antennas relative to the remote signal source.

In Example 202, a time of flight system is disclosed, including a first vehicle, including one or more transceivers, configured to send and receive wireless signals; at least three antennas, placed non-collinearly with respect to one another, each of the at least three antennas connected to a transceiver of the one or more transceivers; and one or more processors; and a second vehicle, including one or more transceivers, configured to send and receive wireless signals; at least three antennas, placed non-collinearly with respect to one another, each of the at least three antennas connected to a transceiver of the one or more transceivers; and one or more processors; wherein the one or more processors of the second vehicle are configured to cause the one or more transceivers of the second vehicle to send a first wireless signal; wherein the one or more processors of the first vehicle are configured to determine first time of flight measurements between each of the at least three antennas of the first vehicle and at least one of the at least three antennas of the second vehicle based on the first wireless signal; and determine from the first time of flight measurements and an arrangement information of the at least three antennas relative to one another, a first position and a first orientation of the at least three antennas of the first vehicle relative to at least one of the at least three antennas of the second vehicle.

In Example 203, the time of flight system of Example 202 is disclosed, wherein the arrangement information includes known distances between each of the at least three antennas relative to one another.

In Example 204, the time of flight system of Example 202 or 203 is disclosed, wherein the arrangement information includes second time of flight measurements between the at least three antennas.

In Example 205, the time of flight system of any one of Examples 202 to 204 is disclosed, further including the one or more processors of the first vehicle controlling the one or more transceivers of the first vehicle to transmit second time of flight signals, and the one or more processors determining second time of flight measurements between each of the at least three antennas based on a receipt of the second time of flight signals; and wherein the arrangement information of the at least three antennas relative to one another includes the second time of flight measurements.

In Example 206, the time of flight system of any one of Examples 202 to 205 is disclosed, wherein one or more of the at least three antennas of the first vehicle receive a signal representing a position and an orientation of at least one of the at least three antennas of the second vehicle relative to at least one of the three or more antennas of the first vehicle, and wherein the one or more processors of the first vehicle are further configured to determine a second position and second orientation of the at least three antennas of the first vehicle based on the determined first position and first orientation and the received signal representing the position and the orientation of the second vehicle relative to at least one of the at least three antennas of the first vehicle.

In Example 207, the time of flight system of any one of Examples 202 to 206 is disclosed, wherein the one or more processors of the first vehicle are further configured to determine a first position and first orientation of the first vehicle based on the first position and the first orientation of the at least three antennas relative to the second vehicle and an arrangement information of the at least three antennas relative to the first vehicle.

In Example 208, the time of flight system of any one of Examples 202 to 207 is disclosed, wherein the one or more processors of the first vehicle are further configured to control the one or more transmitters to transmit a signal representing the first position and the first orientation.

In Example 209, the time of flight system of any one of Examples 202 to 208 is disclosed, wherein the one or more processors of the first vehicle are further configured to control the one or more transmitters to transmit a signal representing the second position and the second orientation.

In Example 210, the time of flight system of any one of Examples 202 to 209 is disclosed, wherein the one or more processors of the first vehicle are further configured to determine a discrepancy between the determined first position and first orientation, and the received position of the orientation of the at least one of the at least three antennas of the second vehicle relative to at least one of the at least three antennas of the first vehicle; and if the discrepancy is greater than a predetermined threshold, redetermine the first position and first orientation.

In Example 211, the time of flight system of any one of Examples 202 to 210 is disclosed, wherein determining the first position of the at least three antennas of the first vehicle relative to at least one of the at least three antennas of the second vehicle includes determining a position of at least one of the at least three antennas of the first vehicle along two axes relative to the at least one of the at least three antennas of the second vehicle.

In Example 212, the time of flight system of any one of Examples 202 to 211 is disclosed, wherein determining the first position of the at least three antennas relative to the at least one of the at least three antennas of the second vehicle includes determining a position of at least one of the at least three antennas along an x-axis and a y-axis relative to the remote signal source.

In Example 213, the time of flight system of any one of Examples 202 to 212 is disclosed, wherein determining the first orientation of the at least three antennas relative to the at least one of the at least three antennas of the second vehicle includes determining a yaw orientation at least one of at least one of the at least three antennas relative to the at least one of the at least three antennas of the second vehicle.

In Example 214, the time of flight system of any one of Examples 202 to 213 is disclosed, wherein the at least three antennas of the first vehicle are coplanar.

In Example 215, the time of flight system of any one of Examples 202 to 214 is disclosed, further including a fourth antenna within the at least three antennas of the first vehicle is disclosed, wherein three of the at least three antennas are coplanar but not co-linear relative to one another, and wherein the fourth antenna is not coplanar with the three of the at least three antennas.

In Example 216, the time of flight system of Example 215 is disclosed, wherein determining the first position of the at least three antennas of the first vehicle relative to the at least one antenna of the at least three antennas of the second vehicle includes determining a position along three axes.

In Example 217, the time of flight system of Examples 215 or 216 is disclosed, wherein determining the first position of the at least three antennas of the first vehicle relative to the at least one of the at least three antennas of the second vehicle includes determining a position along an x-axis, a y-axis, and a z-axis.

In Example 218, the time of flight system of any one of Examples 215 to 217 is disclosed, wherein determining the first orientation of the at least three antennas of the first vehicle relative to the at least one of the at least three antennas of the second vehicle includes determining a yaw orientation relative to the signal source and at least one or a roll or a pitch orientation of the at least three antennas relative to the remote signal source.

In Example 219, a method of position and orientation determination is disclosed, including determine first time of flight measurements between each of at least three non-collinear antennas and a remote signal source; determine from the first time of flight measurements and an arrangement information of the at least three antennas relative to one another, a first position and a first orientation of the at least three antennas relative to the remote signal source.

In Example 220, the method of position and orientation determination of Example 219 is disclosed, wherein the arrangement information includes known distances between each of the at least three antennas relative to one another.

In Example 221, the method of position and orientation determination of Example 219 or 220 is disclosed, wherein the arrangement information includes second time of flight measurements between the at least three antennas.

In Example 222, the method of position and orientation determination of any one of Examples 219 to 221 is disclosed, further including transmitting second time of flight signals between the at least three antennas; determining second time of flight measurements between each of the at least three antennas based on a receipt of the second time of flight signals; and wherein the arrangement information of the at least three antennas relative to one another includes the second time of flight measurements.

In Example 223, the method of position and orientation determination of any one of Examples 219 to 222 is disclosed, further including receive a signal representing a position and an orientation of the remote signal source relative to at least one of the at least three antennas, and determining a second position and second orientation of the at least three antennas based on the determined first position and first orientation and the received signal representing the position and the orientation of the remote signal source relative to at least one of the at least three antennas.

In Example 224, the method of position and orientation determination of any one of Examples 219 to 223 is disclosed, further including transmitting a signal representing the first position and the first orientation.

In Example 225, the method of position and orientation determination of any one of Examples 219 to 224 is disclosed, further including transmitting a signal representing the second position and the second orientation.

In Example 226, the method of position and orientation determination of any one of Examples 219 to 225 is disclosed, further including determining a discrepancy between the determined first position and first orientation, and the received position of the orientation of the remote signal source relative to at least one of the at least three antennas; and if the discrepancy is greater than a predetermined threshold, redetermining the first position and first orientation.

In Example 227, the method of position and orientation determination of any one of Examples 219 to 226 is disclosed, wherein determining the first position of the at least three antennas relative to the remote signal source includes determining a position of at least one of the at least three antennas along two axes relative to the remote signal source.

In Example 228, the method of position and orientation determination of any one of Examples 219 to 227 is disclosed, wherein determining the first position of the at least three antennas relative to the remote signal source includes determining a position of at least one of the at least three antennas along an x-axis and a y-axis relative to the remote signal source.

In Example 229, the method of position and orientation determination of any one of Examples 219 to 228 is disclosed, wherein determining the first orientation of the at least three antennas relative to the remote signal source includes determining a yaw orientation at least one of at least one of the at least three antennas relative to the remote signal source.

In Example 230, the method of position and orientation determination of any one of Examples 219 to 229 is disclosed, wherein the at least three antennas are coplanar.

In Example 231, the method of position and orientation determination of any one of Examples 219 to 230 is disclosed, further including a fourth antenna within the at least three antennas is disclosed, wherein three of the at least three antennas are coplanar but not co-linear relative to one another, and wherein the fourth antenna is not coplanar with the three of the at least three antennas.

In Example 232, the method of position and orientation determination of Example 231 is disclosed, wherein determining the first position of the at least three antennas relative to the remote signal source includes determining a position along three axes.

In Example 233, the method of position and orientation determination of Examples 231 or 232 is disclosed, wherein determining the first position of the at least three antennas relative to the remote signal source includes determining a position along an x-axis, a y-axis, and a z-axis.

In Example 234, the method of position and orientation determination of any one of Examples 231 to 233 is disclosed, wherein determining the first orientation of the at least three antennas relative to the remote signal source includes determining a yaw orientation relative to the signal source and at least one or a roll or a pitch orientation of the at least three antennas relative to the remote signal source.

In Example 235, a means of location verification is disclosed, comprising: one or more receiving means, configured to receive a wireless signal representing a position; and one or more processing means, configured to determine from the signal the position and a signal characteristic of the signal; predict a signal characteristic of a wireless signal based on the position and a position of the one or more receivers; compare the determined signal characteristic to the predicted signal characteristic; and verify the position based on the comparison.

In Example 236, the means of location verification of Example 235 is disclosed, wherein the signal characteristic comprises an angle of arrival of the wireless signal, and wherein the predicting the signal characteristic comprises determining a predicted angle of arrival based on the reported position and a position of the one or more receivers.

In Example 237, the means of location verification of Example 235 or 236 is disclosed, wherein the signal characteristic comprises a received power of the wireless signal, and wherein the predicting the signal characteristic comprises determining a predicted received signal power based on the reported position and a position of the one or more receivers.

In Example 238, the means of location verification of any one of Examples 235 to 237 is disclosed, wherein the signal characteristic comprises a path loss of the wireless signal, and wherein predicting the signal characteristic comprises determining a predicted path loss of the wireless signal based on the reported position and a position of the one or more receivers.

In Example 239, the means of location verification of any one of Examples 235 to 238 is disclosed, wherein the signal characteristic comprises a time of flight of the wireless signal, and wherein predicting the signal characteristic comprises determining a predicted time of flight of the wireless signal based on the reported position and a position of the one or more receivers.

In Example 240, the means of location verification of any one of Examples 235 to 239 is disclosed, wherein the location verification device is configured as an unmanned aerial vehicle.

In Example 241, a means of location verification is disclosed, comprising one or more receiving means, configured to receive a wireless signal representing a position and one or more ambient signal characteristics; and one or more processing means, configured to determine from the signal the position and the one or more ambient signal characteristics; determine from a database one or more recorded ambient signal characteristics corresponding to the position; compare the one or more ambient signal characteristics to the one or more recorded ambient signal characteristic; and verify the position based on the comparison.

In Example 242, an means of encryption and decryption is disclosed, comprising an encrypting means, the encrypting means comprising: one or more transmitters, configured to transmit an wireless signal; and one or more processors, configured to determine from a database one or more stored characteristics corresponding to a position; select one or more of the one or more stored characteristics as an encryption key; encrypt data accorded the selected encryption key; control the one or more transmitters to transmit a wireless signal representing the encrypted data; and an unmanned aerial vehicle, comprising; one or more sensing means, configured to detect one or more characteristics associated with a position of the unmanned aerial vehicle; one or more receiving means, configured to receive the wireless signal representing the encrypted data; and one or more processing means, configured to: select one or more of the one or more of the detected characteristics as a decryption key; decrypt the encrypted data according to the selected decryption key.

In Example 243, a positioning means is disclosed, comprising one or more receiving means, configured to receive wireless signals representing a plurality of detected positions of each of a plurality of unmanned aerial vehicles, and a plurality of detected distances between two or more of the plurality of unmanned aerial vehicles; one or more processing means, configured to determine an uncertainty factor from the plurality of detected positions and the plurality of detected distances; determine a plurality of refined positions of the plurality of unmanned aerial vehicles based at least on the plurality of detected positions, the plurality of detected distances, and the uncertainty factor.

In Example 244, an unmanned aerial vehicle, comprising a receiving and transmitting means, configured to receive one or more first wireless signals from each of one or more associated unmanned aerial vehicles, each of the received one or more first wireless signals representing at least one computational resource availability of the respective unmanned aerial vehicle of the one or more associated unmanned aerial vehicles; one or more processing means, configured to select at least one of one or more associated unmanned aerial vehicles based on the computational resource availability of one or more associated unmanned aerial vehicles, according to a first logic; determine one or more computational tasks for disaggregate processing, according to a second logic; and control the transceiver to transmit at least one of the one or more computational tasks for disaggregate processing to each of the one or more associated unmanned aerial vehicles in the selected at least one of the one or more associated unmanned aerial vehicles.

In Example 245, an autonomous agent task distribution means is disclosed, comprising one or more first autonomous agents, each comprising a transmitting means; and one or more processing means; wherein the one or more processing means of each of the one or more first autonomous agents are configured to determine at least one computational resource availability of the respective first autonomous agent, and to control the respective transceiver to send a first wireless signal representing the at least one computational resource availability; a second autonomous agent, comprising, a transceiving means, configured to receive the first wireless signals from each of one or more first autonomous agents; one or more processing means, configured to, select at least one of the one or more first autonomous agents based on the computational resource availability of one or more additional autonomous agents, according to a first logic; determine one or more computational tasks for disaggregate processing, according to a second logic; and control the transceiver to transmit at least one of the one or more computational tasks for disaggregate processing to each of the first autonomous agents in the selected at least one of the one or more first autonomous agents.

In Example 246, an autonomous agent localization means is disclosed, comprising one or more localization signal transmitting means, each comprising a transmitter; a memory; and one or more processors, configured to store in the memory data representing a position of an autonomous agent; and to control the transmitter to transmit a signal representing the stored data; and an autonomous agent, comprising: one or more position sensors, configured to receive position sensor data; one or more processors, configured to determine a first position of the autonomous agent using the received position sensor data; send data representing the first position to a first localization beacon of the one or more localization beacons; and send a placement instruction, configured to case the first location beacon to be placed at the determined first position.

In Example 247, an unmanned aerial vehicle navigation assistance means is disclosed, comprising a first identifier transmission means, configured to transmit a first wireless signal representing a first identifier associated with the first transmission station into a first space region; a second identifier transmission means, configured to transmit a second wireless signal representing a second identifier associated with the second transmission station into a second space region; wherein the first space region and the second space region at least partially overlap; and an unmanned aerial vehicle comprising: one or more receiving means, configured to receive the first wireless signal and the second wireless signal, and one or more processing means, configured to determine the first identifier of the first wireless signal and the second identifier of the second wireless signal; detect a first signal quality of the first wireless signal and the second wireless signal during a first sampling time; determine a first location offset from a predetermined trajectory based on the detected first signal quality and at least one of the first identifier or the second identifier; detect a second signal quality of the first wireless signal and the second wireless signal during a second sampling time; determine a second location offset from the predetermined trajectory based on the detected second signal quality and at least one of the first identifier or the second identifier; compare the first location offset to the second location offset; and if a difference between the first location offset and the second location offset is less than a predetermined threshold, control the unmanned aerial vehicle to adjust its trajectory according to at least one of the first location offset or the second location offset.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A location verification device, comprising:
one or more receivers, configured to receive a wireless signal from a transmitting device, wherein the wireless signal represents data from the transmitting device;
wherein the data comprise position coordinates that correspond to a reported position of the transmitting device; and
one or more processors, configured to:
determine using the received wireless signal an actual signal characteristic of the received wireless signal, wherein the actual signal characteristic of the received wireless signal comprises an actual angle of arrival, an actual received power, an actual path loss, or an actual time of flight of the received wireless signal;
determine an expected signal characteristic of the received wireless signal, wherein the expected signal characteristic of the received wireless signal comprises an expected angle of arrival, an expected received power, or an expected time of flight of a signal from the reported position to a current position of the location verification device;
compare the actual signal characteristic with the expected signal characteristic; and
accept the reported position if the comparison of the actual signal characteristic and the expected signal characteristic is within a predetermined range; and
reject the reported position if the comparison between the actual signal characteristic and the expected signal characteristic is outside the predetermined range.

2. The location verification device of claim 1, wherein the actual signal characteristic comprises the actual angle of arrival, and wherein the expected signal characteristic comprises an expected angle of arrival of a signal from the reported position of the transmitting device to the current position of the location verification device.

3. The location verification device of claim 1, wherein the actual signal characteristic comprises the actual received power, and wherein the expected signal characteristic comprises an expected received power of a signal from the reported position of the transmitting device to the current position of the location verification device.

4. The location verification device of claim 1, wherein the actual signal characteristic comprises the actual time of flight, and wherein the expected signal characteristic comprises the expected time of flight of a signal from the reported position of the transmitting device the current position of the location verification device.

5. The location verification device of claim 1, wherein the one or more processors are further configured to disregard future wireless signals received from the transmitting device if the comparison of the actual signal characteristic and the expected signal characteristic is is outside the predetermined range.

6. The location verification device of claim 1, wherein the one or more processors are further configured to control a transmitter to send a wireless signal representing a non-authorization of the signal source if the comparison of the actual signal characteristic and the expected signal characteristic is outside the predetermined range.

7. The location verification device of claim 1, wherein the one or more processors are further configured to control a transmitter to send a wireless signal representing an authorization of the signal source if the comparison of the actual signal characteristic and the expected signal characteristic is within the predetermined range.

8. The location verification device of claim 1, wherein the location verification device is an autonomous vehicle.

9. The location verification device of claim 1, wherein the location verification device is an unmanned aerial vehicle.

* * * * *

UNITED STATES PATENT AND TRADEMARK OFFICE
CERTIFICATE OF CORRECTION

PATENT NO. : 11,984,034 B2
APPLICATION NO. : 16/584978
DATED : May 14, 2024
INVENTOR(S) : Dibyendu Ghosh et al.

It is certified that error appears in the above-identified patent and that said Letters Patent is hereby corrected as shown below:

In the Claims

In Claim 4, Column 70, Line 22:
Change "transmitting device the current" to --transmitting device to the current--

Signed and Sealed this
Second Day of July, 2024

Katherine Kelly Vidal
*Director of the United States Patent and Trademark Office*